US012572251B1

(12) United States Patent
Strube et al.

(10) Patent No.: US 12,572,251 B1
(45) Date of Patent: Mar. 10, 2026

(54) FOCUS SYSTEM FOR USER INTERFACES, METHODS OF FOCUS SYSTEM USE, AND USES THEREOF

(71) Applicant: FuboTV Inc., New York, NY (US)

(72) Inventors: Charles Strube, Paris (FR); Kilian Braquin, Paris (FR); Quentin Longeot, Paris (FR); Robin Fricot, Paris (FR); Romain Biard, Paris (FR)

(73) Assignee: FuboTV Inc., New York, NY (US)

( * ) Notice: Subject to any disclaimer, the term of this patent is extended or adjusted under 35 U.S.C. 154(b) by 0 days.

(21) Appl. No.: 19/187,103

(22) Filed: Apr. 23, 2025

(51) Int. Cl.
| | |
|---|---|
| *G06F 3/0481* | (2022.01) |
| *G06F 3/04842* | (2022.01) |
| *G06F 3/0485* | (2022.01) |
| *G06F 9/451* | (2018.01) |

(52) U.S. Cl.
CPC ........ *G06F 3/0481* (2013.01); *G06F 3/04842* (2013.01); *G06F 3/0485* (2013.01); *G06F 9/451* (2018.02)

(58) Field of Classification Search
None
See application file for complete search history.

(56) References Cited

U.S. PATENT DOCUMENTS

| | | | | | |
|---|---|---|---|---|---|
| 8,692,851 | B2 * | 4/2014 | Ording | ................. | G06F 1/1694 |
| | | | | | 345/649 |
| 2002/0122072 | A1 * | 9/2002 | Selker | ................. | G06F 3/0482 |
| | | | | | 715/834 |
| 2004/0250280 | A1 * | 12/2004 | Allport | ................. | H04N 21/47 |
| | | | | | 725/39 |
| 2008/0282190 | A1 * | 11/2008 | Kagaya | ................. | G06F 3/0489 |
| | | | | | 715/794 |
| 2009/0049476 | A1 * | 2/2009 | Jung | ................. | H04N 21/4334 |
| | | | | | 725/44 |
| 2009/0177989 | A1 * | 7/2009 | Ma | ................. | H04N 21/4312 |
| | | | | | 715/781 |
| 2013/0176256 | A1 * | 7/2013 | Hara | ................. | G06F 3/04855 |
| | | | | | 345/173 |
| 2013/0205243 | A1 * | 8/2013 | Rivera | ................. | G06F 3/04886 |
| | | | | | 715/776 |
| 2014/0149936 | A1 * | 5/2014 | Wilder | ................. | G06F 3/0482 |
| | | | | | 715/815 |

(Continued)

*Primary Examiner* — Tuyetlien T Tran
(74) *Attorney, Agent, or Firm* — Key Kesan Dallmann PLLC

(57) ABSTRACT

A focus system includes a processor configured to execute machine instructions to implement and operate the focus system. The processor provides a focus application for storage and operation on a user device; receives a request from the focus application to provide content for display on the user device and a corresponding focusable user interface (U/I) listing elements referencing individual content items in the content to be provided, and transmit the requested content and a data structure from which the focusable U/I may be generated. The data structure includes data corresponding to the content items, which allows the focus application to construct and display the U/I as a focused U/I on the user device. The focused U/I includes spatial and Parent-Child-Sibling navigation rules for selecting elements of the U/I for focus, and element bubbling rules for refocusing an element for display as a focused element following a loss of focus condition.

27 Claims, 41 Drawing Sheets

(56)          References Cited

U.S. PATENT DOCUMENTS

2014/0282099 A1*  9/2014  Bronder ............... H04L 65/612
                                                    715/753
2015/0082250 A1*  3/2015  Wagner .............. G06F 3/04817
                                                    715/838
2015/0189388 A1*  7/2015  Devassykutty .. H04N 21/47202
                                                    725/44
2015/0242110 A1*  8/2015  Balakrishnan .......... G06F 16/54
                                                    715/830
2015/0242404 A1*  8/2015  Underwood, IV ...... H04L 67/10
                                                    707/748
2017/0155946 A1*  6/2017  Coenen ........... H04N 21/42224
2018/0098017 A1*  4/2018  Vaysman ........... H04N 21/6125
2020/0099987 A1*  3/2020  Petrillo ............. H04N 21/4884
2020/0145726 A1*  5/2020  Ciuca .................. H04N 21/435
2020/0304863 A1*  9/2020  Domm ............... G06F 3/04886
2020/0374595 A1*  11/2020  Yang ................... H04N 21/472
2021/0365134 A1*  11/2021  Beaumier ............ G07F 17/305
2022/0329914 A1*  10/2022  Fishman ........... H04N 21/4312
2023/0350537 A1*  11/2023  Hylak .................... G06F 3/011
2024/0394010 A1*  11/2024  Smith-Aulie .......... G06F 16/74

* cited by examiner

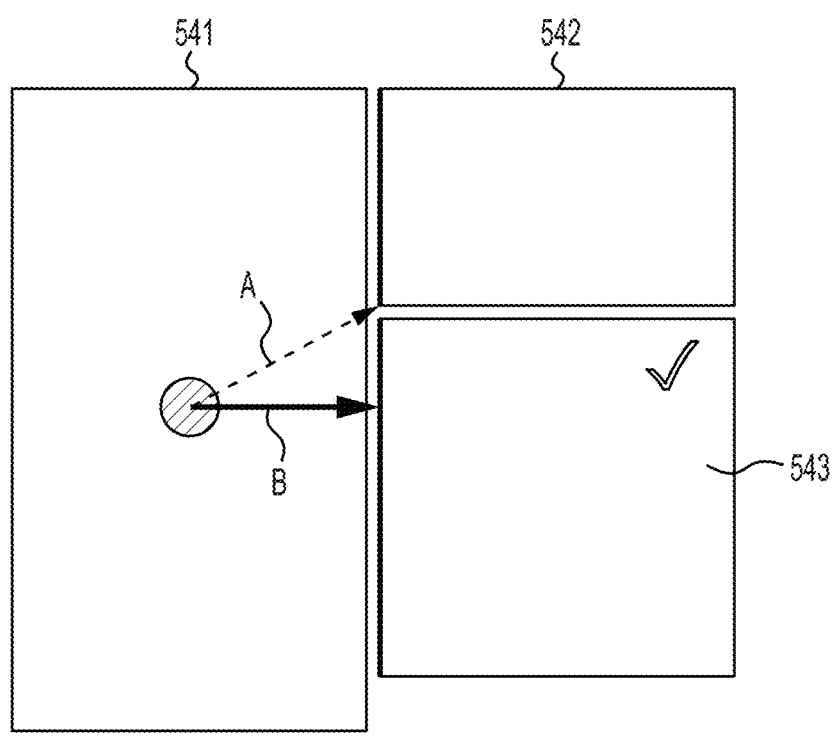
FIG. 5F(1)
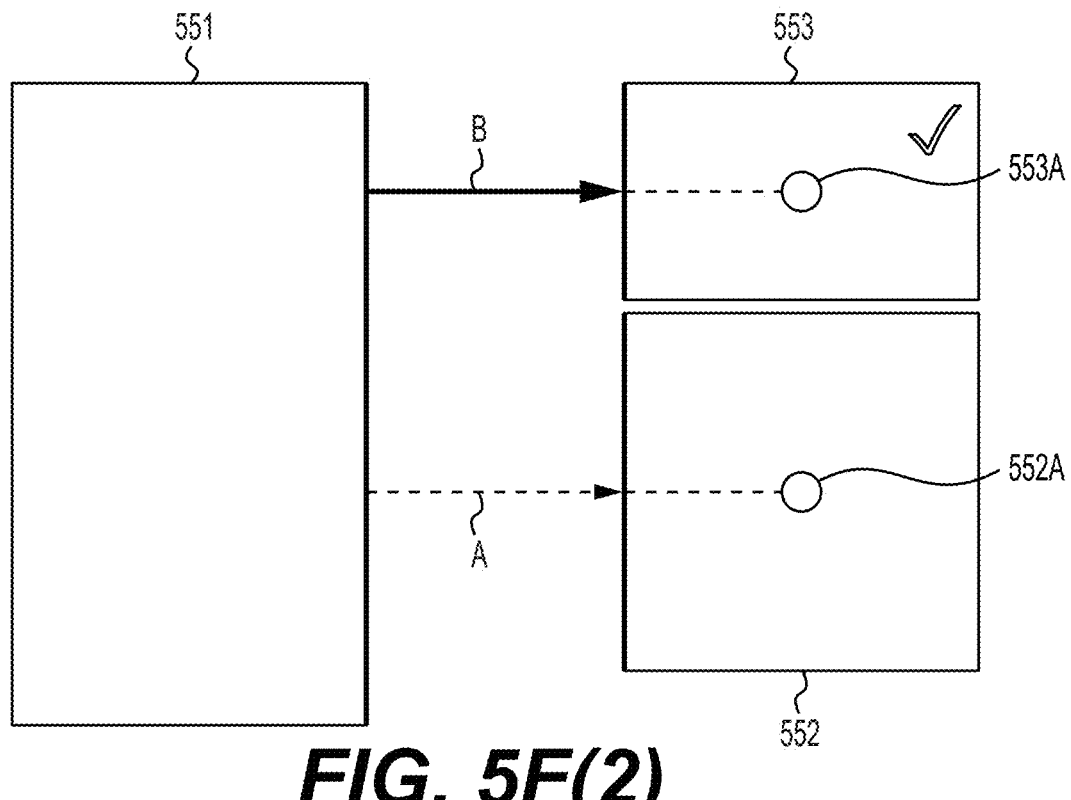
FIG. 5F(2)

600

640

800

810 — PROVIDE FOCUS APPLICATION

820 — RECEIVE CONTENT REQUEST FROM FOCUS APPLICATION

830 — TRANSMIT CONTENT AND U/I DATA STRUCTURE TO FOCUS APPLICATION

840 — REFRESH U/I DATA PERIODICALLY

END

900

910 — DETECT USER NAVIGATED EVENT/ACTION

920 — ESTABLISH ELEMENT SELECTION AREA

930 — IDENTIFY CANDIDATE CHILD ELEMENTS

940 — DETERMINE CELL CENTROIDS/ EDGES/CORNERS

950 — CALCULATE AND PROVIDE DISTANCE AND ANGULAR VALUES

960 — SCORE AND SELECT BEST CANDIDATE ELEMENT FOR FOCUS

END

1000

1010 — DETECT SCROLL RIGHT
ACTION

1020 — NO CHILD ELEMENT
TO RIGHT

1030 — RETURN FOCUS TO PARENT
ELEMENT OR TO UPPER-MOST
PARENT ELEMENT

END

1200

1210 — IDENTIFY CANDIDATE
CHILD ELEMENTS

1220 — DETERMINE CLOSEST ELEMENT
SIDE USING DOT PRODUCT

1230 — COMPARE SCORED CHILD ELEMENTS
AND SELECT BEST PATH

1240 — CALCULATE CLOSEST AXIS
AND MEASURE DISTANCES

1250 — REPEAT 1210-1240

1260 — SELECT CHILD ELEMENT WITH
BEST SCORE

END

FOCUS SYSTEM FOR USER INTERFACES, METHODS OF FOCUS SYSTEM USE, AND USES THEREOF

BACKGROUND

A user interface (U/I) may be employed by a human user to see and navigate through a number of displayed features, and to select a desired feature. Navigation through the U/I may cause a change in the displayed features. Selecting a displayed feature may cause display of data associated with that selected feature. As an example, a feature may be associated with a search engine function, a menu, function, or a video program. An electronic program guide (EPG) is a specific type of U/I. An EPG typically presents a data structure that enables the representation of programs or content available to users for viewing. The data structure also helps users navigate the available programs. An EPG may include visual data, textual data, and metadata.

User interfaces exist for a variety of purposes. EPGs exist for a variety of content delivery options, including live, over-the-air broadcast television, live cable television, and streaming programs for viewing on a television. For broadcast and cable television, basic program information displayed to users may include program titles, broadcast times and duration, broadcaster identities, and channel numbers or identities. Streaming programs may be presented with an EPG that lists current programs available listed by, for example, genre, recently added, viewing suggestions (based on past viewing history), most popular programs, etc. Some EPGs, particularly those used with streaming programs, may include additional features such as thumbnail images, a short summary of the program, program rating (e.g., 4.5 stars) based on view feedback, parental guidance rating, and other data.

For broadcast transmission, EPG data may be transmitted alongside television content via satellite, cable, and internet protocol television (IPTV) providers. Some IPTV providers produce the accompanying EPG through an application resident on a user's electronic device. Smart TVs may be configured to generate EPGs.

Some EPGs are customizable by users. For example, a user may customize the order of channels displayed for television programming.

SUMMARY

A focus system includes a processor and a non-transitory, computer-readable storage medium having encoded thereon, machine instructions for implementing and operating the focus system. The processor executes the machine instructions to provide a focus application for storage and operation on a user device; receive a request, from the focus application executing on the user device, to provide content for display on the user device and a corresponding focusable user interface (U/I) listing elements referencing individual content items in the content to be provided; and transmit the requested content and a data structure from which the focusable U/I may be generated. The data structure includes data and metadata corresponding to the individual content items, and the data structure allows the focus application to construct and present the U/I as a focused U/I on a display of the user device The focus application provides a spatial navigation component for focusing one element at a time on the U/I; a Parent-Child-Sibling element navigation component for selecting elements of the U/I for focus; and an element bubbling component for refocusing an element for display as a focused element on the U/I following a loss of focus condition. In an aspect, the spatial navigation component determines a relationship between a current focused element and one or more candidate elements to replace the current focused element, constructs an element selection area of the focused U/I, with element selection confined to candidate elements within the element selection area; determines a straight line distance between the current focused element and each candidate element within the element selection area; and scores each candidate element based on the straight line distance. In another aspect, one or more candidate elements are in an angular relation with the current focused element, and the scoring further includes adjusting the scoring based on a magnitude of the angular relation. In yet another aspect, the straight line distance is measured in pixels between a current focused element references and a candidate element reference. In still another aspect, the focus application provides a margin of error (MOE) component and the MOE component applies a margin of error as an adjustment to the current focused element reference, which has the effect of changing a size of the candidate element selection area. In a further aspect, only elements within the candidate element selection area having at least a portion of a side facing the current focused element are identified as candidate elements. In yet a further aspect, candidate elements are selected based on detection of a user event, wherein the user event comprises one of a scroll left operation, a scroll right operation, a scroll up operation, and a scroll down operation. Furthermore, the U/I elements may include a Root element, a Parent element, a Child element, and a Sibling element, and the focus application to redistributes Child elements in a Parent-Child relationship in an order defined by the Parent element. Still further, the processor periodically sends a U/I refresh command to the focus application, and execution of the U/I refresh command reloads a U/I page to display a refreshed U/I on the user device.

A processor-implemented method for generating and maintaining focus in a user interface (U/I) includes providing a focus application for storage and operation on a user device; receiving a request, from the focus application executing on the user device, to provide content for display on the user device and a corresponding focusable U/I listing elements referencing individual content items in the content to be provided; and transmitting the requested content and a data structure from which the focusable U/I may be generated, wherein the data structure comprises image data, text data, and metadata corresponding to the individual content items, wherein the data structure allows the focus application to construct and display the U/I as a Focused U/I on a display of the user device. The Focused U/I includes spatial navigation rules for focusing one element at a time on a displayed U/I, Parent-Child-Sibling navigation rules for selecting elements of the U/I for focus, and element bubbling rules for refocusing an element for display as a focused element on the U/I following a loss of focus condition.

A non-transitory, computer-readable storage medium has encoded thereon machine instructions that when executed by a processor, cause the processor to provide a focus application for storage and operation on a user device; receive a request, from the focus application executing on the user device, to provide content for display on the user device and a corresponding focusable user interface (U/I) listing elements referencing individual content items in the content to be provided; and transmit the requested content and a data structure from which the focusable U/I may be generated, wherein the data structure comprises image data, text data, and metadata corresponding to the individual content items, wherein the data structure allows the focus application to construct and display the U/I as a Focused U/I rendered on a U/I page on a display of the user device. The Focused U/I includes spatial navigation rules for focusing one element at a time on a displayed U/I, Parent-Child-Sibling navigation rules for selecting elements of the U/I for focus, and element bubbling rules for refocusing an element for display as a focused element on the U/I following a loss of focus condition.

A user interface (U/I) focus system includes a content delivery system comprising one or more processors and a non-transitory, computer-readable storage medium having encoded thereon machine instructions for operating the content delivery system; and a focus application configured for installation on a user device, and further configured for two-way data communication with the content delivery system. The content delivery system is configured to receive a request, from the focus application executing on the user device, to provide content for display on the user device and a corresponding focusable U/I listing elements referencing individual content items in the content to be provided, and transmit the requested content and a data structure from which the focusable U/I may be generated. The data structure includes image data, text data, and metadata corresponding to the individual content items. The data structure allows the focus application to construct and display the U/I as a Focused U/I on a display of the user device. The focus application is configured to execute spatial navigation for providing focus for one element at a time on a displayed U/I; and execute Parent-Child-Sibling navigation for selecting elements of the U/I for focus. In an aspect, the U/I is an electronic program guide (EPG). In another aspect, the U/I is an user interface for an online retailer. In yet another aspect, the U/I is a search engine interface for searching online Web sites. In still another aspect, the focus system includes an updateable data structure comprising data elements and metadata from which the focusable (U/I) is constructed Upon removal of a data element, related to a currently focused element in the focusable U/I, from the updateable data structure causes loss of focus of the currently focused element, and the processor executes an element bubbling operation the focus application to select another element for focus.

DESCRIPTION OF THE DRAWINGS

The detailed description refers to the following figures in which like numerals refer to like items, and in which.

DETAILED DESCRIPTION

Figure 1A:
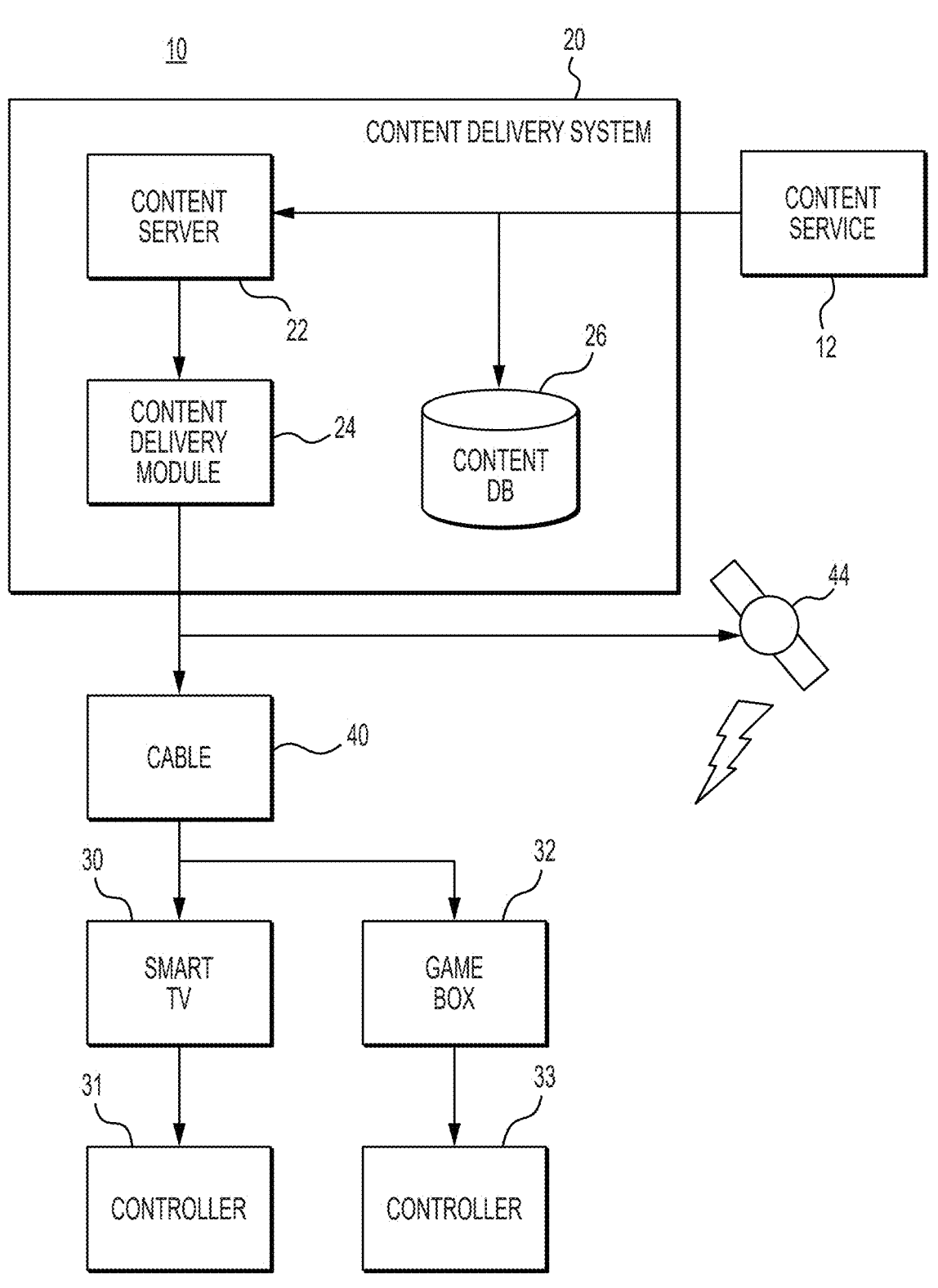
FIGS. 1A and 1B illustrate example environments and example content delivery services and architectures that may employ the herein disclosed focus system and associated Focused User Interface (Focused U/I)

Content provided for display on various media devices may include, or may be accessed through, a user interface (U/I). For example, live and recorded television programs (over the air and cable), may have an associated U/I that presents to a user current, past, and future content, and that allow the user to select specific programs listed in the U/I for display. Similarly, streaming services, such as Hulu® and Netflix®, provide U/Is from which users may select programs for viewing. Thus, a U/I is a digital interface between the user and a content provider. In some implementations, the visual display of a U/I may be generated by an application or program executing on a smart, Internet-enabled television. However, the data structure from which the U/I is generated and displayed may be provided by the content provider. Thus, a user interface system may include a back-end that produces and updates the data structure, and a front-end that displays the U/I itself, in which the front-end consists of a series or a matrix of U/I elements, each U/I element typically corresponding to a specific program or content item available to a user. Some user interfaces may include elements that link to other features or actions that may be accessible through the user interface such as, for example, an action selection "button," a record "button," and a save "button." Program content presented over the Internet for viewing on a television similarly may have an associated U/I. While current U/I systems may enhance some aspects of a user's viewing experience, those current U/I systems suffer from technological deficiencies that also degrade the user's viewing experience. One inherent technical limitation of current U/I systems is that the U/I control device used to operate and navigate the "front-end," or the U/I itself is, typically, a keypad entry-based device. That is, the U/I control device does not include a pointer feature typically found in a common "mouse" or touch pad employed with a computer. Thus, operation of current U/I control devices (e.g., a television remote control device or a game station controller) requires operation of scrolling or arrow keys or numerical/alphabetical keys, a cumbersome, inefficient, and error-prone way of entering data or selecting an action to be taken.

These navigational problems are, to a large extent, a result of technological limitations and deficiencies in the data structure of the U/I, and implementation/display of the U/I front-end or user interface. For example, current U/I systems fail to provide a consistent and reliable "focus." Focus, in a digital interface such as a U/I, is a characteristic of a U/I element that makes the U/I element available, or presents the element, for interaction by a user. Focus also shows which element or option is currently selected. Focus may be indicated visually by, for example, a glowing box or highlighting around a U/I element. When, for example, arrow keys on a remote controller are pressed, focus may shift to another U/I element. Loss of focus is indicated when no U/I element is highlighted, making unclear to the user which U/I element or option is selectable or available. Loss of focus may occur when an U/I element is removed from the U/I, or moves off-screen. Without focus, content navigation becomes difficult, and may result in user loss of control of the content display device. Keeping focus active ensures smooth navigation and a better user experience. As noted above, current U/I systems often fail to provide consistent and reliable focus. Specifically, current U/I systems, particularly those associated with streaming content, do not, after displaying a content item, necessarily return to an exact version of the U/I that was originally displayed to a user. Other U/I systems fail to provide accurate navigation when a user employs scrolling or arrow keys. Some U/I systems perform poorly or are not capable of accurate navigation when voice control is employed. Some U/I systems repopulate inaccurately after a user completes viewing a program. To an extent, these limitations with current U/I systems result from inefficient libraries and imprecise and inflexible navigation coding or navigation rules. Other limitations of current U/I systems include presenting large amounts of information, which may lead to cluttered interfaces that can overwhelm users, making locating desired content difficult. Variations in navigation performance across different platforms can exist, which may confuse users, requiring them to adapt to different layouts and controls. Content availability is frequently governed by licensing agreements, causing programs to appear or disappear from U/I systems without prior notice to the user. Inaccurate or outdated metadata can lead to discrepancies between the U/I and actual content availability, resulting in missing or incorrect program listings. Inefficient code libraries can cause slow loading times and lagging interactions within the U/I, detracting from the user experience. Implementing variable-sized elements to highlight certain content can improve user engagement but poses challenges in maintaining a cohesive layout across different devices and screen sizes.

To overcome the technological deficiencies in current U/I systems and current U/Is, disclosed herein is a U/I system encompassing a focus system and a corresponding improved Focused User Interface (Focused U/I). The improved Focused U/I, in various implementations and aspects, incorporates one or more technological advances that specifically overcome the above-described technological deficiencies. These technological advances result in a focusable and Focused U/I. These technological advances include smaller, more efficient code libraries, a candidate element selection area imposed on the U/I, computation of nearest element for selection using angular and horizontal/vertical measurements, "bubbling," a process typically placed in use after loss of focus of an element, and an enhanced spatial navigation module that identifies focusable elements of a U/I in a given direction. The spatial navigation module addresses the technological problem of focus loss and inefficient navigation in, for example, smart TV interfaces, particularly in scenarios with U/I elements of varying sizes and positions. This issue is prevalent in current user interfaces, where manual coding is often required to ensure smooth focus transitions, leading to inconsistent user experiences. The herein disclosed focus system provides a technological solution by determining the next focusable element in a given direction, based on proximity and spatial relationships. In an aspect, the "given direction" is used in conjunction with a configurable candidate element selection area, where the candidate element selection area effectively limits the number of elements that may be selected for focus. By automatically managing focus transitions, the focus system ensures intuitive navigation across diverse interface layouts without the need for extensive manual coding. This solution enhances user interaction by preventing loss of focus and providing a seamless experience, particularly in dynamic interfaces where elements may be added, removed, or rearranged. Furthermore, the herein disclosed spatial navigation module represents a technological advance over current U/I navigation components in that a Spatial Navigation Algorithm provides intuitive navigation among elements of varying sizes and positions within a U/I, and may do so based on explicit rules that obviate the need for coding for each of many different possible navigation scenarios while at the same time making the underlying computing platform more efficient. Thus, the herein disclosed Spatial Navigation Algorithm solves the complex problem of focus management in diverse interface (U/I) layouts. In one aspect, the Spatial Navigation Algorithm includes a proximity component that determines proximity between a Focused U/I element and candidate or follow-on U/I elements. In this aspect, the proximity between elements may be provided by the Selection Score Algorithm embedded in the proximity component. In some proximity determinations, a proximity score between a first element and a second element may equal the proximity score between the first element and a third element. When this equal proximity score situation occurs, the focus system may select an element for focus by following a specific, or pre-determined reading order, such as top to bottom; left to right, and further may account for edge situations such as overlapping elements or non-uniform geometries. In a further aspect, proximity is based on values of distance and angle between the Focused U/I element and the candidate follow-on U/I elements.

In an example, the focus system employs a document object model (DOM). The DOM is a programming interface used to represent and interact with structured data, such as HTML and XML, in a hierarchical tree structure. In an aspect, the DOM represents the U/I as a tree of objects, where each element (e.g., including text, images, tables) is a node. The DOM allows for dynamic manipulation of elements using JavaScript or other programming languages. Such dynamic manipulation includes modifying, reordering, deleting, or adding elements. Furthermore, the DOM may be standardized to apply across different browsers and applications. Use of the DOM provides an automatically-generated U/I without manually writing HTML, and supports real-time U/I updates without having to reload U/I pages.

While the focus system may operate within a document object model (DOM) environment, the focus system may not rely solely on the DOM structure to manage focus transitions, Instead, the focus system maintains an internal focus-state database, which is updated dynamically (i.e., in teal time), and which tracks element relationships (e.g., Parent-Child) and element states (e.g., focused, last focused) independently of a visual or component hierarchy. Use of the internal focus-state database allows the focus system to tolerate DOM changes without losing track of corresponding HTML element references. However, because there are more data items in the DOM structure than just focusable elements (Parent and Child), the internal focus state database may not reflect the complete DOM structure.

As part of the focus-state database, the focus system incorporates a selection system, or library, having a hierarchical data structure (or an internal tree structure) in the form of Root, Parent, Child, and Sibling U/I elements. In an aspect, the Root, Parent, Child, and Sibling elements may be presented in a modal structure (for example, a menu of available operations such as save, search, etc., or a drawer structure (e.g., carousel menus of focusable Child elements, such a video programs) of selectable elements. The focus-state database also incorporates imperative rules and declarative rules that control U/I element selection behavior such as dictating behavior from a U/I element or blocking navigation in certain directions. The focus system further includes the Spatial Navigation Algorithm that in some examples allows selection of the closest U/I element in a given direction, prevention of U/I element selection loss, and maintenance of selection history for backward U/I navigation, and efficient debugging. The focus system and the focus-state database make U/I element redistribution predictable by establishing an efficient Parent-Child element relationship. The Parent-Child element relationship allows for determining the selection of an entire row of U/I elements, for example, and letting the row (Parent element) itself redistribute the selection to one of the row's Child elements. This redistribution model enables several features, including: (1) isolating a selection if necessary by, for example, creating a focus boundary around one or more elements, either modal elements or drawer elements, a selection if necessary (use of boundaries is disclosed in more detail herein); (2) propagating element information when a Child element recovers selection (that is, a Child element is focused after a loss of focus, and the focus system "notifies" the Parent of the Child element of this focus recovery); (3) redistributing element selection when the DOM structure changes; (4) recalculating the element selection from a given Parent element (if needed) (recalculating the element selection is a selection mechanism, denoted herein as a "bubbling" selection in which the focus system automatically assigns focus when a focused element is removed (from the DOM structure) or otherwise becomes unfocusable); bubbling, involves searching or traversing up and down an element hierarchy, evaluating candidate elements according to pre-defined rules, until a suitable candidate element is identified; and (5) remembering the last selected Child element upon completion of viewing content, by which the focus system invokes a finite state machine that searches an element hierarchy to determine what the next focusable element should be. For that, the finite state machine reads element states and declarative and imperative rules. As an example, when the finite state machine reads a Parent element in the element hierarchy, the finite state machine determines if the remembered last focused Child element is enabled (i.e., the Child element is in an enabled state, if the remembered last focus Child element has a previously focused Child element, and if the previously focused Child element still exists (i.e., the previously focused Child element has not been removed from the DOM structure) If all these conditions are met, then the finite-state machine will go to that previously focused Child element via a Parent element. The focus system further determines relationships between elements and adds or removes the elements as requested by a front-end client. For example, when a U/I page change happens, the front-end client removes the DOM elements, which notifies the focus system, and applies the same changes in the internal tree. The focus system further acts like a search engine that allows users to ask (search) for collections of Child elements, Parent elements, or Sibling elements based on a starting point or other criteria. In operation, adding elements is synchronous, but element removal may occur in two stages: first is a "soft delete," second is a "hard delete," triggering various mechanisms on elements that disappear when the DOM structure changes. In a soft delete stage, an element is marked as inactive but its internal state and relationship are preserved in memory, allowing the focus system to retain the element if the element "reappears" shortly thereafter (such as a re-render event) or when the finite state machine, looking for a new element, might read the previous element's state/measures/position/rules. If the element does not return within an event window, the hard delete stage removes the element entirely from the internal tree structure. For example, in a soft delete, a U/I element that is removed may be represented on a displayed U/I is a format, such as a lighter shade, than that U/I element appeared before removal. After a time, the DOM is recalculated, and the removed U/I element is deleted from any display on the U/I (a hard delete). Both the soft delete and the hard delete may be reflected on a user's device as a result of periodic (e.g., every 30 seconds) refreshing of the U/I by the focus system.

The focus system incorporates the herein disclosed concept of spatial choice. The calculation of spatial selection enables intuitive navigation among elements without requiring coding. In general, spatial navigation is based on elements most aligned with a chosen direction from the user (e.g., up, down; right, left). When a gap (distance) between a starting point element and candidate elements increases, the more the focus manager may select nearby elements that are not directly (e.g., horizontally or vertically) aligned with the starting point element. In an example implementation, the focus system determines a "spatial calculation of siblings" in which the focus manager, starting from the center of a source element (i.e., the starting point), examines other elements and calculates a selection score based on distance (the score decreases linearly with distance) and angle (an angle deviating from the direction by 25 degrees in either the positive or negative direction reduces the score exponentially). The selection score may be calculated by:

$$\text{Selection score} = -\text{angle}^2 - 2\times\text{distance}. \qquad \text{EQN 1}$$

Figure 5A:
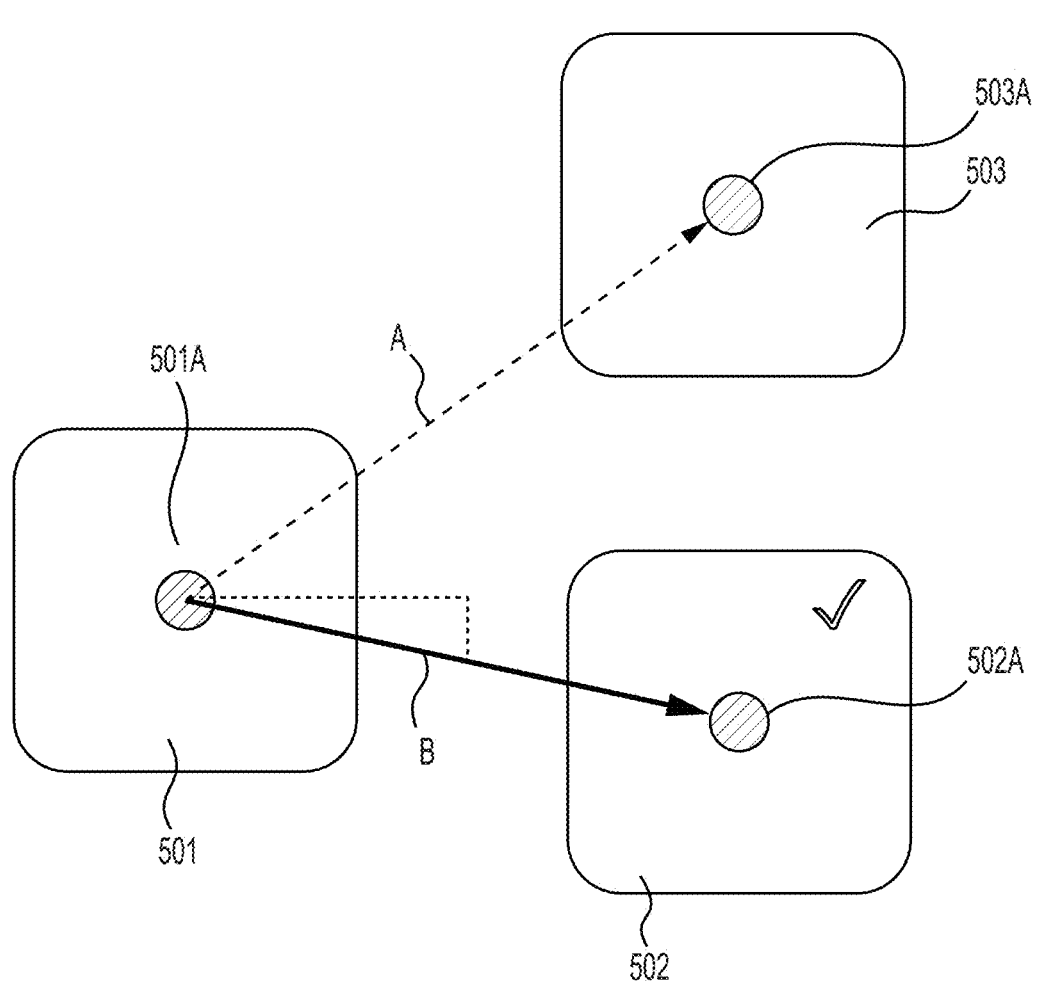
Figure 5B:
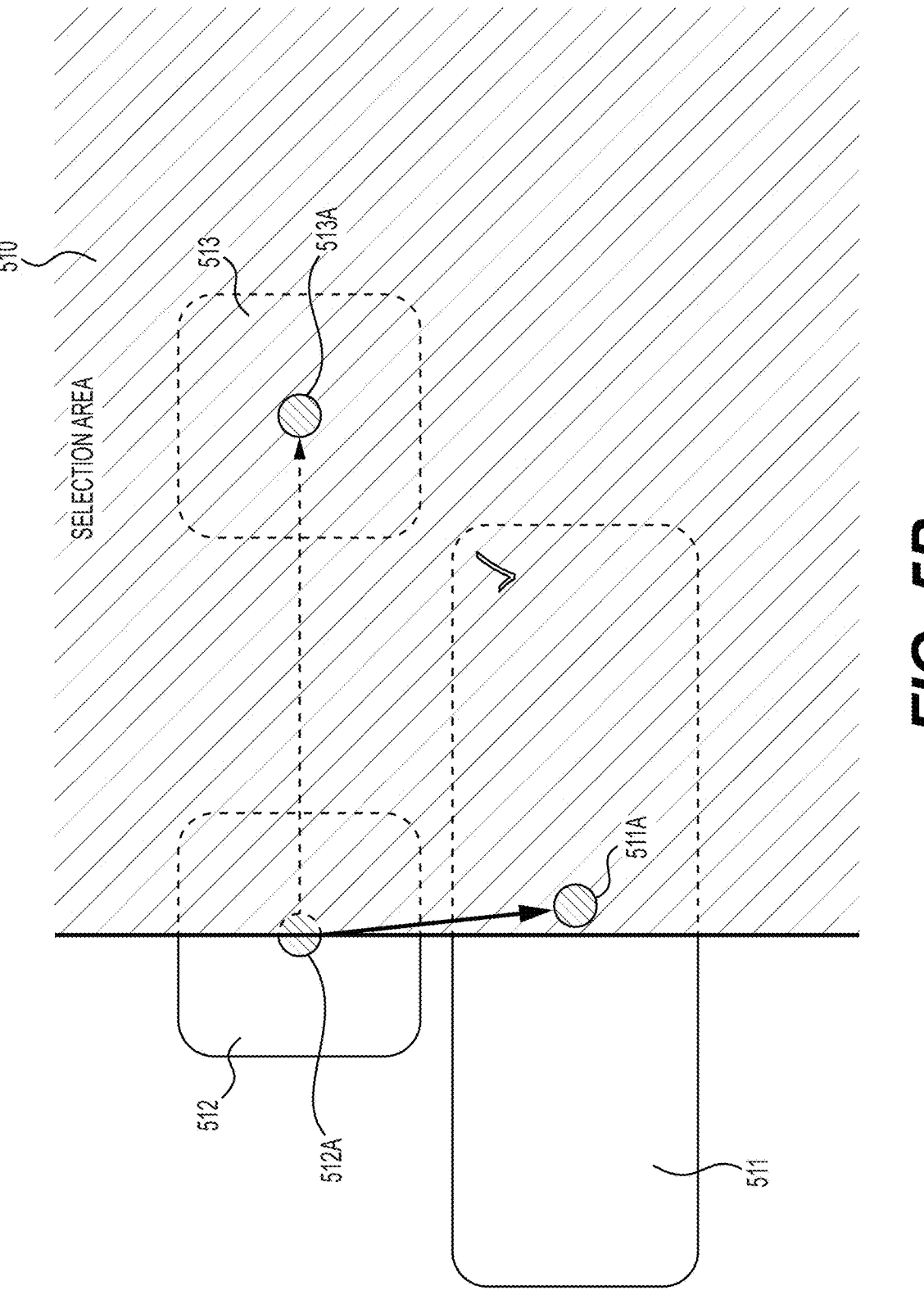

Thus, the proximity and angle-based Selection Score Algorithm of Equation 1 combines proximity and angular alignment to determine the best element for selection based on user inputs (i.e., user operation or a controller key pad or similar device to indicate movement in a given direction, for example). When a directional input (e.g., pressing the right arrow key) is received, the focus system evaluates candidate elements in the desired direction for possible selection. Instead of simply choosing the nearest element, the focus system calculates both distance and angular alignment relative to the user's currently-selected position in the U/I. The Selection Score Algorithm then applies the scoring mechanism where distance measures how close a candidate element is to a starting point, and angle measures how aligned the candidate element is with the user's directional input. The closer the candidate element is to the exact direction (e.g., directly to the right), the better the angular alignment. The scoring formula of Equation 1 deprioritizes elements that deviate from the desired direction (by squaring the angle) and assigns higher priority to elements that are both aligned with the desired direction (i.e., the direction input by the user) and close in proximity. This Selection Score Algorithm ensures that the candidate element closest to the intended path, rather than just the nearest candidate element, is selected. For example, an element directly to the right but farther away may be selected over one closer but located more to the upper-right. FIGS. 5A-5N provide examples of element selection operations.

Another aspect of candidate element evaluation for selection entails use of a selection area. When a user presses a directional button (e.g., scroll right), the focus system adjusts the area of selection (see FIGS. 5B, 5D and 5N for examples of "area of selection") around the current element, and then analyzes candidate elements that are both spatially close and well-aligned with the user's input.

Another technological advance is consideration of a margin of error when selecting follow-on elements after a current element (i.e., after viewing the content associated with a currently-focused, or source element). A margin of error (MOE) Algorithm incorporates an adjustable margin of error to prevent unwanted or incorrect element selections, especially in densely packed or irregularly arranged layouts of U/Is. In one implementation, the Selection Score Algorithm selects elements based strictly on distance and angle without considering a buffer for selection accuracy. In another implementation, the MOE Algorithm applies a margin of error as a dynamic boundary that adapts to the user's directional input. As noted above, when a user presses a directional button, the focus system adjusts the area of selection around the current element, and then focuses on candidate elements that are both spatially close and well-aligned with the user's input. For example, if the user presses a right arrow key, the focus system prioritizes elements directly to the right, avoiding those that are slightly above or below. One aspect of the MOE Algorithm is how the starting point is centered on the source element. By placing the starting point more centrally (e.g., the centroid of a cell containing the currently focused element or a line traversing the cell vertically or horizontally), the focus system reduces the likelihood of selecting nearby elements that are slightly misaligned with the desired direction. FIG. 5B illustrates a centrally-placed vertical line in a cell, with the line truncated at its top and bottom; the cut-off segment of the vertical line corresponds to the margin of error. The MOE helps ensure that only candidate elements that are both close and closely aligned with the input direction are considered for selection. Candidate elements that are close but not directly aligned with the user's input direction are deprioritized.

Yet another technological improvement is a Parent-Child Navigation Algorithm that efficiently handles nested structures, such as menus or carousels (a carousel, as the name implies, is a rotating (e.g., horizontally scrolling loop) menu of U/I elements that eventually returns to a starting U/I element) of Parent and Child elements. When the structure changes (e.g., elements are added, removed, or reorganized), the focus system employs the Parent-Child Navigation Algorithm to recalculate and dynamically redistribute the selection options (i.e., the Parent-Child Navigation Algorithm redistributes elements). If a user is navigating a nested structure and a change occurs (such as the removal or addition of Child elements), the Parent-Child Navigation Algorithm executes to recalculate the element hierarchy by identifying the Parent element and all remaining focusable Child elements. In an example, the U/I system back-end refreshes the U/I data periodically such that a removed Child element no longer is provided for display on a user's device. The Parent-Child Navigation Algorithm redistributes focus within the structure by selecting the most logical Child element based on, for example, proximity and alignment of potential Child elements with the user's last selected U/I element. For example, if a Child element is removed from the Focused U/I, the Parent-Child Navigation Algorithm executes to recalculate which of the remaining Child elements is closest to the previously selected Child element and reassigns focus accordingly. This process ensures a smooth transition, preventing the user from losing focus or selecting an unintended U/I element.

As still another technological improvement, the herein disclosed focus system incorporates a U/I element "bubbling" mechanism that accommodates removal of a Child element from the Focused U/I with minimal effect on a user's selection options. More specifically, a Child element may be removed from the Document Object Model (DOM), in which case that Child element no longer is available for display in the Focused U/I. In response, a Bubbling Algorithm (see description of FIGS. 5K-5M) operates to provide an alternative element, such as a Parent or Sibling element (see definitions below for Parent, Child, and Sibling elements). As an example, if Child element B is removed from the Focused U/I, the focus system first checks if there are any Sibling elements (other Child elements under the same Parent). If a Sibling element exists (e.g., elements C, D, and E), the focus system recalculates the best Sibling element to select based on proximity and alignment with the previously removed Child element B. If no Sibling elements are available, the focus system then moves up to the Parent element (element A) and selects element A. Parent element A temporarily becomes the new Focused U/I element until the user navigates to a different element or new Child elements are added to the hierarchy. The Bubbling Algorithm is recursive, meaning the bubbling operation can continue moving up the hierarchy if necessary, always looking for the most logical Parent or Sibling element to assign focus. This recursive bubbling operation prevents focus from being lost entirely, even if several U/I elements are removed, thereby maintaining continuity in the user's U/I navigation. This aspect allows the focus system and the Focused U/I to adapt to changes in the user interface structure without causing any user disruption. For example, if an entire group (e.g., row) of Child elements is removed, the focus system might bubble up through the hierarchical tree structure until the focus system finds a suitable Parent element, and if necessary, continue moving up the hierarchical tree structure to a Root element (the Root element may represent the overall user interface structure or Focused U/I display screen). (As noted herein, a Root element sits above the Parent elements in an inverted hierarchical tree structure of Root-Parent-Child.) Use of this specific hierarchical tree structure represents a technological advance over current U/Is in the sense that the U/I remains "focused" around at least one node of the U/I at all times.

Aspects of the above-described technological improvements, as well as other technological improvements over current U/I systems are illustrated in the accompanying drawings and are further disclosed below.

For consistency of description, and without limitation, disclosed herein are a focus system, and corresponding methods of operation, that may be implemented in, with, and by a U/I. The U/I with its focus enhancements (Focusable U/I/Focused U/I) may be used with a cloud-based streaming service that delivers content (e.g., programs such as movies, shows, still images (jpeg) and other images and text documents, and audio programs, over the Internet without the need for a traditional cable or satellite infrastructure. In this regard, content may be displayed on various compatible devices, including streaming devices (Amazon Fire TV®, Roku®, Apple TV®), smart TVs (Samsung®, LG®, Vizio®), and gaming consoles (Xbox®). This cloud-based approach allows for flexibility and accessibility across multiple platforms. However, the same or a similar Focused U/I may be used with other means of program delivery. In an aspect, the Focused U/I and the underlying content may be accessed through a dedicated front-end application; that is, the front-end application itself produces the Focused U/I. This means that the Focused U/I is not rendered using a smart TV's built-in tuner or a traditional set-top box. Rather, users navigate the available content and the Focused U/I through the dedicated application on their compatible devices, the compatible devices including smart TVs and gamming consoles, for example, making the Focused U/I independent of external tuners and set-top boxes. Furthermore, the herein disclosed focus system may integrate artificial intelligence technologies to further enhance its performance and, correspondingly, the overall user experience. The Focused U/I brings the same level of service to any compatible platform. The Focused U/I may be displayed as a matrix of rows and columns. Intersections of the rows and columns form cells. The Focused U/I may be made up of multiple pages. Alternately, the Focused U/I is made up of one page that may be scrolled left to right and back; up and down and back. The Focused U/I may display fixed content (e.g., a U/I page for a search engine with the page showing a fixed listing of search topics and a search term entry window), slowly changing content (e.g., reflecting content that is periodically refreshed or replaced), or time-varying content (e.g., varying by time of day and day of week).

For further consistency and ease of description, the disclosure that follows will use the following terms, with corresponding definitions, and their equivalents:

U/I: A user interface (U/I), and in particular the herein disclosed Focused U/I, includes descriptions of content that may be made available to multiple viewers (users). As used herein, the descriptions are referred to as "elements" (see below). The descriptions may include textual information, thumbnail images, and short video snippets. Associated with the descriptions may be metadata, which, in an aspect, may be hidden from view by the user. The Table below lists and describes basic program information displayed to users through an example video program user interface.

Type of Data Description
  Program Title Name of program, show, movie, or event.
  Duration Length. start and end times, sometimes with countdown timers.
  Program Genre (1) Categorization such as sports, news, movies, reality TV
  Program Genre (2) Categorization such as Western, SCI FI, Comedy
  Age Rating Content classification (e.g., TV-G, TV-14, TV-MA).
  Live/Recorded Indicator Specifies if the program is live, recorded, or on-demand.
  High-Definition (HD)
  Indicator Shows whether the program is HD, 4K, or SD.
  Optional Information displayed to User
Feature Description
  Thumbnail Image A visual preview of the show/movie (poster, actor image, etc.).
Feature Description
  Program Description A short text summary or synopsis of the program.
  Cast & Crew
  Information List of main actors, directors, producers, etc.
  User Ratings & Aggregated audience scores (e.g., Rotten Tomatoes, Reviews IMDb).
  Parental Controls Embedded parental guidance data (e.g., violence, language, nudity warnings).
  Interactive Links Direct links to trailers, related content, or subscription options.
  Interactive Features
Feature Description
  Recommendations Personalized suggestions based on user watch history & preferences.
  Picture-in-Picture (PIP) Small live preview window inside the U/I interface.
  Preview
  Voice Search Integration Users search programs using voice commands.
  Cloud DVR Integration Users schedule recordings directly from the U/I.

Trending & Popularity Displays real-time trending content.
Metrics
Application Programming Interface (API): In the context of the focus system, an API is a structured interface that allows different focus system components, and in particular, a front-end application to communicate with focus system back-end servers to retrieve or update data. The APIs allow front-end clients (e.g., applications) to access focused U/I data, authenticate users; stream content, make or retrieve DVR recordings, personalize recommendations, and manage user preferences. The APIs may be RESTful HTTP APIs or GraphQL APIs, operating over HTTPS and using J SON-formatted data for requests and responses.

Cell: An area or volume created by the intersections of rows and columns. In an aspect, all cells are of the same area or volume. In another aspect, cell areas may differ, both horizontally and vertically. For example, one cell may occupy the same vertical space as two other cells stacked one on top of the other. Thus, cells making up a U/I page may be of irregular size. Furthermore, cell size may change dynamically. Each cell may contain one distinct element. A cell may have a defined centroid. A cell may have an area measured in pixels or using other measurement bases.

Element: The program description occupying a cell. The program descriptions may vary, cell to cell, in terms of which of the above features are included. Each element may include a "Select" or "Play" button to access the program or content referenced by the element, and operation of the button may cause the program to display and begin. In another aspect, operation of the button presents the user with a full screen display, and the user then may select another button to activate the program. The element may include a thumbnail image, a short video, a short text description, various icons, color usage to indicate content type or for other purposes, favorability rating, date of content creation, content type (movie, series, sports program, text, audible book, e-book), parental guidance rating, for movies and series, names of actors, director name, title, language options, links to previews, and other data types. An element, once selected by a user, may be termed, and treated by the herein disclosed focus system, as a "current element," a "focused element," and/or, a "source element." A Root element sits above the Parent elements, and may be a node corresponding to the U/I.

Starting Point: In navigating the focused U/I, the starting point is a position within the focused U/I that is initially focused when the U/I is displayed, or is initially selected by a user. In an aspect, the starting point is located at the centroid of a cell.

Centroid: The geometric center of an individual cell.

Distance and Angle: Distance is the linear distance between to centroids (of two different cells), and Angle is the angle between a straight line connecting the centroids and a horizonal or vertical reference line of the matrix. In an aspect, Distance may be measured as the horizontal or vertical distance between a boundary of one cell and a centroid of another cell. In another aspect, distance may be measured between centroids of two adjacent cells. In yet another aspect, Distance and Angle may be measured between non-adjacent cells; in an example, distance is measured between the centroid of one cell and a boundary of a non-adjacent cell, or between centroids of two non-adjacent cells. In still another aspect, distances may be measured in terms of pixels (e.g., a cell of 640 pixels by 360 pixels), or pixels may be converted to standard measurement units (e.g., a HD TV may have 90 pixels per inch).

Focus and Loss of Focus: Focus refers to a selected cell, where the cell is selected by the focus system or by action of a user. In an aspect, a focused cell is highlighted, outlined, "lifted" or "expanded." Loss of Focus occurs when, after viewing content represented by an element of a cell, the U/I is displayed with the previously selected cell and its U/I element removed or shifted position in the U/I, or no longer highlighted. Loss of Focus also occurs when, during spatial navigation, the spatial navigation algorithm executes incorrectly such that the intended next cell to be highlighted is not selectable. Other intentional or unintentional actions may result in a loss of focus.

Parent-Child-Sibling Structure: A programming and data structure that describes a hierarchical relationships among elements. In the context of the herein disclosed focused U/I, these terms refer to the organizational structure of content. Parent: A main content category such as a specific genre, or a primary node. For example, a Parent may be represented to a user as a row of the focused U/I that contains content of a specific genre such as Westerns. Alternately, a Parent may be represented as a single element. When represented to a user as a single element, a Parent element may, as the term "primary node" suggests, represent a number of content items, such as sequential episodes in a television series. Child: A Child typically is an element but may include subcategories of content. As an individual U/I element, a Child may fall under a Parent category such as specific TV shows or movies listed under a particular genre. Sibling: A Sibling is an element that shares the same parent category as other Child elements, such as multiple episodes of a series. This hierarchical Parent-Child-Sibling structure allows for efficient navigation and management of content within the focused U/I, enabling users to easily browse programs and related content. The Parent-Child-Sibling structure may emanate for a Root element to form an inverted tree structure.

Margin of Error is a quantifiable measure as to how much deviation may be allowed when identifying candidate elements as follow-on elements for focusing. Deviation refers, for example, to a centroid-to-centroid misalignment of two adjacent cells from a horizontal or a vertical direction. Thus, a first cell has a first centroid that is not in horizontal alignment with a second centroid of an adjacent second centroid. In some current U/Is, such a misalignment may result in an undesirable U/I element being selected.

Bubbling is an algorithmic process that cooperates with a Parent-Child Navigation Algorithm to select an appropriate candidate element for focusing.

Page, or U/I page, refers to how a Focused U/I is displayed on a user device. For example, a U/I page may be a scrollable structure (scrollable horizontally and vertically) (i.e., on a single page). Alternately, the Focused U/I may be displayed on a series of pages. The U/I pages may be referred to as catalog pages. The same Focused U/I may be displayed differently on different user devices, with the page display differences a function of the user device.

The above described concepts, functions, components, and systems are disclosed in more detail below with reference to the appended drawings.

Figure 1B:
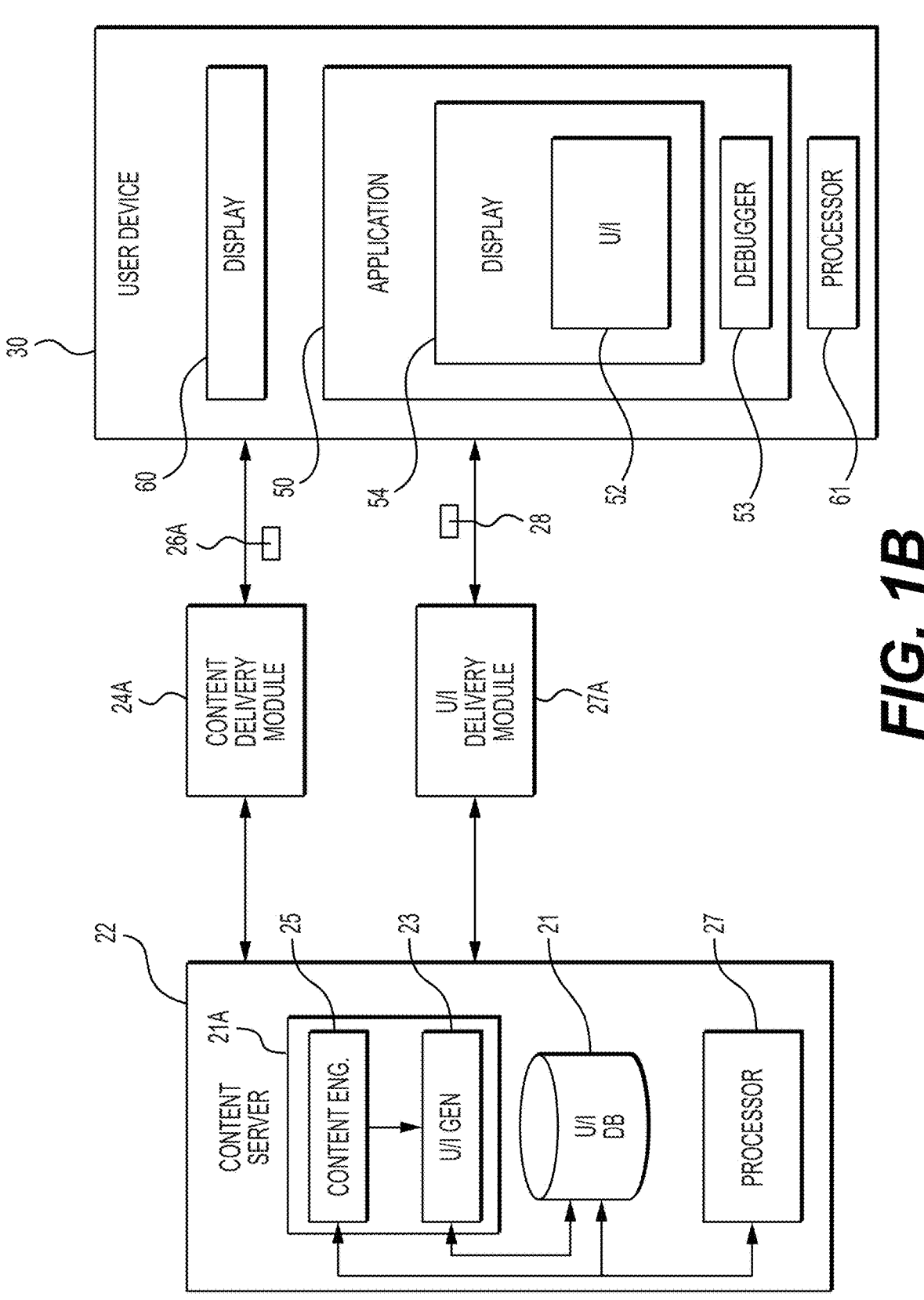

FIGS. 1A and 1B illustrate environments in which example content delivery services, using example architectures, may employ the herein disclosed Focused User Interface (Focused U/I). In FIG. 1A, environment 10 includes content delivery system 20, which communicates with user devices over cable network 40 or satellite 44. Other content delivery options are possible. Content delivery system 20 may include a content server 22, a content delivery module 24, and a content database 26. The content delivery service 20 may receive content from content service 12. The user devices may include a smart TV 30 and a game box 32. The smart TV 30 may operate based on commands issued from remote, wired or wireless controller 31; the game box 32 may operate based on commands from controller 33, which may be wired or wireless. The game box 32 may be coupled to the smart TV 30, and games executing on the game box 32 may be displayed on the smart TV 30.

The content delivery module 24 may deliver recoded content and live content.

FIG. 1B illustrates aspects of the components of FIG. 1A. Specifically, a back-end content server 22 produces the data underlying a U/I (i.e., DOM 72; see FIG. 1C) using U/I generator 23 and content 26A using content engine 25. The U/I generator 23 and the content engine 25 may be stored as machine instructions in a non-transitory, computer-readable storage medium 21A. The machine instructions are executed by processor 27. The thus-generated U/I 28 data via U/I delivery module 27A, along with content 26A via content delivery module 24A, are provided to user device 30 (a smart TV). The received U/I 28 data may be processed to provide U/Is that are displayed on an application (a front-end client), that enables a display function and that enables responses to commands issued from a control device such as controller 31 of FIG. 1A. In the context of FIG. 1A, a front-end client is an application or interface that a user interacts with directly. In the case of the focus system, the front-end client is the application 50 running on user device 30. The front-end client (application 50) displays the Focused U/I, including menus, guides, and playback screens, for example. The front-end client collects user inputs such as remote control button presses and sends corresponding requests to the back-end via application programming interfaces (APIs). The front-end client then renders data returned from those back-end APIs as a graphical user interface. Note that these APIs are not visible to a user; rather, the APIs are software interfaces that the front-end client uses to communicate with focus system backend servers. For example, when a user selects a channel, the front-end client calls the API: GET/api/v1/stream/playback?channel=CHANNEL. The back-end responds with a streaming URL and metadata. The front-end then uses that response to initiate playback of content on the requested channel. Thus, to enable display of the U/I, user device 30 may include an application 50 (the front-end client), which may be provided and supported by the content delivery service 20 of FIG. 1A. The application 50 may include a user interface module 52 and a content display module 54. The application 50 also includes a debugger module 53, described elsewhere herein. The application 50 may be stored in a data store of the user device 30 with machine instructions necessary for operation of the application 50 stored in a non-transitory, computer-readable storage medium (not shown in FIG. 1B). Processor 61 may execute machine instructions of the application 50 to may provide the U/I 28 data and associated content 26A for viewing on display 60 of user device 30. Note that although content server 22 is a component of the focus system back-end, in alternate implementations, content being provided through operation of the front-end component (i.e., application 50) may originate from a server external to the focus system.

Figure 1C:
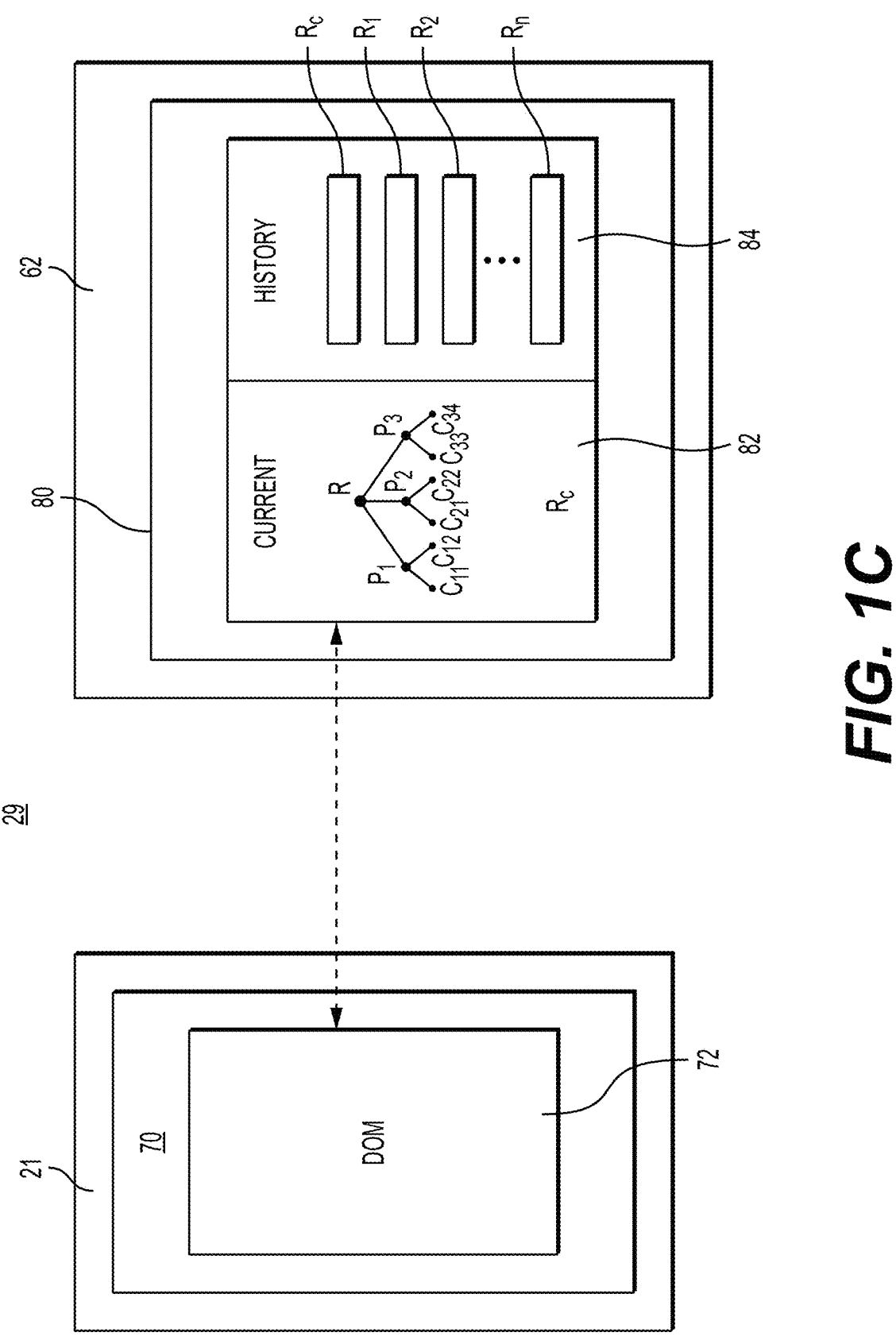
FIG. 1C illustrates an example data layer created between a focus system back-end and a focus system front-end.

FIG. 1C illustrates additional aspects of the focus system. In particular, FIG. 1C illustrates a data layer that exists between a focus system front-end client and a focus system back-end. A front-end client is the application or interface that a user interacts with directly. In the case of focus system, the front-end client is the application 50 of FIG. 1B that runs on user device 30. The front-end client (application 50) displays the Focused U/I. including menus, guides, and playback screens, for example. The front-end client collects user inputs such as remote control button presses and sends corresponding requests to the back-end via APIs. The front-end client then renders data returned from those back-end APIs as a graphical interface. Note that these APIs are not visible to a user; rather, the APIs are software interfaces that the front-end client uses to communicate with focus system back-end servers.

FIG. 1C illustrates a data structure installed at a focus system front-end, that is, at the user device 30 of FIG. 1B, as a feature of installation of the focus application 50, and that is maintained through execution of the application 50. The data structure is linked back to the focus system back-end 20 of FIG. 1A. Thus, as shown in FIG. 1C, installation and operation of the application 50 creates data layer 29 between focus system front-end data layer 80 and focus system back-end data layer 70. The focus system back-end data layer 70 includes document object module 72 stored in U/I database 21. At the focus system front-end, through installation and operation of the front-end application 50 (FIG. 1B), the focus system front-end data layer 80 is represented by a dedicated focus tree structure (see example hierarchical tree structure for current page $R_c$ 82) for each screen or page displayed on the display device 60 of user device 30. Individual focus tree structures $R_i$ are organized as a stack-like history 84 of hierarchical tree structures, shown visually as $R_c$, $R_1$-$R_n$, where $R_c$ represents current focus tree structure for a currently-displayed U/I screen or page. Each focus tree structure $R_c$-$R_n$ has a unique history ID, which identifies the logical page or screen the focus tree structure represents. When a user navigates forward to a new U/I screen or page, the current focus tree $R_c$ is duplicated to serve as the foundation for a new focus tree, allowing the front-end focus system to inherit relevant structural information while preparing for the upcoming view. Once this focus tree duplication is completed, the focus system ensures that the focus tree (which becomes new focus tree $R_{cn}$) is populated with newly mounted focusable elements, while elements from the previous page (i.e., the page related to the previous current focus tree $R_{cp}$) are removed from the new current focus tree $R_{cn}$ and without altering the previous focus tree's (focus tree $R_{cp}$) structure. This process ensures that elements that are common between the previously displayed page and the newly displayed page work properly. When components of the front-end focus system detect navigation toward a previously visited screen or page that has a known history ID (for example the focus tree represented by $R_3$), the front-end focus system does not create a new focus tree. Instead, the front-end focus system retrieves the matching focus tree (i.e., the focus tree with the known history ID (in the example $R_3$)) from the history 84, and removes all focus trees that were added after $R_3$ (in the example, removing focus trees $R_1$ and $R_2$), and reinstates the focus tree $R_3$ as the active or current focus tree $R_c$. This behavior is similar to a stack of documents, where pulling an older page from the stack removes not only the older page, but all documents sitting above the older page. Upon restoration of the U/I page corresponding to focus tree $R_3$, the focus system performs a reconciliation phase between the DOM 72 and the restored focus tree in the focus history 84, reestablishing the connections between elements of the DOM 72 and their corresponding focusable elements stored in the user front-end 30. This process restores not only the previous focus state, but also internal metadata such as rememberLastFocusedChild values, ensuring continuity of navigation among focusable elements, and preserving user context.

Each focus tree in the front-end system is composed of focusable elements that may be connected through explicit Parent-Child relationships. The Parent-Child relationships may be established, maintained, or changed dynamically during the lifecycle of the corresponding elements. These relationships are not inferred from the DOM structure 72, but rather are created during an element registration; specifically, when the focus system generates a focusable element, the newly-generated focusable element receives an identity of its Parent element through an upper-level mechanism and the focus system registers the newly-generated focusable element as a Child element of its Parent element in a focus tree. In addition, a focusable element can simultaneously be a Parent and a Child. A focusable element may receive focus from its own Parent, while also delegating focus to its Child elements. Likewise, a focusable element can be a Child only (if it has no Child elements of its own), or a Parent only (if it is a container but not nested within another focusable element group). This flexible model allows for arbitrarily deep and modular focus trees that do not rely on a visual hierarchy or a DOM hierarchy. The focus system distinguishes leaf elements as those elements that do not have any registered, focusable Child elements. Only these leaf elements are eligible to receive direct focus, ensuring that the user always lands on a fully actionable element. When a non-leaf (Parent) element is focused, the focus system uses defined rules—such as preferredChild, rememberLastFocusedChild, or spatial selection—to determine the appropriate leaf to focus within its focus subtree. If no valid candidate element is found, focus may bubble up or down in the current focus tree to find the next eligible element for focus.

Returning to FIGS. 1B and 1C, the debugger module 53 (shown in FIG. 1B) provides a dedicated debugging interface that provides a real-time visualization of the internal state and behavior of the focus engine. In an aspect, the debugger module 53 provides a floating window that serves both as a diagnostic tool and a developer assistant. Although the debeugger module 53 is shown implemented at the focus system front-end, a debugger module also may be implemented at the focus system back-end. One feature of the debugger module 53 is the ability to display the current focus tree, representing all active, focusable elements, their Parent-Child relationships, and associated rules (e.g., restrictions, preferred child, default focus). This tree view enables instant verification of the structure of focusable elements within the U/I. In addition to the active tree (i.e., current tree $R_c$), the debugger module 53 also displays the focus history stack, including both active and inactive trees. This allows users to inspect the memory of previously focused pages or components, observe their latest focused elements, and understand how the system manages navigation continuity across views. The debugger module 53 includes a log viewer for the finite state machine, the internal mechanism that handles all focus decisions. These logs show step-by-step operations executed during navigation: evaluation of spatial scores, navigation logic, bubbling behavior, and condition resolutions. This visibility helps with understanding why a specific focus transition occurred. The debugger module 53 further provides performance metrics, such as the number of focus calculations, HTML DOM queries (e.g., getBoundingClientRect calls), and state machine executions. These indicators are valuable for identifying performance bottlenecks or anomalies in complex U/I structures. The debugger module 53 includes a set of visualization options that render spatial navigation calculations directly on screen. For example, the debugger module 53 can draw paths between the currently focused element and all evaluated candidate elements, the paths including directional cones, distance lines, angle deviations, and scoring steps. This feature gives a visual explanation of the decision process made by the spatial algorithm, which no other focus system provides. Altogether, the debugger module 53 with its interface transforms the focus system into an observable, testable and tunable engine, giving developers unprecedented control and insight over how navigation logic behaves in real-world, dynamic U/I conditions.

Figure 2A:
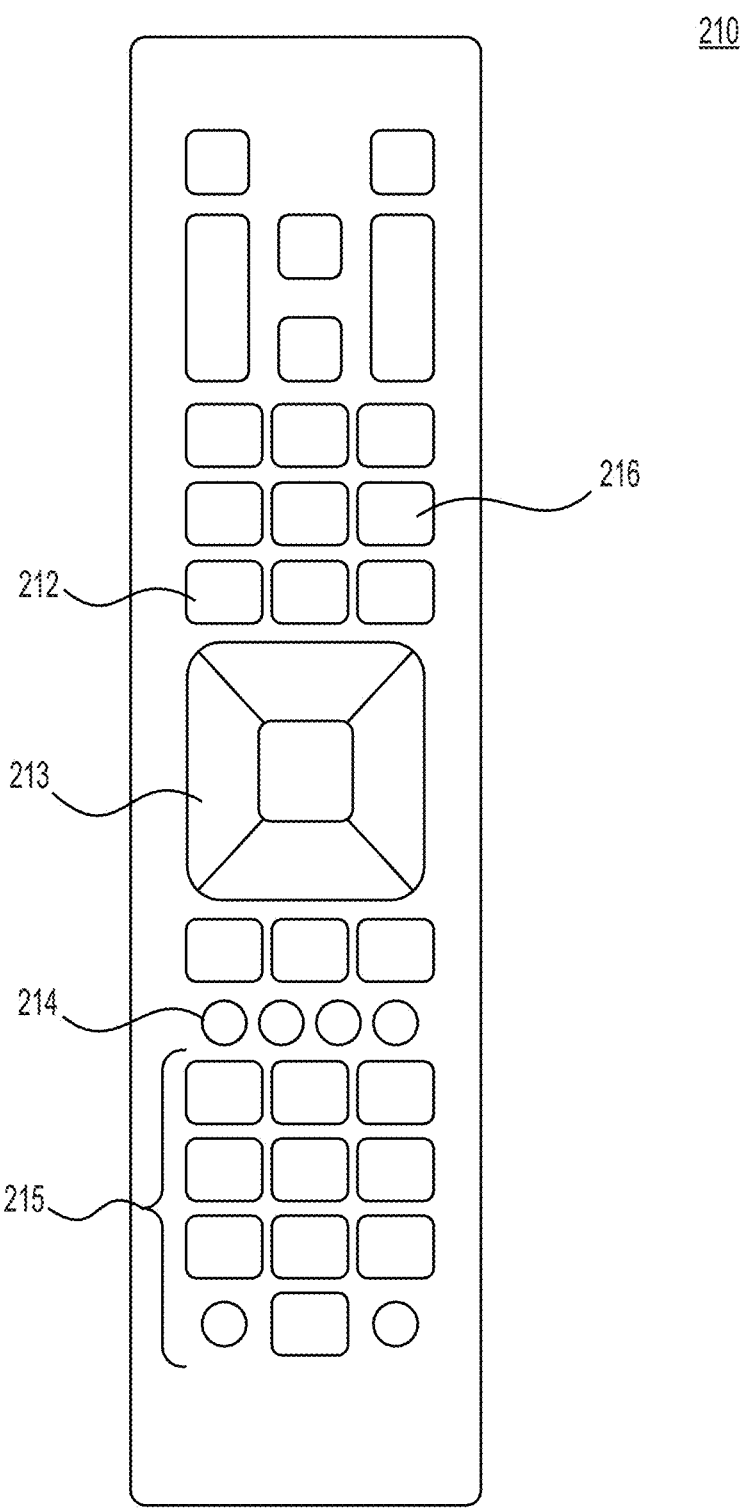
FIGS. 2A and 2B illustrate example non-pointer controllers that may be used with the focus system of FIGS. 1A and 1B to navigate the Focused U/I.

FIG. 2A illustrates a (remote, wireless) control device a user may employ to navigate a user interface. In FIG. 2A, remote control 210 includes guide button 212, arrow and scroll selection keys 213, shortcut buttons 214 (in an example, a user may program specific shortcuts), key pad (search) buttons 215, and record button 216. The remote control 210 may be supplied as a component of a user device such as the smart TV 30 of FIG. 1A.

Figure 2B:
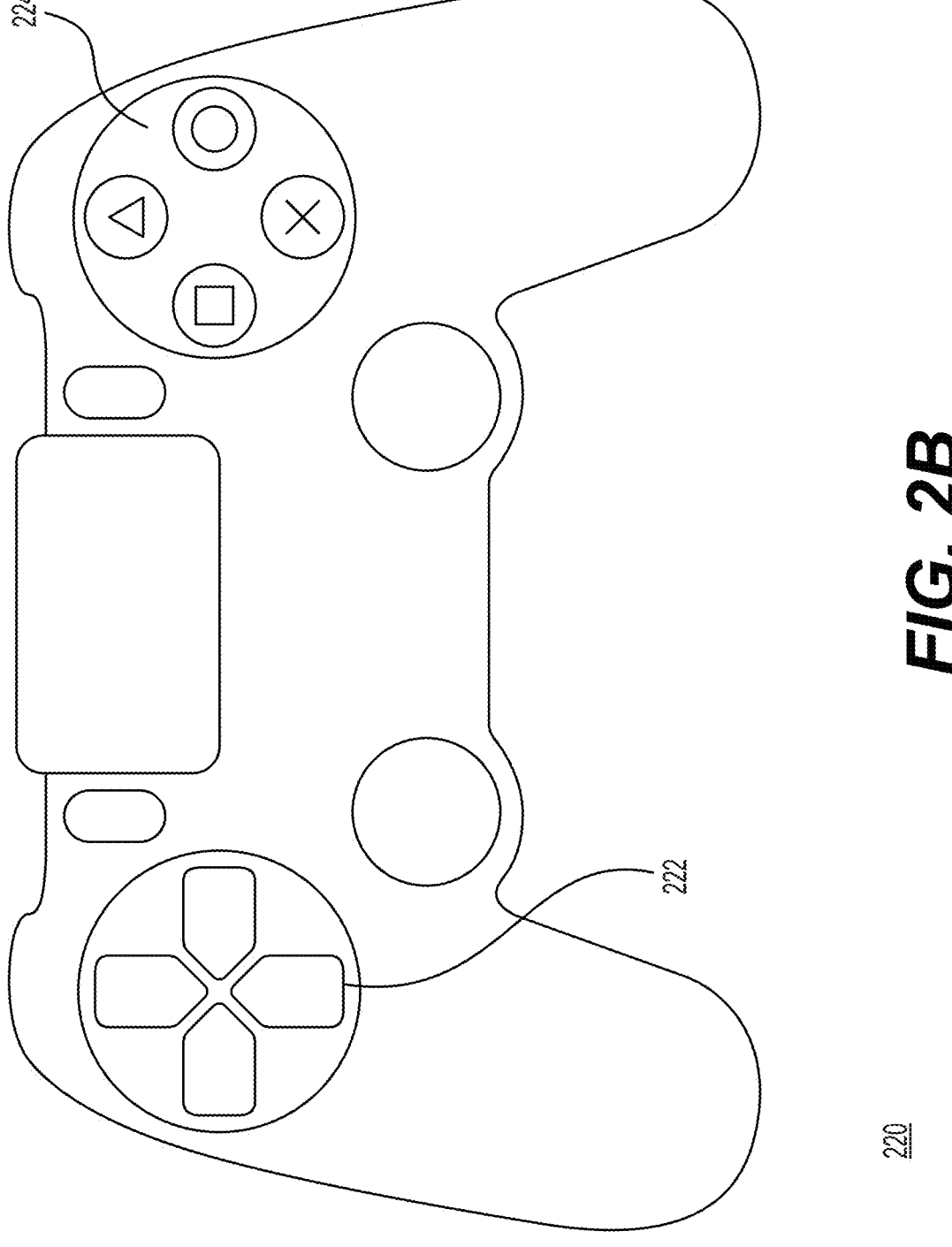

FIG. 2B illustrates a control device for use with the game box 32 of FIG. 1A. In FIG. 2B, game box controller 220 includes navigation keys 222 and selection keys 224. In an optional configuration, the game box controller 220 could include a joystick (not shown) for navigating the user interface The control devices of FIGS. 2A and 2B do not include a pointer feature, and the herein disclosed focus system provides improved, focus navigation when receiving signals from these pointer-less controllers. However, in an aspect, the focus system may accommodate signals emanating from a controller having a pointer feature. In this aspect, the focus system includes native support for pointer-based interactions (such as mouse input or remote control pointers like those on LG WebOS TVs), and this functionality is fully integrated into the focus system. When the focus system detects a pointer, the focus system enters a dedicated pointer mode, where visual focus is displayed only when the pointer hovers directly over a focusable element. Internally, however, the focus system maintains a persistent focus state, allowing the focus system to resume navigation seamlessly if a user switches back to keyboard or remote control input. This design eliminates the need to manually reset or track focus across input modes. Pointer interactions fully comply with the system's architectural rules, including strict delegation to leaf elements only, propagation of focus through bubbling, and input-based restrictions that can prevent certain elements from being focused by pointer or keys. For example, an element may be designated as "pointer-only" focusable to support click-based controls like carousel arrows. Thus, in pointer mode, the focus system allows use of alternative behaviors, visual feedback, or interaction logic that applies only when the focus input is pointer-based, allowing for a more tailored experience when needed. Additionally, the focus system automatically manages transitions between pointer and directional input. If a user moves a pointer away and presses a navigation key, the system resumes from the last valid internal focus, ensuring continuity and avoiding unexpected behavior. This integrated approach guarantees that the focus system remains predictable, robust, and input-agnostic, without requiring any duplication of logic or extra configuration.

Figure 2C:
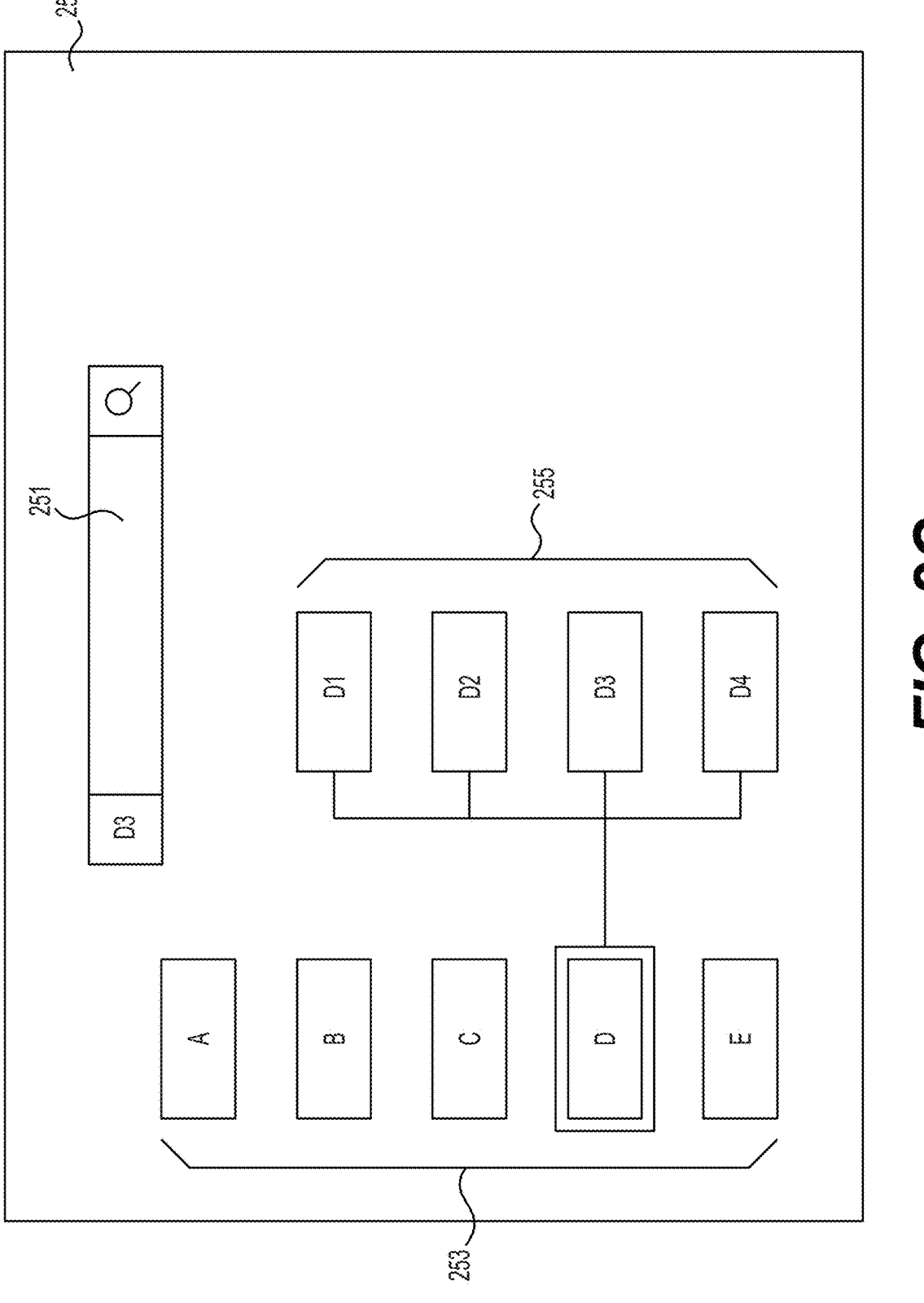
FIG. 2C illustrates an example Focused U/I.

FIG. 2C illustrates an example Focused U/I 250 as it may be displayed on device 30 of FIG. 1B. The Focused U/I 250 is associated with a search engine program for an on-line retailer. The Focused U/I allows users to select and purchase specific items, provided those items are available, or in stock. The Focused U/I 250 includes a search selection window 251 in which a user may enter a search term, and a list 253 of search fields within a searchable database. If the user selects a search field from the list 253, the search is limited to data entries within the selected search field. In an aspect, selection of a search field produces a sub-list 255 of more restrictive search entries (i.e., Child elements of a Parent element from the list 253). Additional hierarchies may be provided in the Focused U/I 250. In an aspect, should no items be available or in stock for element D2 of sub-list 255, then element D2 would not be displayed in sub-list 255. In another aspect, when no element D2 items are available, the element D2 is displayed, but is not focusable.

Figure 3A:
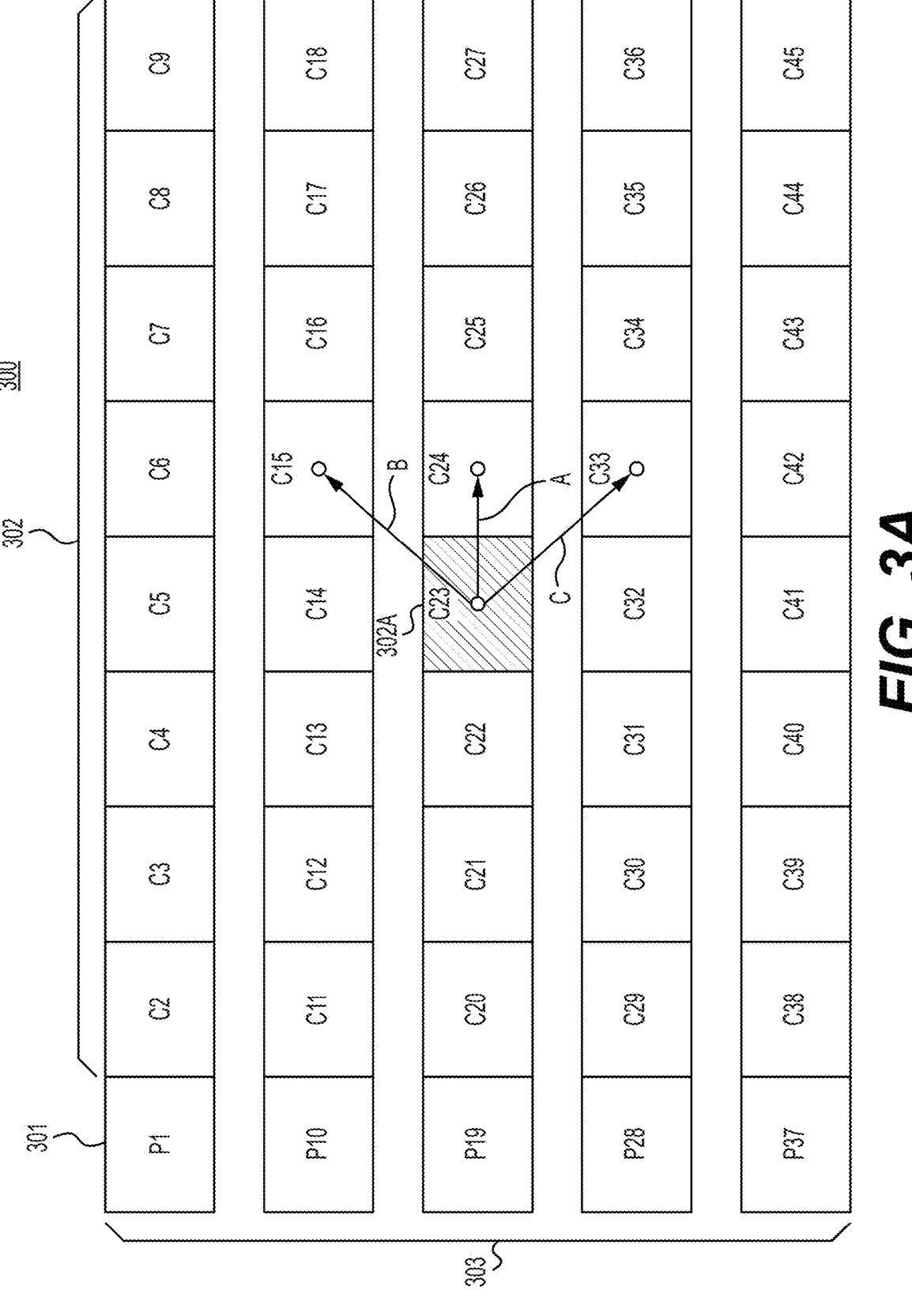
FIGS. 3A-3D, 4A-4F and 5A-5N illustrate example Focused U/Is and manipulation of elements therein by employment of user devices.
Figure 3B:
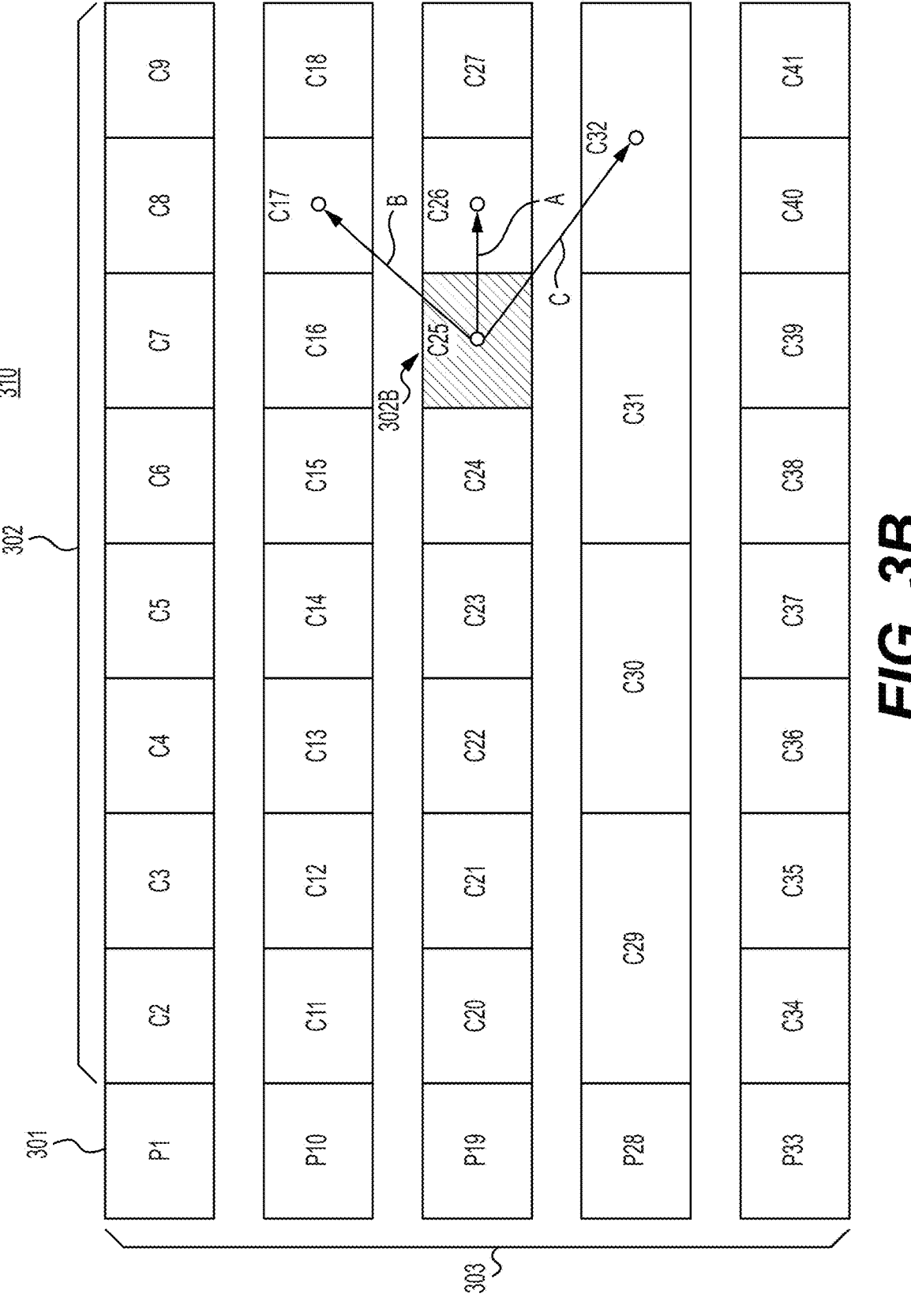
Figure 3C:
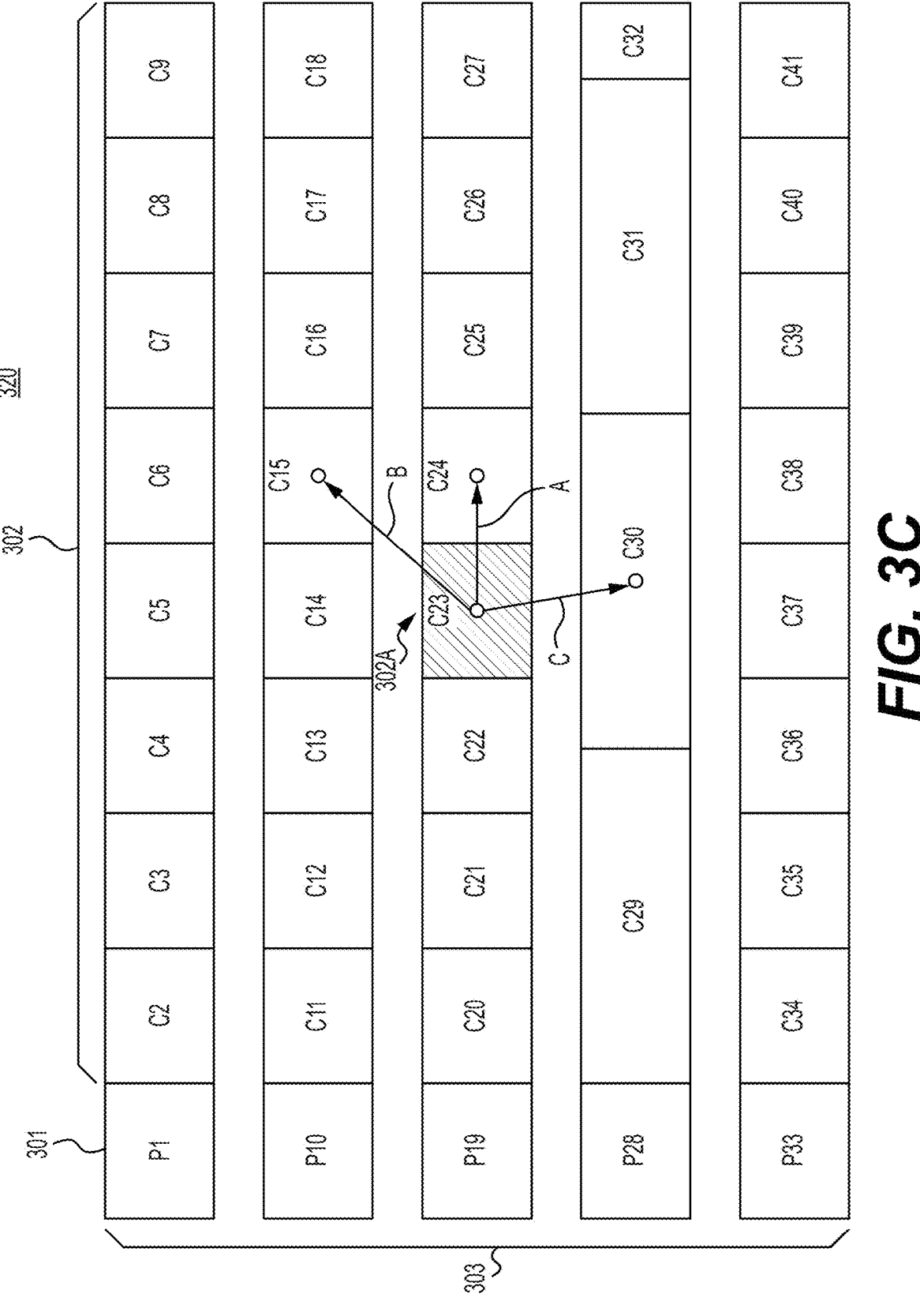

FIGS. 3A-3C illustrate Focused U/I examples that display content without reference to a time base. That is, the illustrated programs are available for selection and viewing at any time although specific content items may change periodically.

FIG. 3A illustrates example Focused U/I 300 is shown displaying a selection of video programs (e.g., movies and television series) in a uniform 5×9 matrix (i.e., a catalog or drawer page). Parent column 301 is followed by Child columns 302. Individual columns are combined in rows 303. Each row 303 may be a carousel row or a fixed row. In an aspect, each cell P1-C45 in the Focused U/I 300 is the same size (e.g., each is 640 pixels by 360 pixels). Cell 23 containing Child element 302A is shown highlighted to indicate the Child element 302A is "focused." In one aspect, the column 301 elements may indicate the type (genre) of content in a particular row. In another aspect, the column 301 elements merely represent a Parent element with no specific relationship to the other elements in a row other than a Parent-Child relationship. Each cell in columns 302 represents a Child element. Although Focused U/I 300 shows only letter-number designations of the cells, in an actual implementation, the Focused U/I 300 would show information related to Parent and child elements in each cell, possibly including thumbnail images or other images. In addition to information visible to the user, each cell P1-C45, and each element therein, may include metadata, rules, and other information that may not be visible to the user.

FIG. 3A also illustrates possible navigation options starting with focused Child element 302A. As disclosed herein, navigation options may be based on spatial relations among the elements, and a Spatial Navigation Algorithm (which may incorporate or cooperate with the Selection Score Algorithm of Equation 1) may execute to select elements for focus. Alternately, or in addition, the focus system may employ one or more imperative or declarative rules when selecting elements for focus. In FIG. 3A, selection is shown occurring among Child elements; however, navigation back to Parent elements is possible, and the focus system could calculate a navigation movement from a Child element to a Parent element. Returning to navigation away from Child element 302A using spatial navigation, and assuming the user "scrolls right," the focus system could select Child elements from cells C24 or C25, since each of these cells are directly in line to the right of the cell containing Child element 302A (that is, the centroids of each cell are in a straight, horizontal line). However, moving to the right from Child element 302A, the Spatial Navigation Algorithm may score other Child elements to the right of the column containing Child element 302A, such as Child elements in cells C15 or C33. As can be appreciated from Equation 1 above, the angular penalty of moving to Child element of cell C15 may preclude its selection. Considering the three Child element cells C15, C24, and C33, the Child element in cell C24 most likely would have the lowest score from application of Equation 1, and application of the Spatial Navigation Algorithm most likely would select Child element of cell C24 for focus.

FIG. 3B illustrates Focused U/I 310, which is similar to the Focused U/I 300 of FIG. 3A. However, the row headed by Parent element P28 includes Child element cells that are larger than Child element cells in the other rows. Thus, the illustrated Child element selection operation differs slightly in that the focus system computes path C from the centroid of cell C25 (Child element 302B) to the centroid of cell C32. Assuming selection of the "nearest" cell, the focus system likely would select the Child element of cell C26, since the distance over path A is shortest because unlike path B, there is no angle penalty for path A. Selection of a Child element in cell C32 is unlikely because, in addition to the angular penalty, the longer horizontal component of the distance between centroids of Child element cells C25 and C32 imposes an even large negative value to the selection score.

FIG. 3C illustrates Focused U/I 320, which differs from Focused U/I 300 in that cells C29-C32 are larger than cells C15 and C24. A situation of U/Is with unequal cell sizes in not uncommon. However, the herein disclosed treatment of such unequal-size cells, and corresponding Child elements, differs from current element selection systems, and represents a technological improvement over such current element selection systems. As can be seen in FIG. 3C, the Child element of cell C23 (Child element 302A) is in current focus. The focus system may operate to select the next Child element for focus, and, assuming the user scrolls right, the two "closest" Child elements are in cells C30 and C15. Thus, the Spatial Navigation Algorithm can be applied to choose between paths A, B, and C, and the score attributed to each of paths A, B, C determines which Child element will be selected. The larger cell size for the cell C30 means the cell centroid is closer to the centroid of cell C15, which will have the effect of reducing the score generated by the Selection Score Algorithm (Equation 1) than would be the case were the cell of normal size, thereby increasing the likelihood that the Child element of cell C30 is selected for focus. However, the Child element of cell C24 would still most likely receive the lowest score and hence would be selected for focus.

Figure 3D:
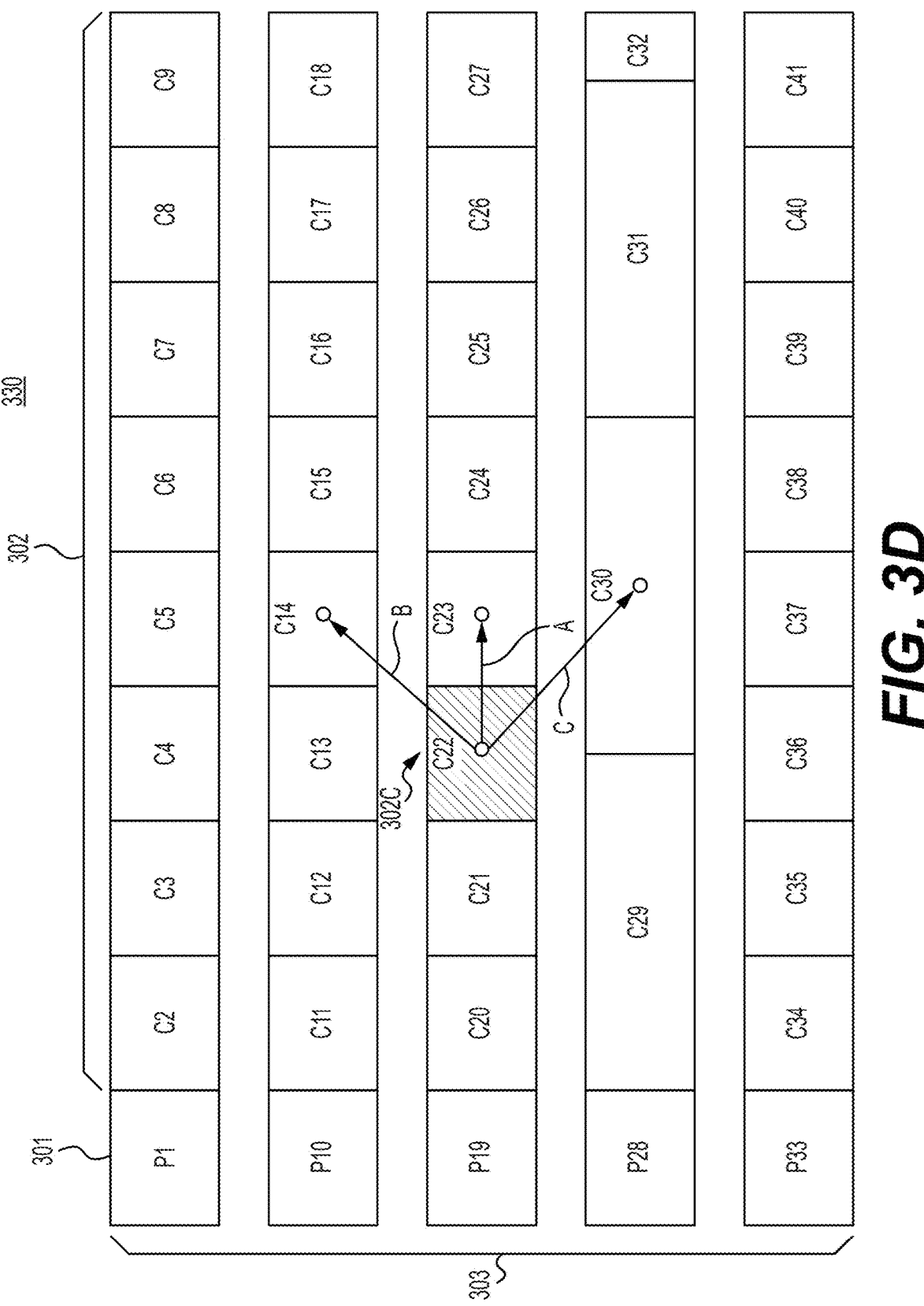

FIG. 3D illustrates yet another example of a Focused U/I (U/I 330) in which cell sizes are uneven, and further illustrates the effects of relative cell size on the next element selection process. Note that both paths A and B likely would receive a lower selection score than would path C.

Another aspect of the herein disclosed focus system is that in the U/Is of FIGS. 3A-3D, selection of a U/I element (i.e., shifting focus to a selected U/I element) may cause the displayed U/I to shift or realign in both the horizontal and vertical directions such that the focused U/I element remains in the center of the display screens on which the U/Is are displayed. In this aspect, after a user have viewed the program referenced by the selected U/I element, the displayed U/I returns to a display with the just-viewed program's U/I element centered in the display screen. In a variation, the displayed U/I may shift to the left to display the selected U/I element as the left-most element in the row, or shift down to display the selected U/I element in the top row of the U/I.

FIGS. 4A-4F illustrate example focus system U/I pages displaying menus and program lists (represented as selectable and focusable elements)

Figure 4A:
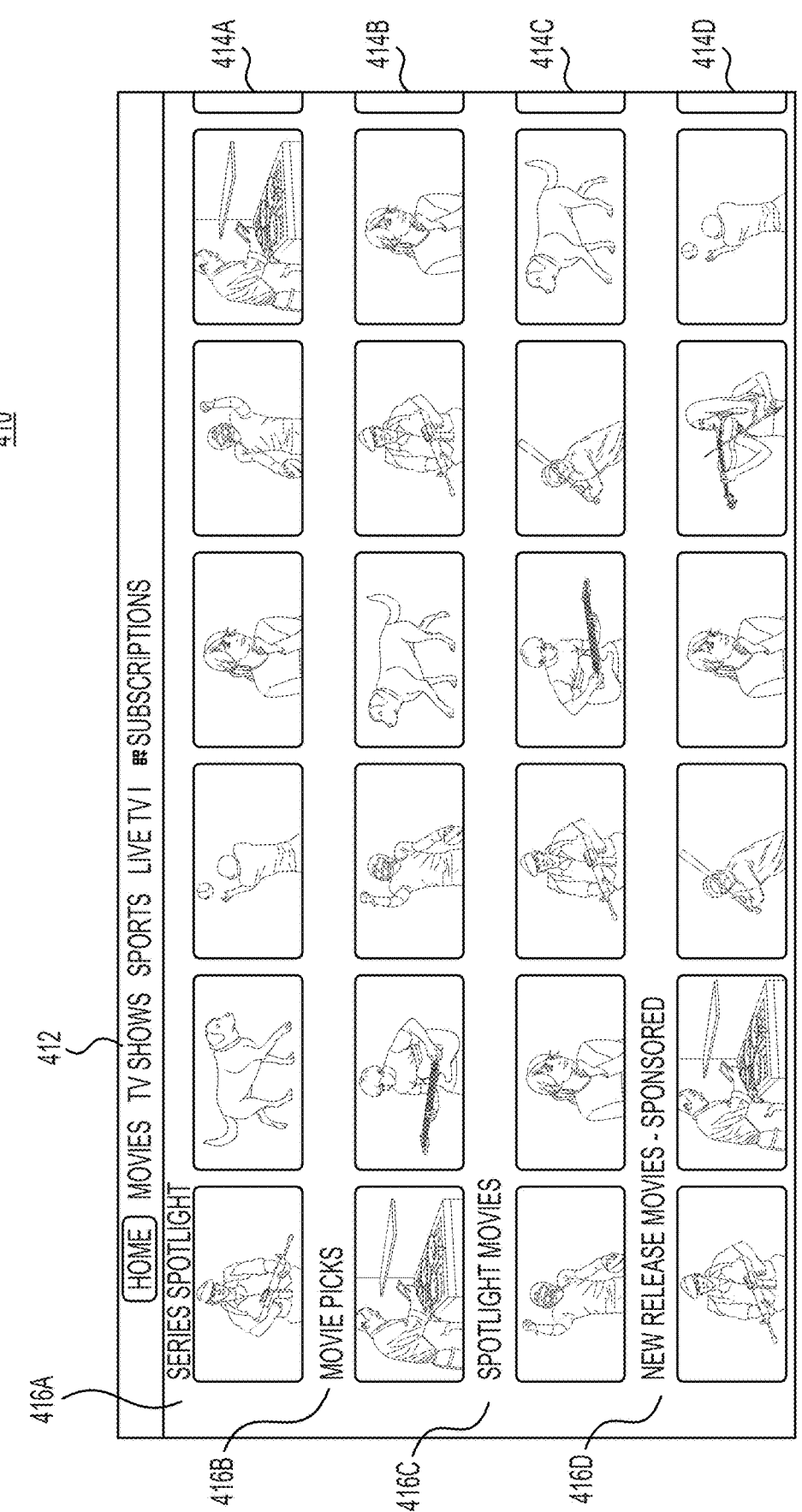

FIG. 4A illustrates a focus system page of a Focused U/I 410 in which content is available on a context basis represented in modal menu 412. Focused U/I 410 also shows rows 414A-414D of elements, the elements representing programs, with sub-context descriptions 416A-416D, as Parent elements and Child elements.

Figure 4B:
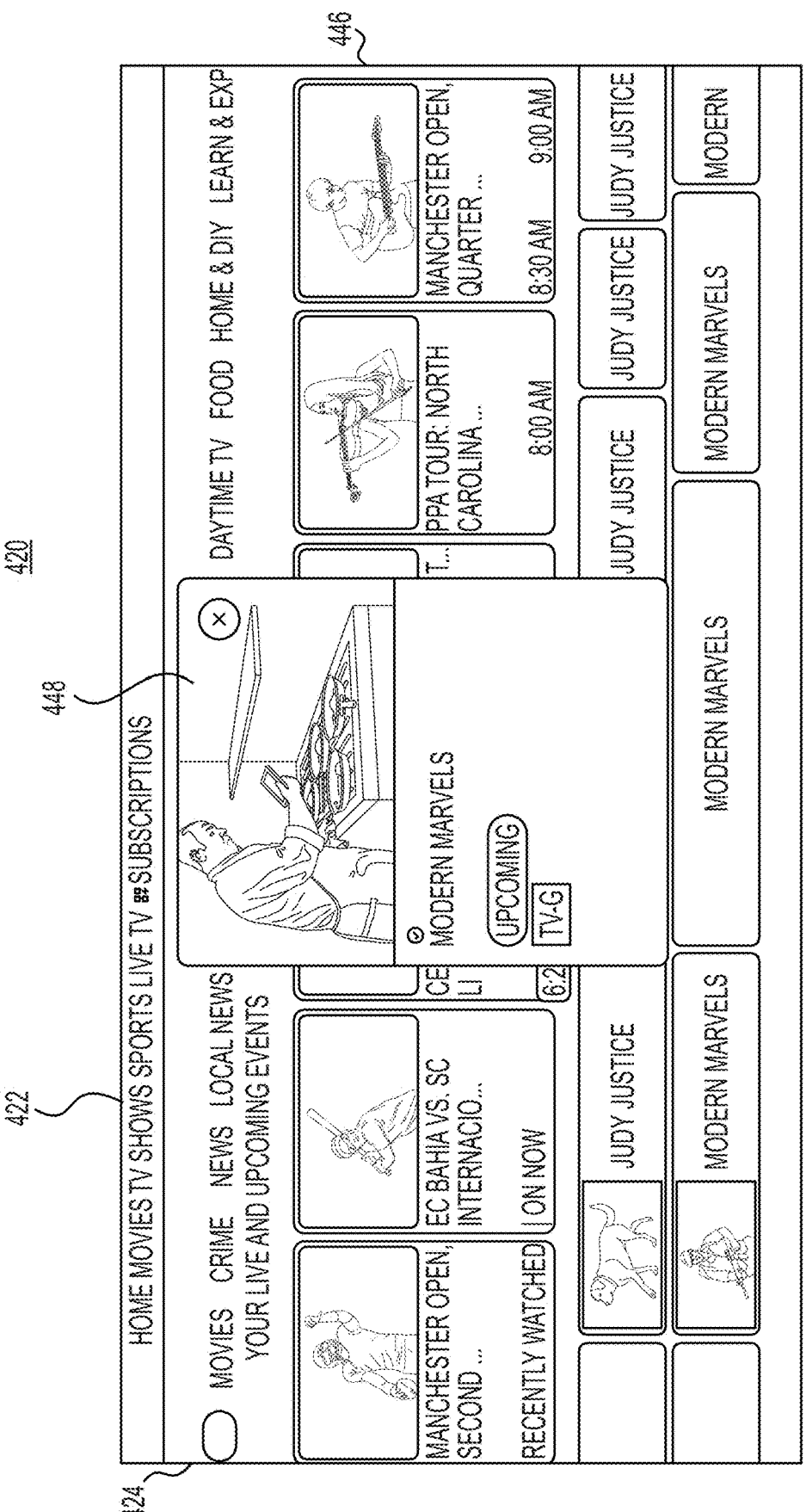

FIGS. 4B-4F illustrate additional example user interfaces. In FIG. 4B, U/I 420 includes main menu 422, and a user has selected LIVE TV, resulting in display of sub-menu 424, with program content 426 in a catalog format. In addition, the user has selected element 448 for viewing, resulting in a "pop-up" view of element 448. In an aspect, selection of LIVE TV establishes a boundary between main menu 422 and content 426 such that the user cannot select elements from the main menu 422 unless the currently focused element 448 is closed (by selecting and activating the X shown in the pop-up view.

Figure 4C:
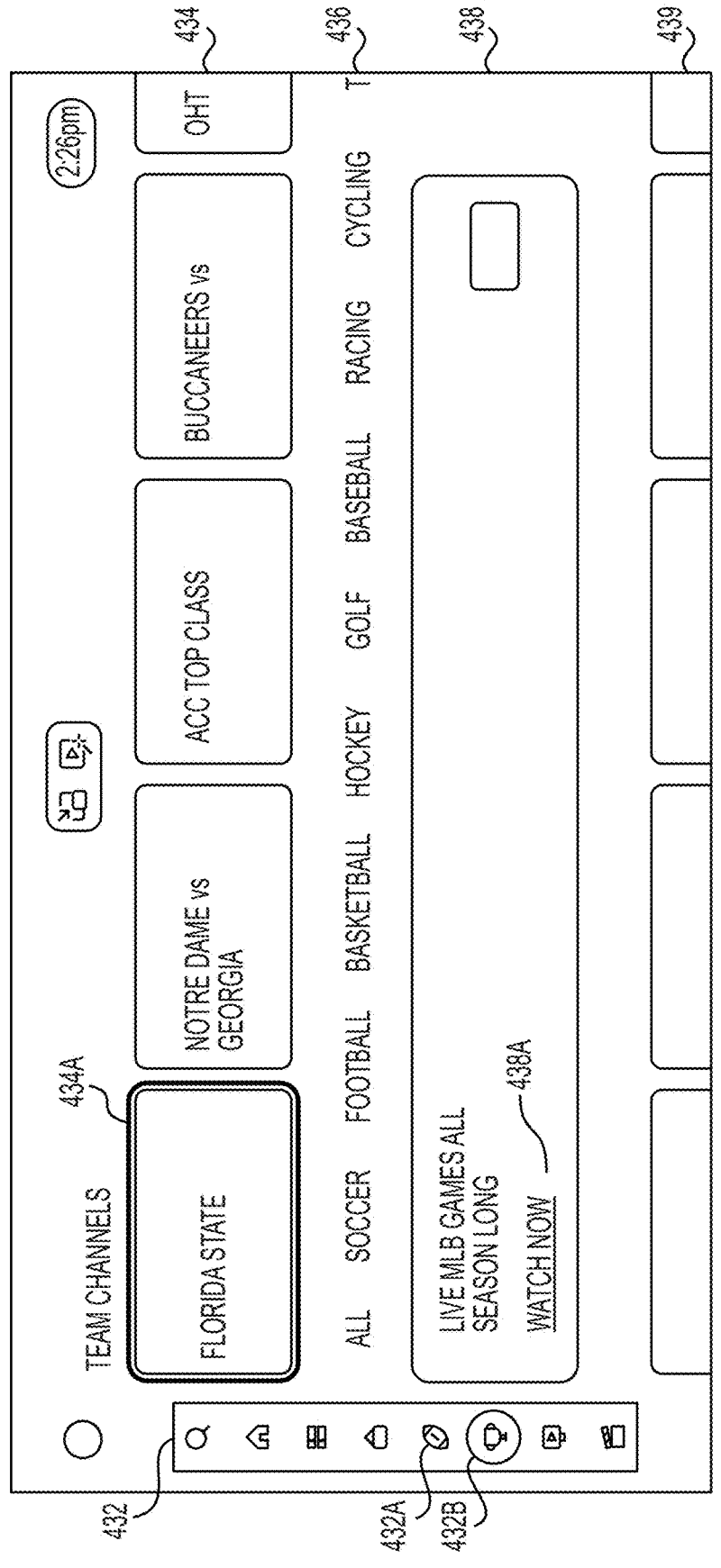

FIG. 4C illustrates U/I 430 displaying a modal menu 432, with modes represented by icons, including football icon 432A. The U/I 430 also shows a team channel carousel 434, a scrollable sports menu 436, a subscription channel 438, and other carousel menus 439. In FIG. 4C, the user has selected team channel, Florida State, and the corresponding element is highlighted, showing element 434A is "in focus."

As can be seen in FIGS. 4B and 4C, the focus system provides, at the application 50 (see FIG. 1B), user personalization features within the Focused U/I. For example, the focus system allows a user to create a user profile that may have its own user preferences such as a set of favorite channels, followed series, and recordings. The user's preferences are maintained separately through operation of the application 50. Users also may mark channels as favorites, which then appear at the top of the U/I. The focus system further allows users to implement genre filters in order to display content based on specific categories such as Sports, Travel, and Lifestyle. This feature helps users to quickly find content that matches their interests. Still further, a user may create a Cloud-based personalized hub where the users can manage Cloud-based DVR recordings and watchlists, and allows the user to access content across different devices. Finally, the focus system allows a user to follow specific sports teams and sports leagues. These and other personalization features make the U/I more user-centric.

Figure 4D:
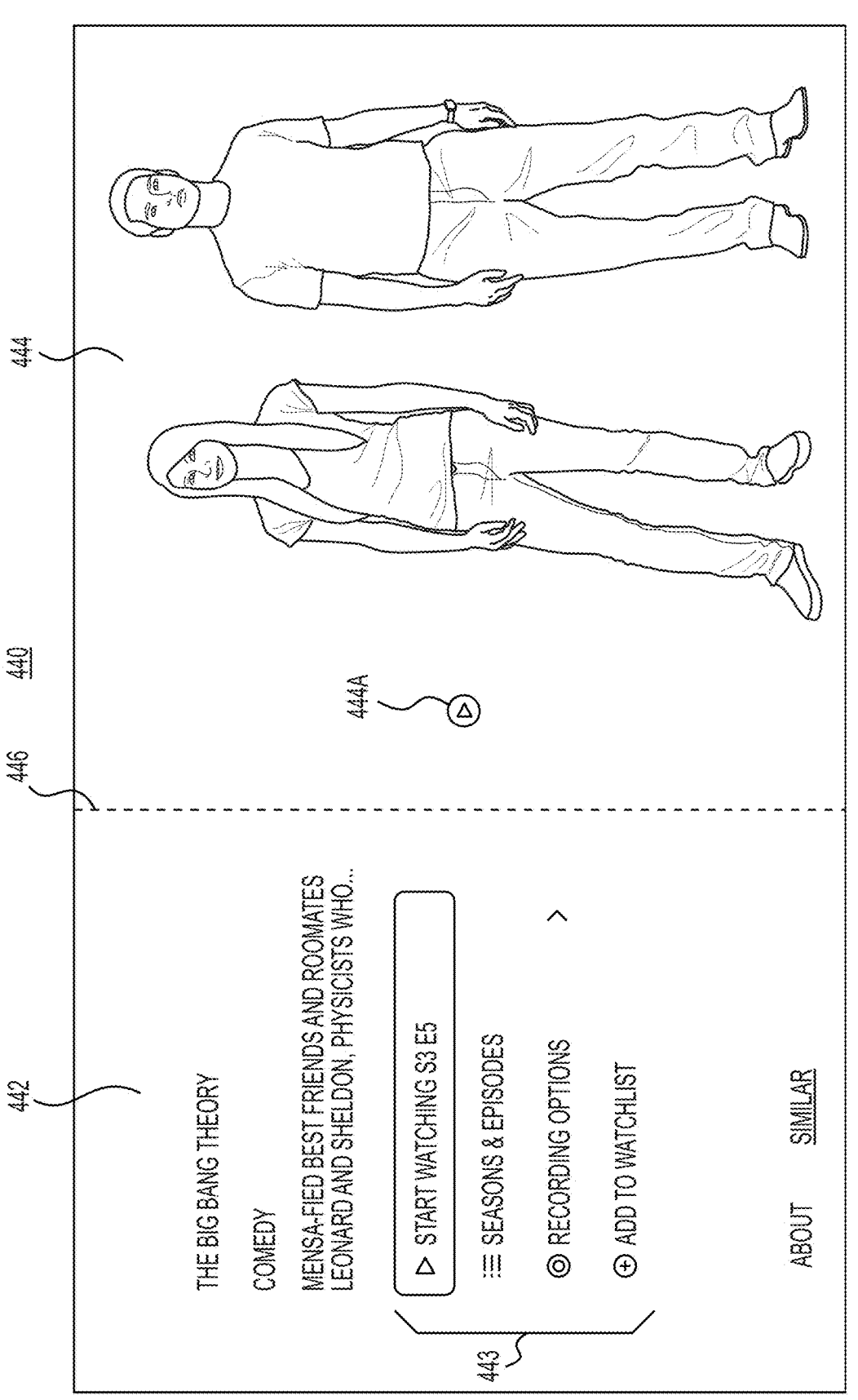

FIG. 4D illustrates U/I page 440 showing a selection of a followed series with a modal menu 442 providing selection buttons 443, separated, by boundary 446, from a large thumbnail section 444 having a start playing button 444A. The boundary 446 is not visible to the user. The boundary 446 prevents selection of a button 443 while the selected program is playing. Alternately, selection of a button 443 stops playing of the selected program. Once the selected program begins playing, the modal menu is removed from display.

Figure 4E:
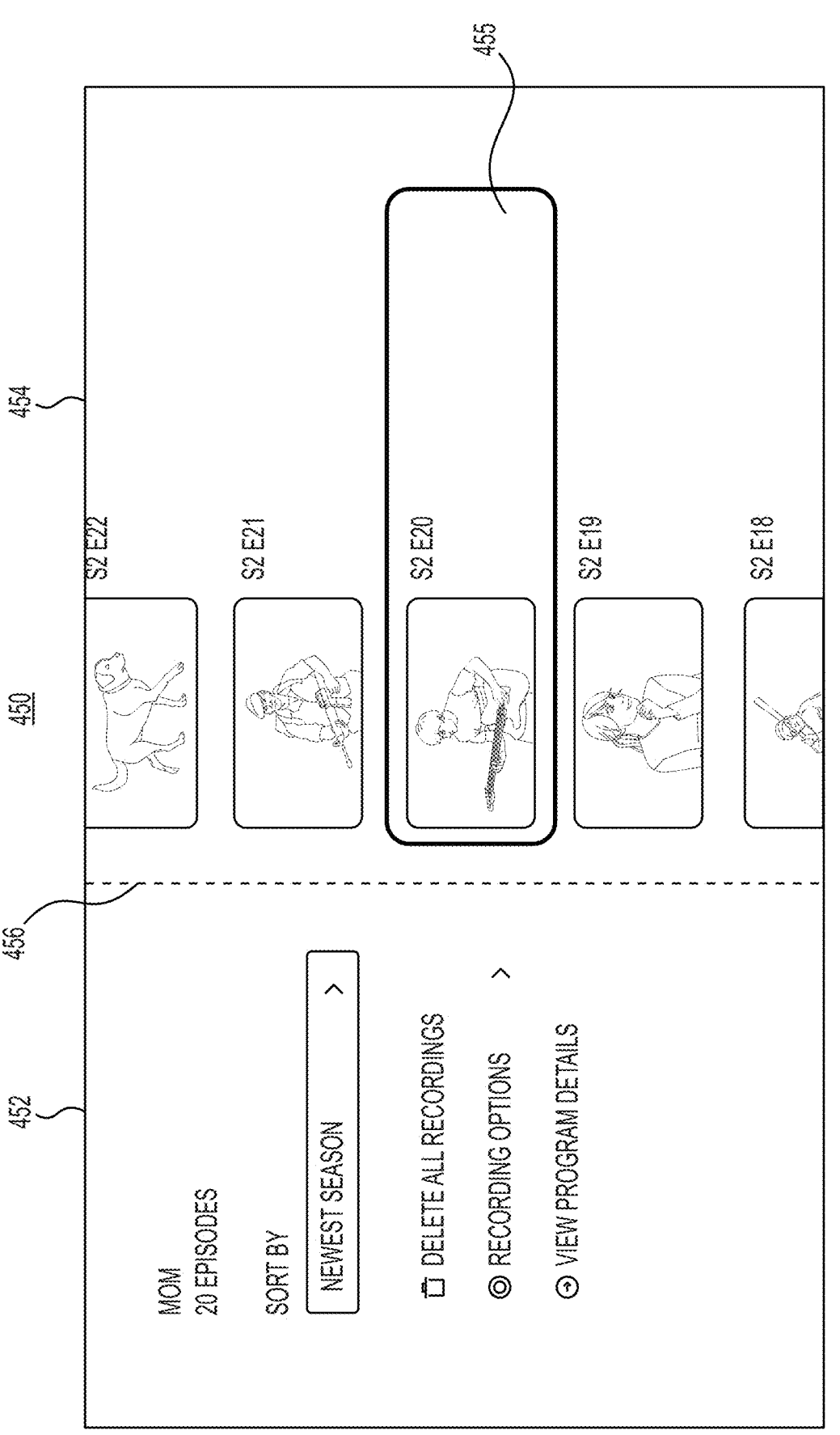

FIG. 4E illustrates U/I page 450 showing modal menu 452 separated by boundary 456 from a listing 454 of available episodes for the selected "newest" season. Season 2, episode 20 element 455 is selected and highlighted (i.e., focused), preventing return to the modal menu 452. Were the element 455 no longer focused, a user would be able to manipulate the modal menu 452.

Figure 4F:
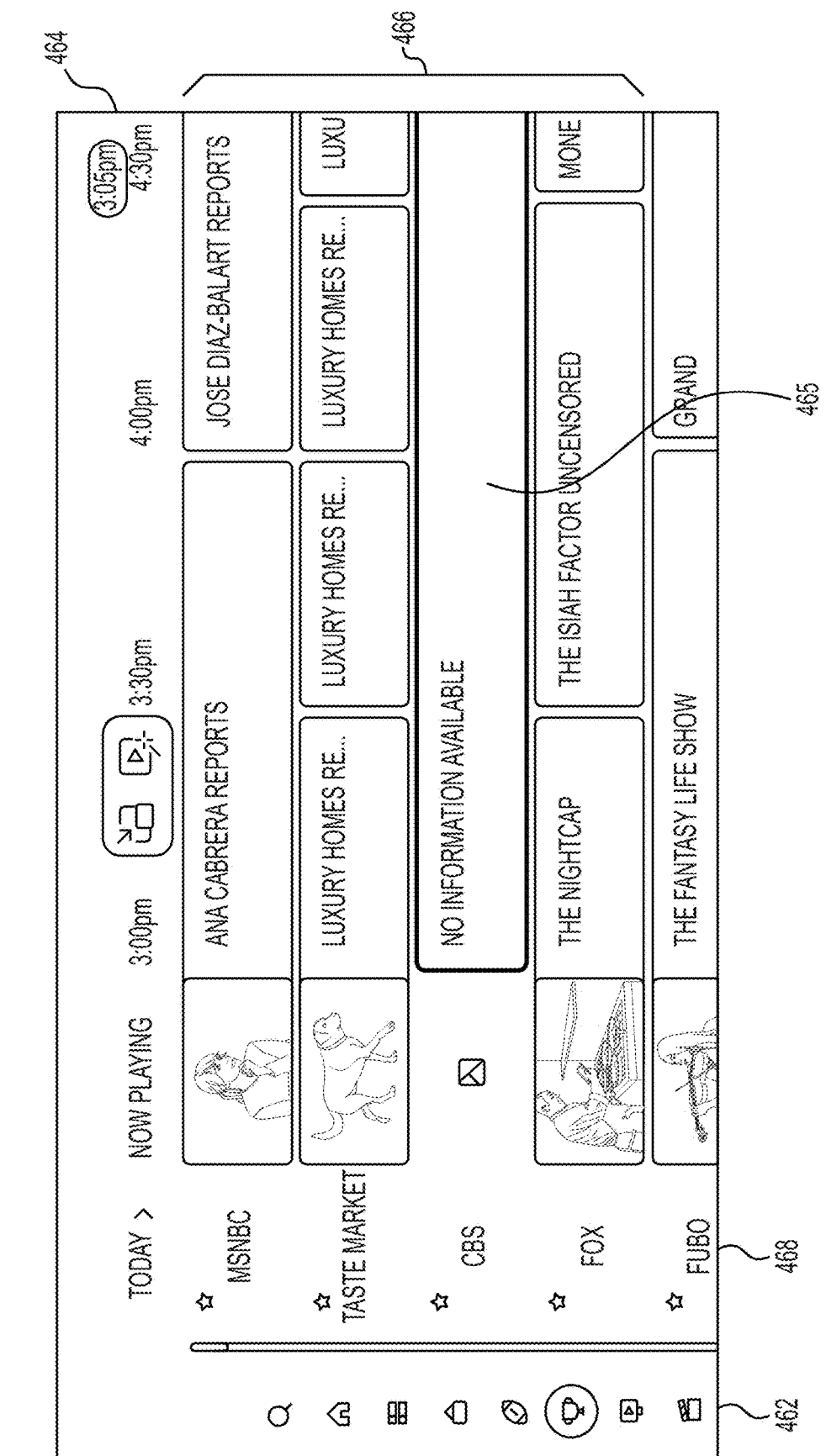

FIG. 4F illustrates a time-based U/I 460 having a modal menu 462, time menu 464, and channel menu 468. User Interface 460 shows rows, or carousels 466 of available programs (i.e., elements). Element 465 is shown selected, and focused, but no information as to the element 465 is available.

FIGS. 5A-5J illustrate follow-on element selection processes under a variety of different conditions. In some examples, the processes may use the Spatial Navigation Algorithm disclosed herein in conjunction with the Selection Score Algorithm of Equation 1 to find a candidate element having a lowest score. The scoring, in an aspect, is based on distances between cell centroids, with a penalty applied for any centroid-to-centroid measurements that are other than 0 degrees/270 degrees or 90 degrees/180 degrees. In the context of a U/I element, centroid distances may be measured in pixels, and angles are measured in radians or degrees. FIGS. 5A-5J also rely on a term, "in the given direction," which, in an example, is the direction of motion selected using the arrow key of a remote control device, a joystick, or a voice command ("scroll left").

In an example, a focus application is stored on a user device and is executed by a processor of the user device (i.e., a front-end device). The focus application is a component of the herein disclosed focus system (a back-end component) The back-end component receives a request, from the focus application executing on the user device, to provide content for display on the user device and a corresponding focusable user interface (U/I) listing elements referencing individual content items in the content to be provided, and transmits the requested content and a data structure from which the focusable U/I may be generated. The data structure includes data and metadata corresponding to the individual content items, and the data structure allows the focus application to construct and present the U/I as a focused U/I on a display of the user device The focus application provides a spatial navigation component for focusing one element at a time on the U/I; a Parent-Child-Sibling element navigation component for selecting elements of the U/I for focus; and an element bubbling component for refocusing an element for display as a focused element on the U/I following a loss of focus condition. In an aspect, the spatial navigation component determines a relationship between a current focused element and one or more candidate elements to replace the current focused element, constructs an element selection area of the focused U/I, with element selection confined to candidate elements within the element selection area; determines a straight line distance between the current focused element and each candidate element within the element selection area; and scores each candidate element based on the straight line distance. In another aspect, one or more candidate elements are in an angular relation with the current focused element, and the scoring further includes adjusting the scoring based on a magnitude of the angular relation. In yet another aspect, the straight line distance is measured in pixels between a current focused element references and a candidate element reference. In still another aspect, the focus application provides a margin of error (MOE) component and the MOE component applies a margin of error as an adjustment to the current focused element reference, which has the effect of changing a size of the candidate element selection area. In a further aspect, only elements within the candidate element selection area having at least a portion of a side facing the current focused element are identified as candidate elements. In yet a further aspect, candidate elements are selected based on detection of a user event, wherein the user event comprises one of a scroll left operation, a scroll right operation, a scroll up operation, and a scroll down operation. Furthermore, the U/I elements may include a Root element, a Parent element, a Child element, and a Sibling element, and the focus application redistributes Child elements in a Parent-Child relationship in an order defined by the Parent element. Still further, the processor periodically sends a U/I refresh command to the focus application, and execution of the U/I refresh command reloads a U/I page to display a refreshed U/I on the user device.

FIG. 5A illustrates an element selection process in which source (currently focused) element 501 is compared to candidate elements 502 and 503 to determine which candidate element might be selected for focus. The comparison assesses straight-line distances between centroid 501A and centroids 502A and 503A, measured, for example, in pixels (the number of pixels in an image varying, for example, with the resolution of the device display) as well as angular deviation from a horizontal line emanating from centroid 501A. While elements 502 and 503 are vertically aligned with each other, neither is horizontally aligned with source element 501. Accordingly, the paths A and B each suffer an angular penalty. However, the angular penalty for path B is lower than that for path A, and thus, candidate element 502 would be selected.

FIG. 5B illustrates an element selection process that incorporates the concept of a defined candidate element selection area 510, which is established as a consequence of a user "scrolling right." As can be seen in FIG. 5B, element 512, having centroid 512A, is currently focused, and the user scrolls right, thereby establishing an element selection area to the right of an imaginary vertical line passing through centroid 512A. The focus system identifies all or part of two candidate elements (511 and 513) in the candidate element selection area 510. Using the Selection Score Algorithm of Equation 1, the focus system computes a selection score for each candidate element, using distance and angle, to find the lowest scoring candidate element. In FIG. 5B, despite the angle penalty assigned to candidate element 511, with centroid 511A, it is selected over candidate element 513, with centroid 513A, because candidate element 511 has a lower selection score than does candidate element 513. Also note that in FIG. 5B, while selection is based on centroid-to-centroid distances and angles, other measurement points may be employed. Finally, FIG. 5B illustrates application of an declarative rule for candidate element selection, namely a declarative rule than any element with 50% or more of its area within the boundary of selection area 510 is a candidate element. Accordingly, element 511 qualifies as a candidate element.

Figure 5C:
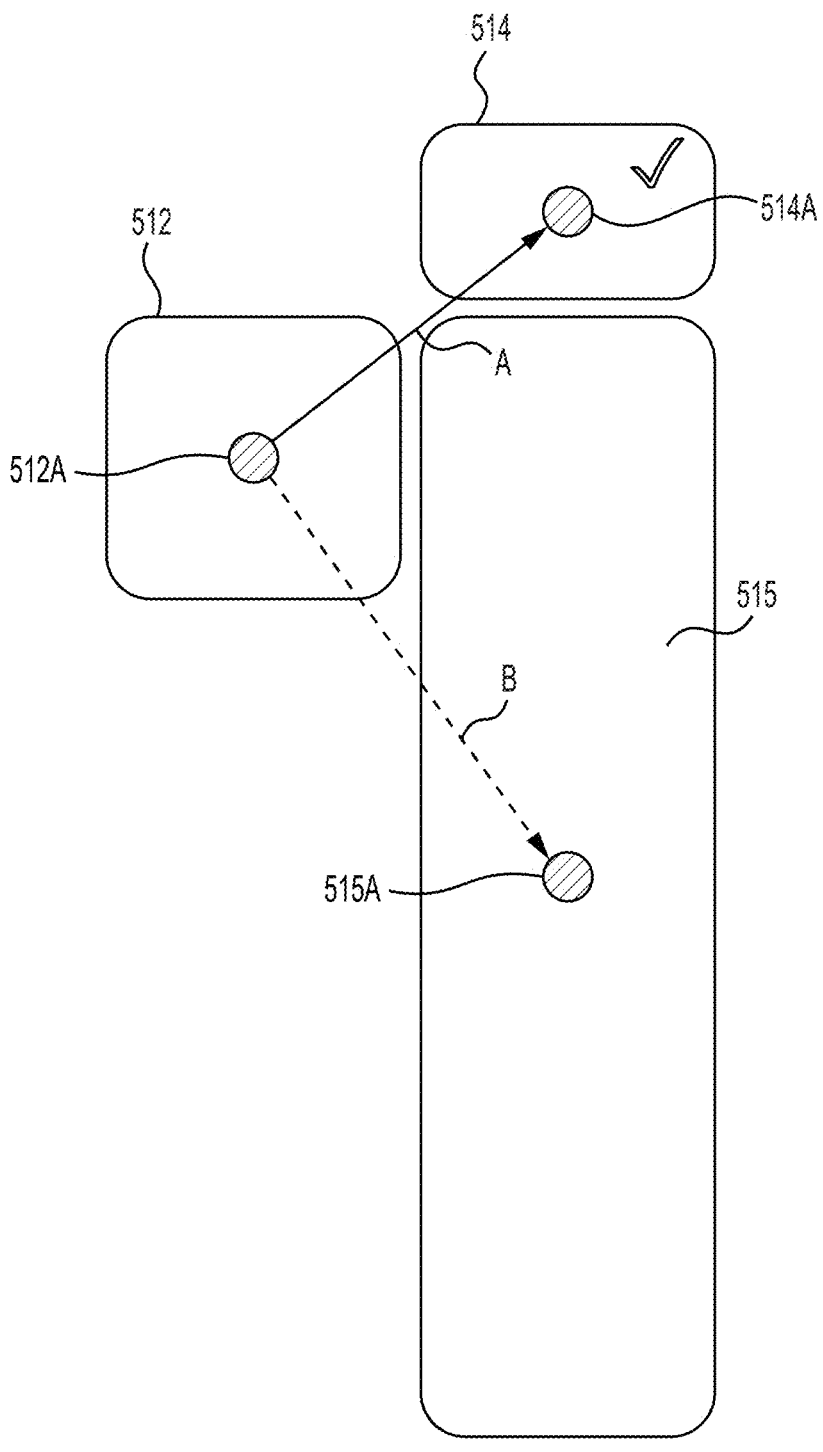

FIG. 5C illustrates an modified element selection process that starts at the center of the currently focused element 512 (i.e., the cell centroid 512A) and selects a side facing the desired direction (e.g., when scrolling right, examine the left sides of the candidate elements). Any candidate elements that have a surface area facing the right side of the focused element 512 are considered. The selection process produces selection of a candidate element 514, the score for path A (centroid 512A to centroid 514A) being lower that the score for path B (centroid 512A to centroid 515A of element 515), in the desired direction (i.e., to the right).

Figure 5D:
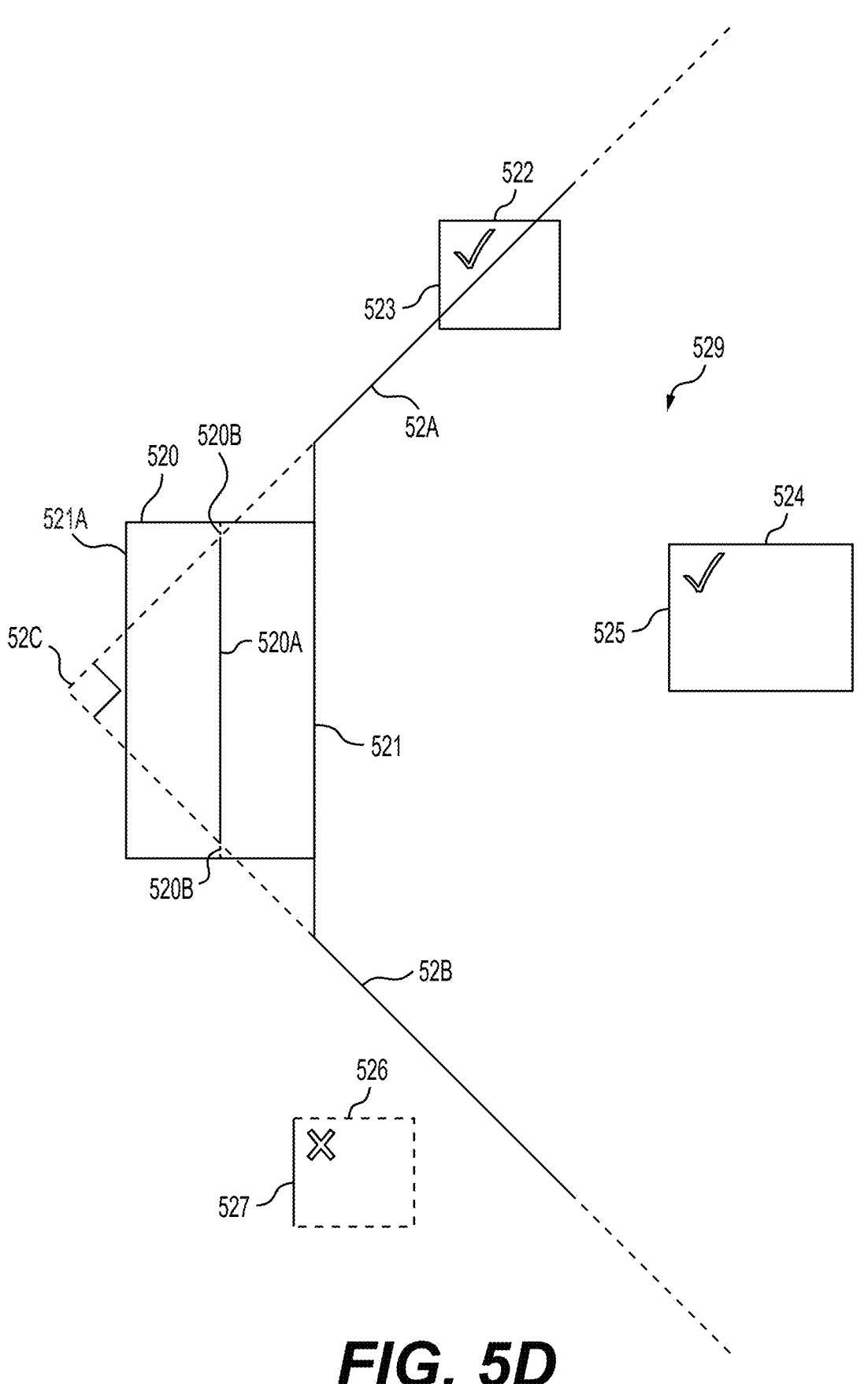

FIG. 5D illustrates use of an alternative candidate element selection area, and its deployment in identifying a next element for focus. In FIG. 5D, focused element 520 is currently in focus, and a user "scrolls right." Upon receipt of a scroll right command or signal, the focus system may limit selection of candidate elements to those whose left side faces the right side of focused element 520. As shown in FIG. 5D, element 526 has side 527 that does not face the right side of currently focused element 520, and hence, element 526 is not selectable (as indicated in FIG. 5D by the dashed lines). Also on receipt of the scroll right signal, the focus system establishes a candidate selection area, indicated by lines 521, 52A and 52B. In the example of FIG. 5D, lines 52A and 52B extend past line 521 to form a right angle intersecting at a point to the left a left side 521A of currently focused element 520. Finally, the focus system establishes vertical line 520A, which in FIG. 5D runs through a centroid of currently focused element 520. Alternately, the vertical line could be established at the left side 521A of element 520, or at some other location relative to the position of element 520 in the user interface page. FIG. 5D also shows an implementation of margin of error (MOE) in the determination of a next focusable element. In an example, if the vertical dimension of element 520 is 360 pixels, and a 10 percent margin of error is desired, the length of line 520A would be 288 pixels, leaving 36 pixels at each end (i.e., each line 520B is 36 pixels in length). The lines 52A and 52B then intersect a centerline of element 520 at the ends of vertical line 520A, which causes the lines 52A and 52B to intersect at 52C. This establishes a selection area (in this example, selection area 529) that is somewhat smaller in area than the selection area would have been without the margin of error (MOE) adjustment. Note that angles other than 90 degrees may be used, and that MOEs other than 10 percent may be used. With the element selection area 529 established, element 524 is clearly within the selection area 29. However, at least 50 percent of element 522 also is in selection area 29, which, according to a declarative rule is sufficient. Furthermore, the left side 525 of element 524 and the left side 523 of element 522 each face the right side of element 520. Thus, both elements 522 and 524 are candidate elements. Which of the two candidate elements may be selected may be determined by computation of a selection score as per Equation 1. If the selection scores for candidate elements 522 and 524 are equal, the focus system may, using a reading direction algorithm, select candidate element 522 for focus.

Figure 5E:
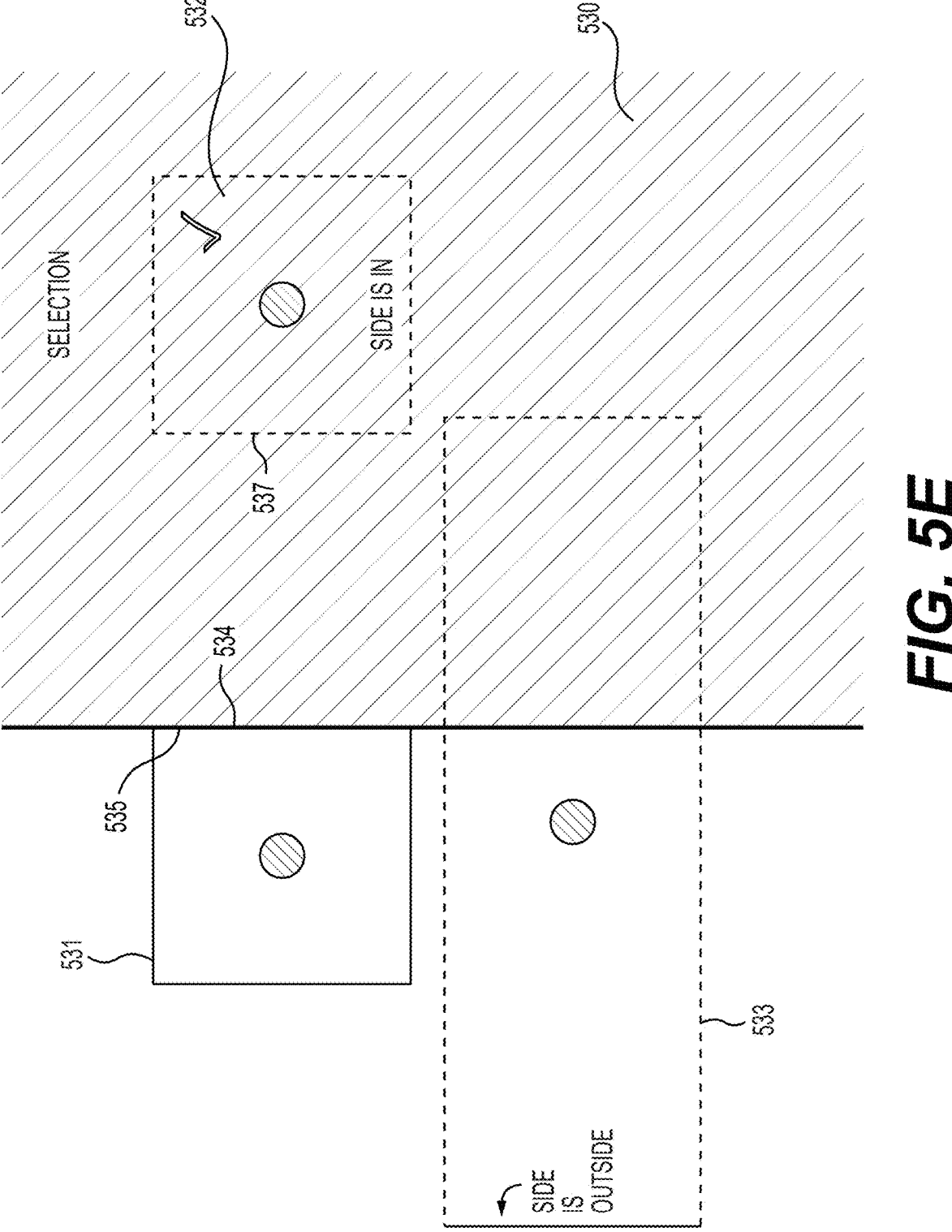

FIG. 5E illustrates an element selection process in which element 531 is currently in focus, and a user sends a scroll right signal. The focus system establishes selection area 530 with a left-hand border 534 at a right side 535 of element 531. Since a majority of element 533 is outside the selection area 530, element 533 is not considered an element for selection. However, not only is element 532 within the selection area 530, the left-hand side 537 of element 532 faces the right-hand side 535 of element 531, and element 532 is chosen as the next focusable element.

FIG. 5F(1) illustrates an element selection process that begins at the side of the source element 541 to reach the adjacent sides of candidate elements 542 and 543. Spatial navigation scores may be calcualted, and since element 542 would, as a result of an angular penalty, have a higher score, element 543would be chosen as the next focusable element.

FIG. 5F(2) illustrates currently focused element 551 and a result of an element selection process in which the selection scores for candidate elements 552 and 553 are equal, considering a distance from a right face of currently focused element 551 and centroid 553A of candidate element 553 and an equal distance to centroid 552A of candidate element 552. The focus system applies a Western reading algorithm to select element 553 as the next focusable element.

Figure 5G:
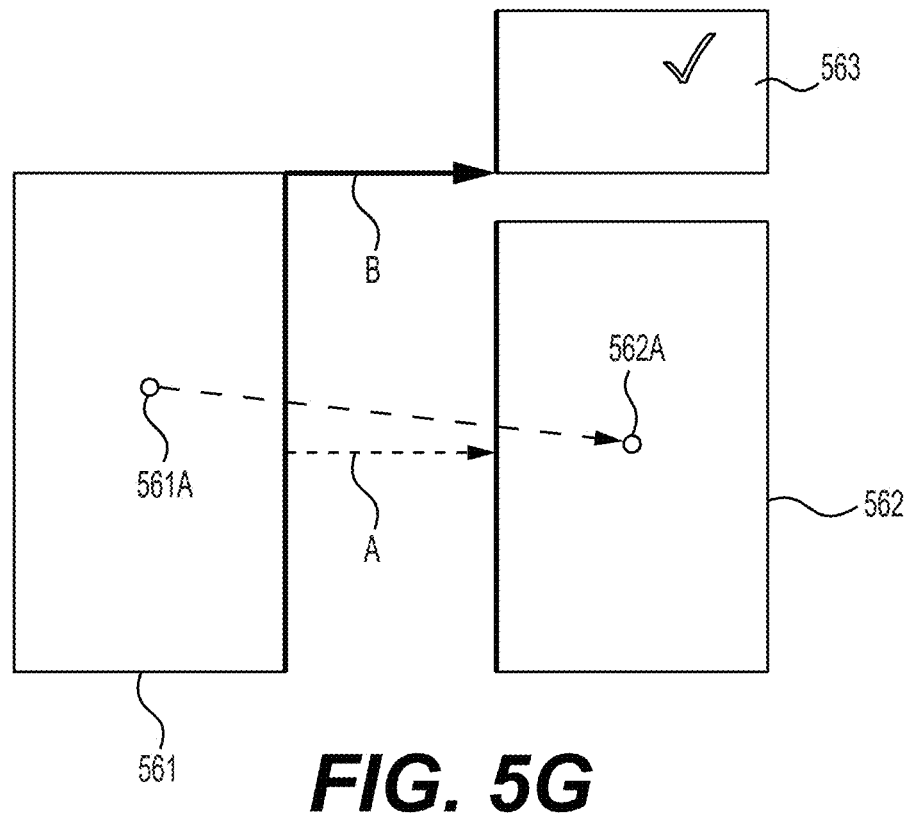

FIG. 5G illustrates another element selection process involving direct path selection followed by sorting in Western reading logic. In FIG. 5G, the selection scores (from lines A and B) between currently focused element 561, with centroid 561A, and candidate element 562, with centroid 562A, and between currently focused element 561 and candidate element 563, are equal, candidate element 563 would be selected as the next focusable element.

24

Figure 5H:
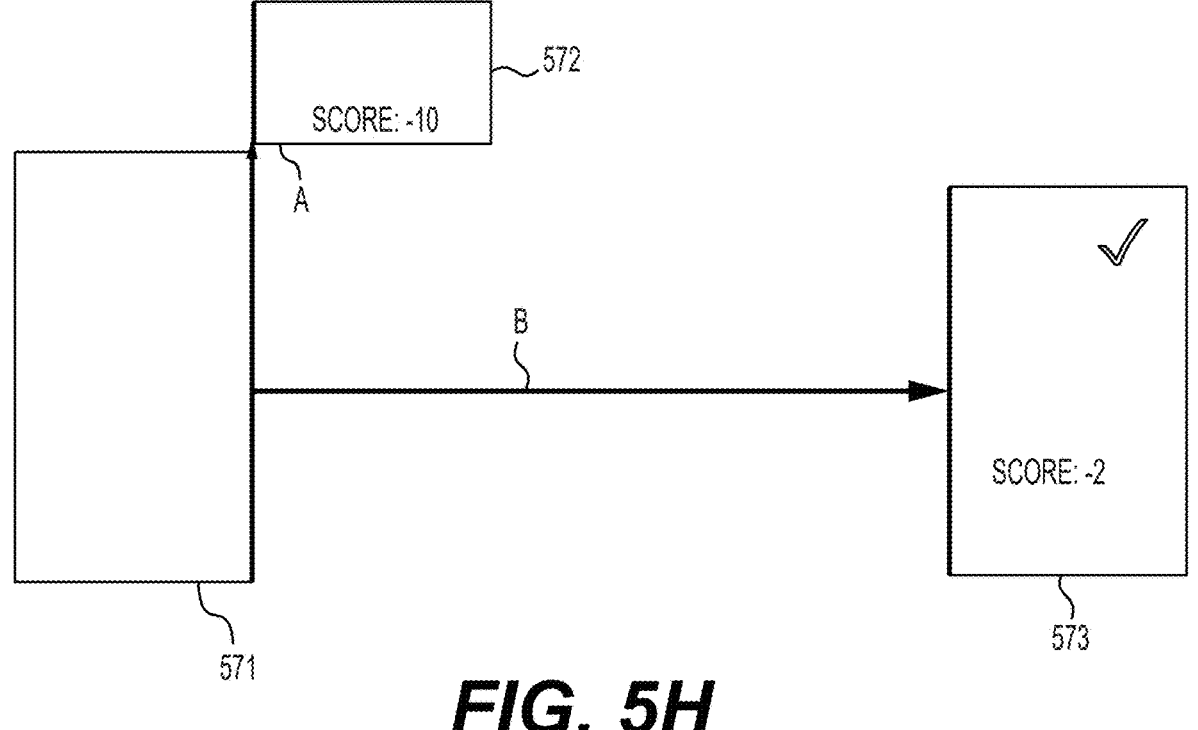
Figures 5I, 5J:
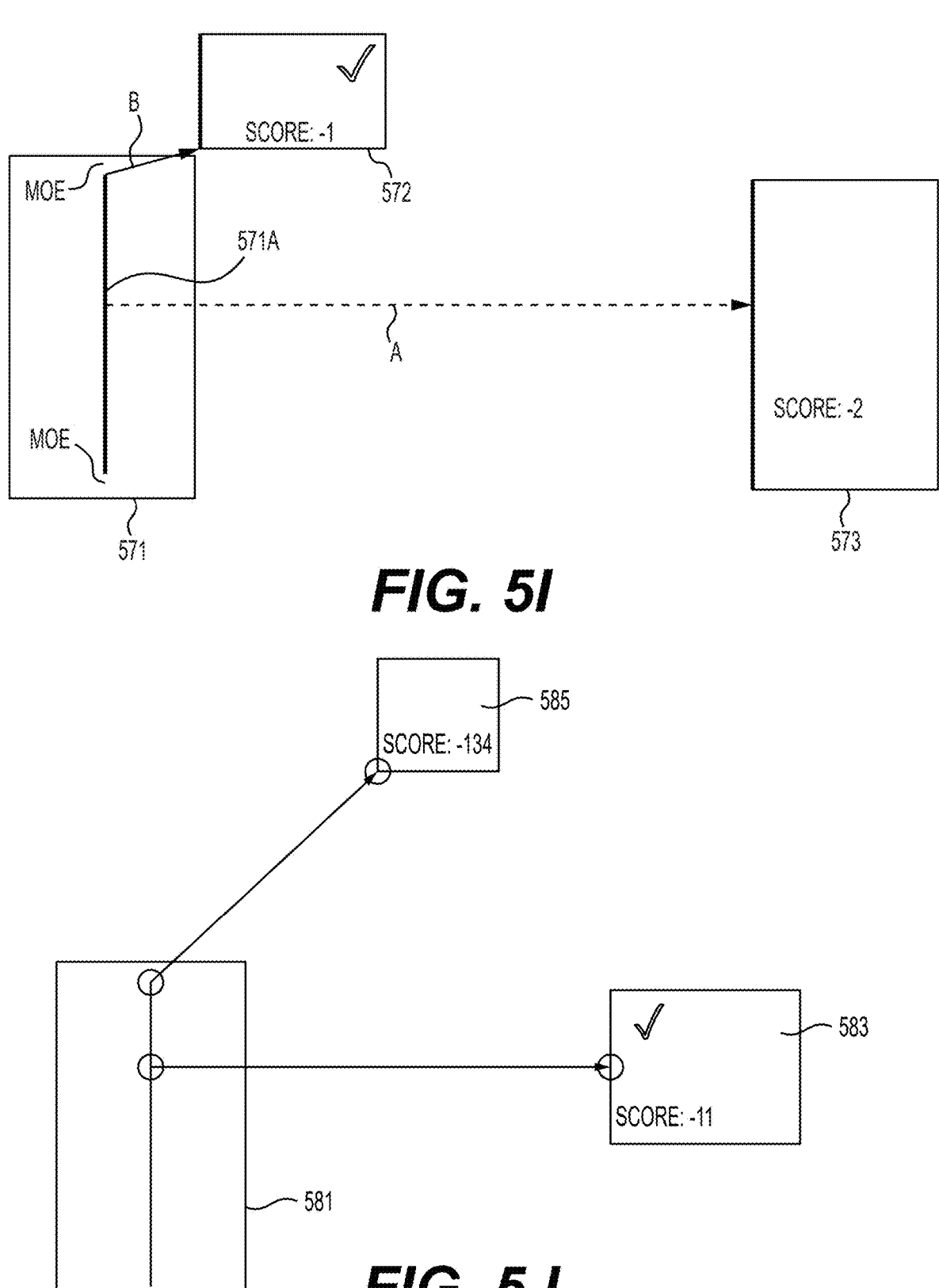

FIGS. 5H and 5I illustrate an element selection process that attempts to minimize errors by reducing the size of a starting segment of the currently-focused element. This process is disclosed above as a "margin of error" operation (see FIG. 5D). In some examples, the MOE operation has the generally undesirable effect of favoring candidate elements that are very far away from the currenlty-focused element (element 571) but have an angle close to the maximum possible. In FIG. 5H, candidate element 572 receives a score of −10 because of an angular penalty, while candidate element 573, which is physically much further from currently focused element 573 receives a selection score of −2, making candidate element 573 selectable as the next focused element.

FIG. 5I illustrates an element selection process that overcomes the anomalous operation shown in FIG. 5H. In FIG. 5I, the element selection process uses a starting line 571A for selection score computations that is moved back to the center of the currently-focused element 571, and a MOE is adopted.

FIG. 5I also illustrates how, in order to establish a Parent-Child relationship, the focus system uses a spatial calculation of the relationship with the goal of selecting the Child element closest to the top left corner (following Western reading direction). The focus system starts with a Parent element, identifies potential Child elements (here, elements 572 and 573), and determines an element side closest to the desired axis of starting line 571A using a dot product formula. The focus system takes each endpoint of a side and applies the following formulas, where 1 represents one endpoint of the candidate's side and 2 represents the opposite endpoint.

$$x = \text{childcornerX} - \text{parentcornerX} \qquad \text{EQN 2}$$

$$y = \text{childcornerY} - \text{parentcornerY} \qquad \text{EQN 3}$$

$$\text{dotproduct} = x1 \times x2 + y1 \times y2 \qquad \text{EQN 4}$$

In FIG. 5I, the focus system compares the scores obtained and selects the lowest one as the target to determine the best selection path. The focus system then calculates the closest axis on the candidate element's segment and measures the distance between the Parent element's corner and that axis. The focus system repeats these steps for all Child elements and chooses the Child element with the score closest to zero per Equation 5.

$$\text{score} = 0 - \text{distance} \qquad \text{EQN 5}$$

FIG. 5J provides another illustration of implementation of a margin of error in the candidate element selection process. In FIG. 5J, a truncated centerline in currently focused element 581 is used to establish a MOE, and distances and angular deviations between element 581 and element 585 on the one hand and between element 581 and 583 on the other produces a lower score (closer to zero) for candidate element 583. In both calculations, a point closest on the centerline is used to determine the shortest path between the elements. The margin of error has an effect on the score between elements 581 and 585 but not between 581 and 583. Since angular deviation is considered undesirable, the result conforms to the imperative and declarative rules of the focus system.

Figure 5K:
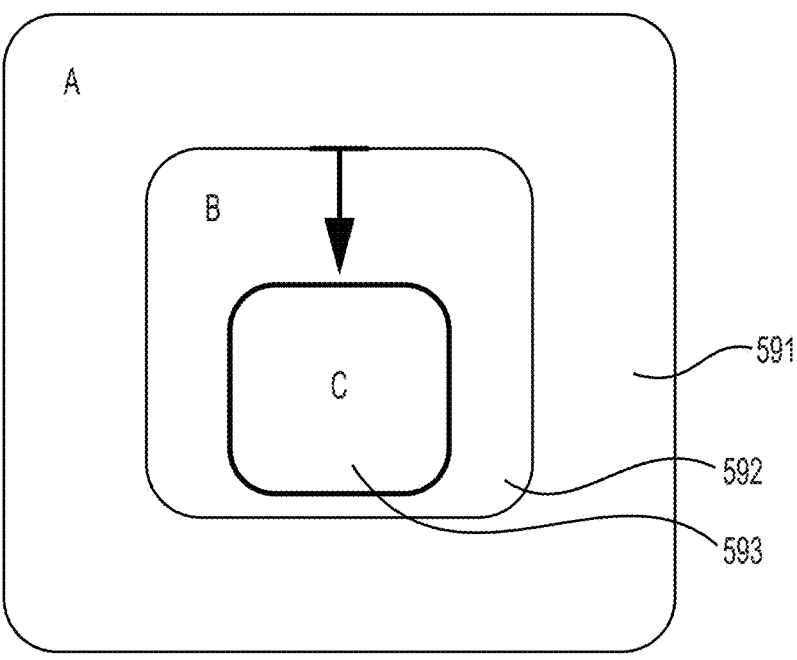
Figure 5L:
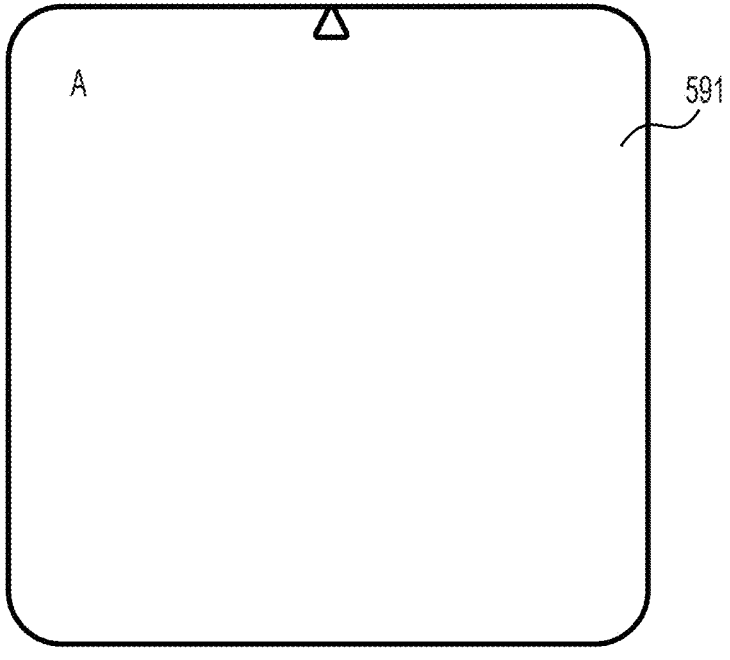
Figure 5M:
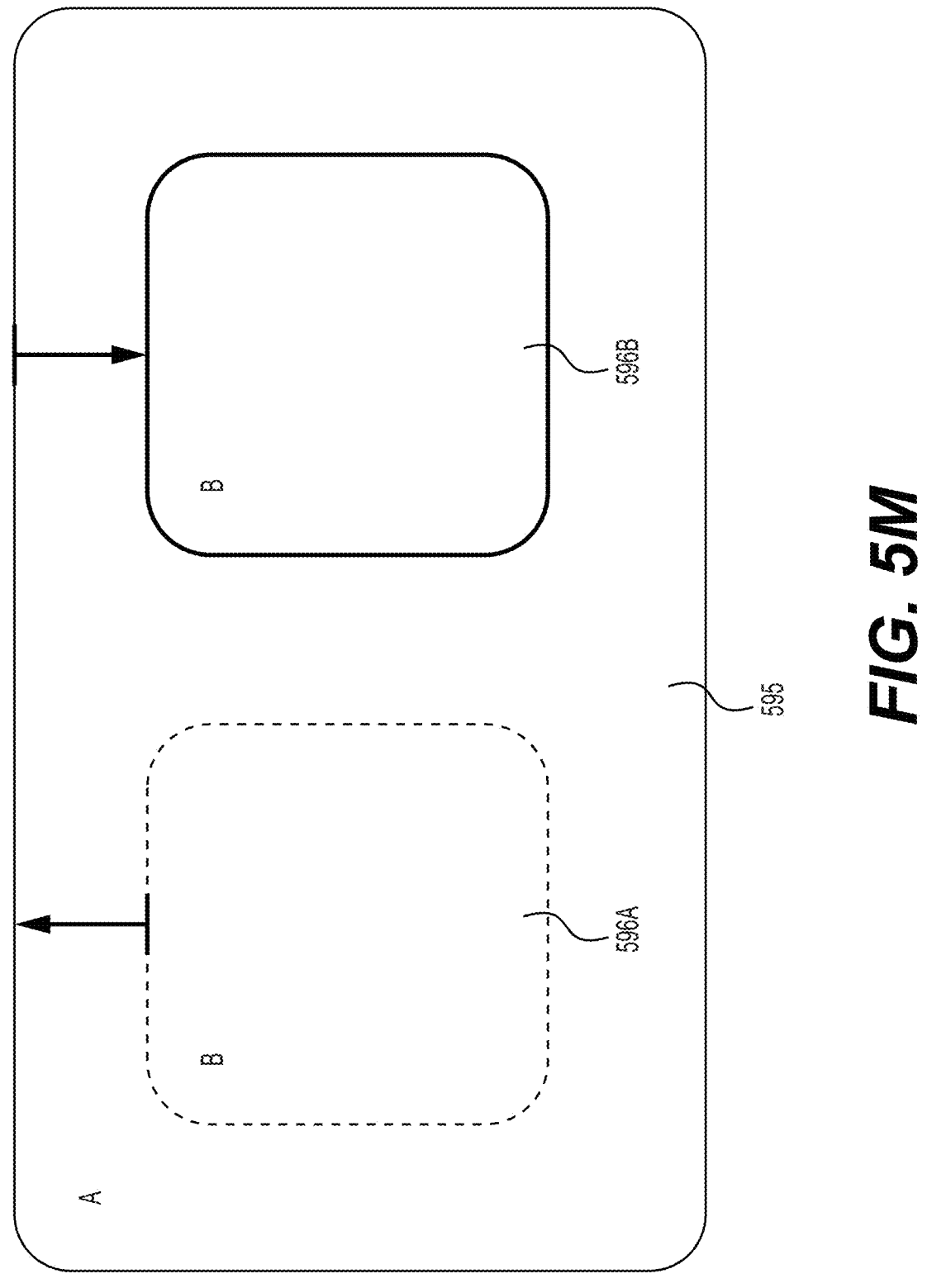
Figure 5N:
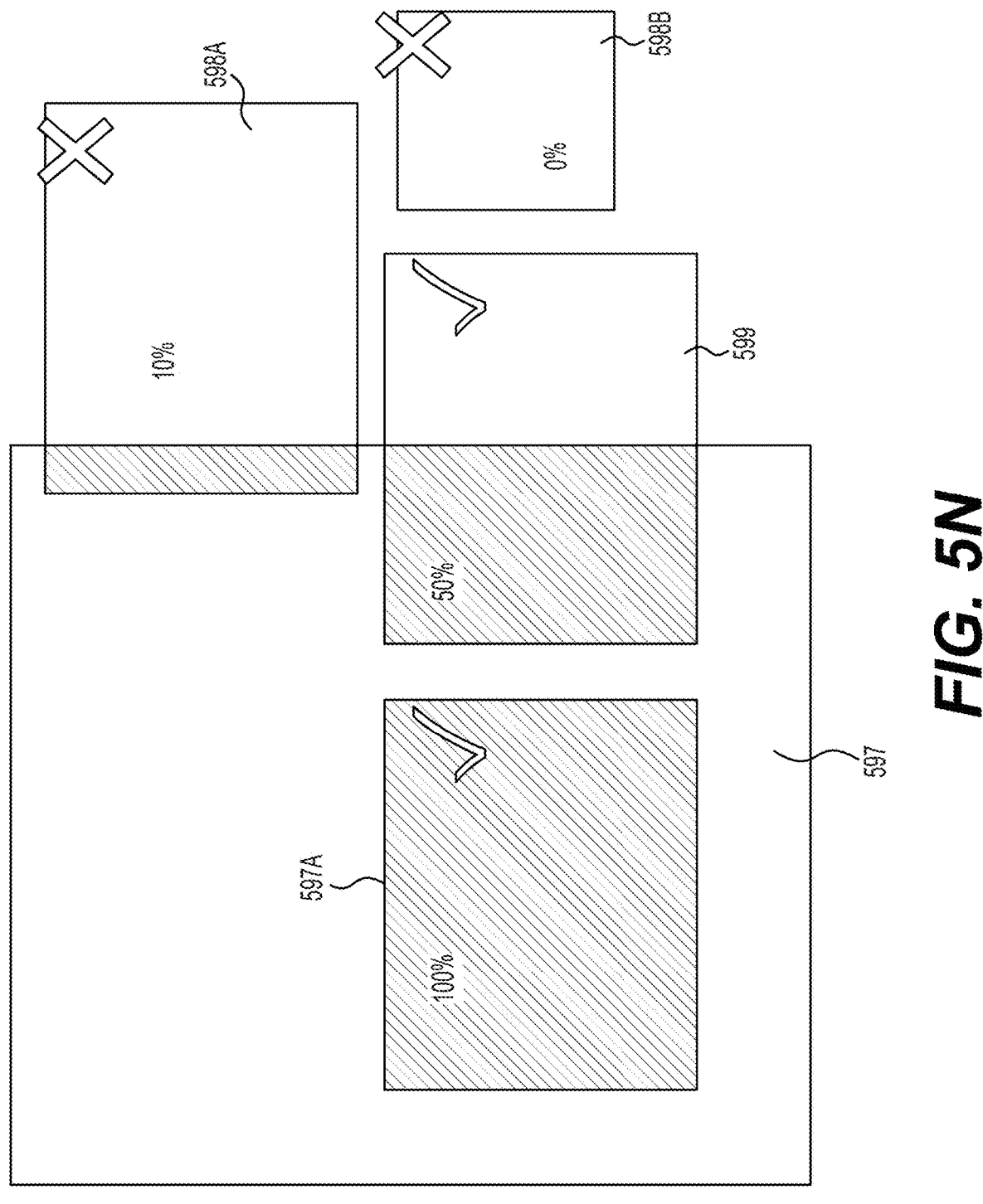

FIGS. 5K-5M illustrate selected element redistribution processes. In an implementation, the element redistribution processes are implemented using a Bubbling Algorithm. The Bubbling Algorithm operates to provide an alternative element, such as a Parent or Sibling element (see definitions for Parent, Child, and Sibling elements). As an example, if a Child element removed from a Focused U/I, the focus system first checks if there are any Sibling elements (other Child elements under the same Parent element). If a Sibling element exists, the focus system recalculates the best Sibling element to select based on proximity and alignment with the previously removed Child element. If no Sibling elements are available, the focus system then moves up to the Parent element and selects the Parent element for focus.

FIG. 5K illustrates an application of the above process in which element A (591) is a Parent element and element B (592) is a Child element (Child of Parent A). Child element B 592 is selected for focus, but Child element B 592 is set to be, or has been removed. The focus system determines if another Child element (e.g., a Sibling element) is available. In the example of FIG. 5K, Sibling element C (593) is available, and the focus system redistributes ("bubbles down") the focus to Sibling (Child) element C 593. If no Sibling element were available, the focus system would select Parent element A 591 for focus.

FIG. 5L illustrates the focus selection process of FIG. 5K when no Sibling element is available for focus redistribution. In FIG. 5L, focus has been redistributed ("bubbled up") to Parent element A 591.

FIG. 5M illustrates a bubbling operation in which the focus system "remembers" a most recently focused Child element (object 596A), and when a user selects Parent element 595, the focus system executes to show the Child element in a focused state (object 596B).

FIG. 5N illustrates an element redistribution operation between a Parent element and one or more Child elements of the Parent element. FIG. 5N, moreover, illustrates a redistribution operation when at least a portion of a Child element overlaps its Parent element. Thus, the operations illustrated in FIG. 5N differ in some respects from the operations of FIGS. 5K-5M. In FIG. 5N, Parent element 597 is seen to be overlapped by Child elements 597A, 598A and 599. Child element 598B does not overlap Parent element 597. In a first situation, the overlap may be visible to the user (e.g., the elements overlap spatially). In a second situation, the overlap may not be visible to the user, but rather may exist at, for example, a metadata level. In either the first or second situation, the overlap may affect the performance of the Focused U/I. In the example of FIG. 5N, when the focus system executes to redistribute the Child elements of Parent element 597, priority may be given to Child elements that are, in whole or in part, "spatially" overlapping Parent element 597. Since Child element 597A is wholly within Parent element 597 and Child element 599 has more than an configurable limit of overlap (e.g., the configurable limit of overlap is set at 25 percent), the focus system will prioritize reconfiguring (moving) Child elements 597A and 599.

In one aspect, only elements that are represented in the DOM may be selected, focused, and redistributed. However, when a specific element, such as a specific Child element, is not present in the DOM and yet a "selection request" for that element has been received by the focus system, the focus system may store the selection request for a configurable duration, and then may act on the selection request if and when the Child element is entered into the DOM.

Figure 6:
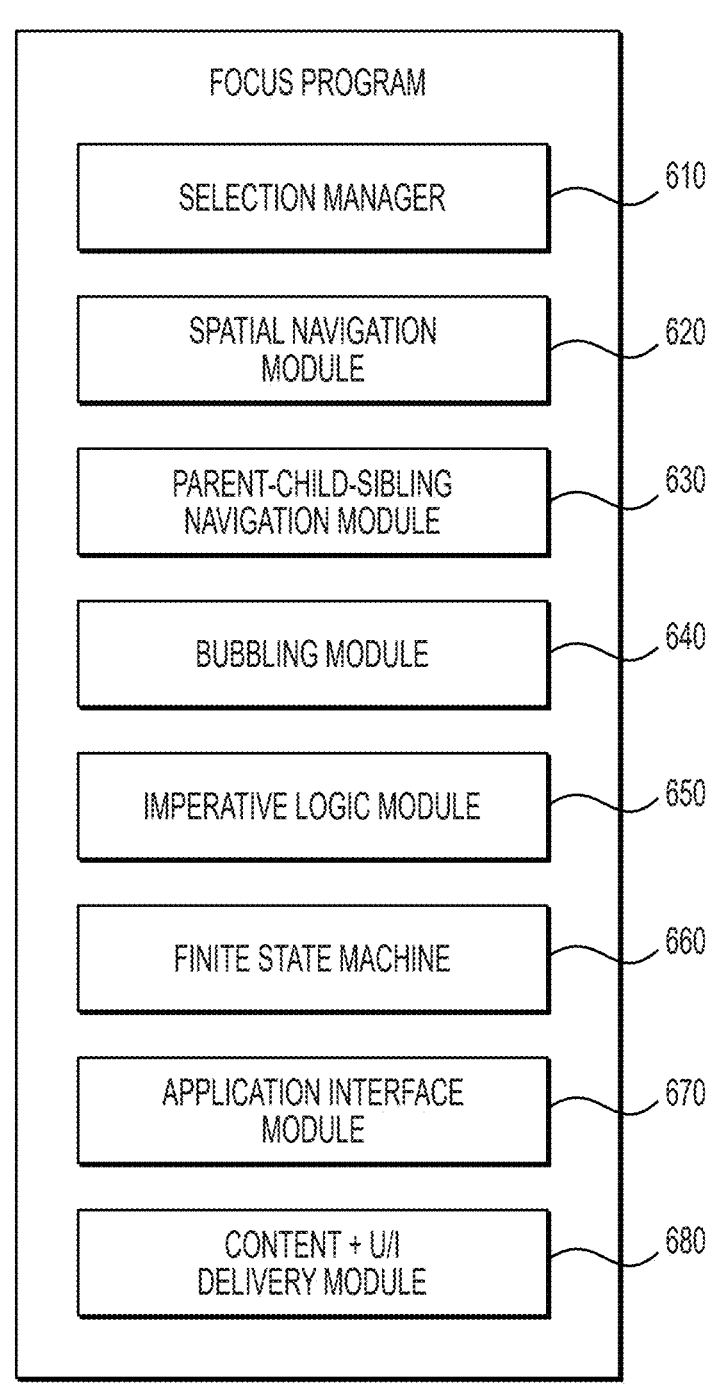
FIGS. 6-6F illustrate an example focus system and components thereof.
Figure 6A:
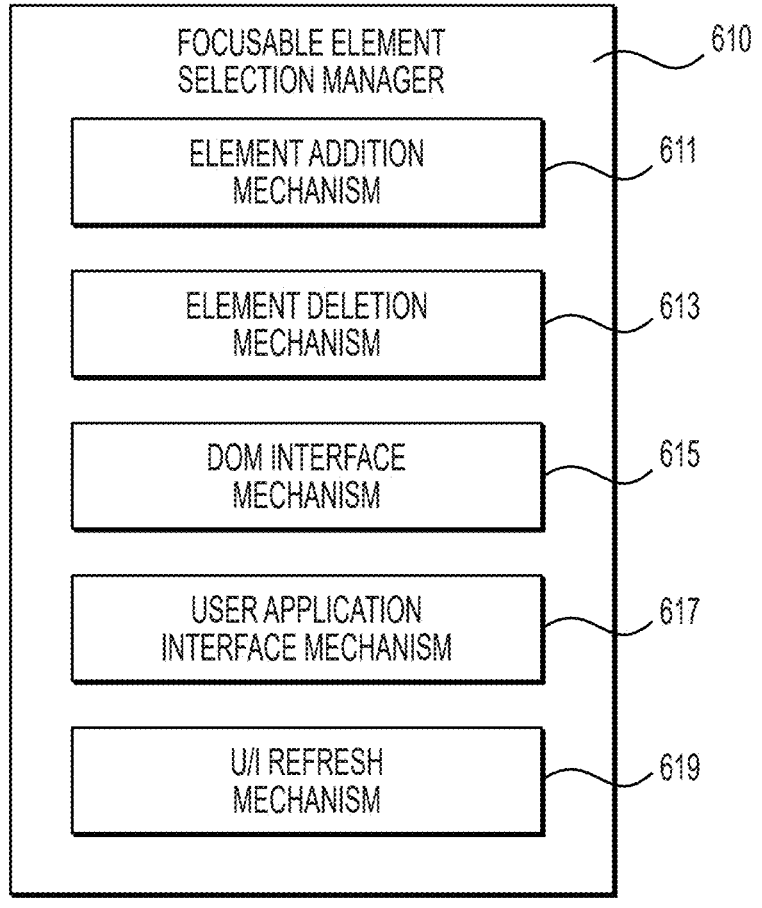
Figure 6B:
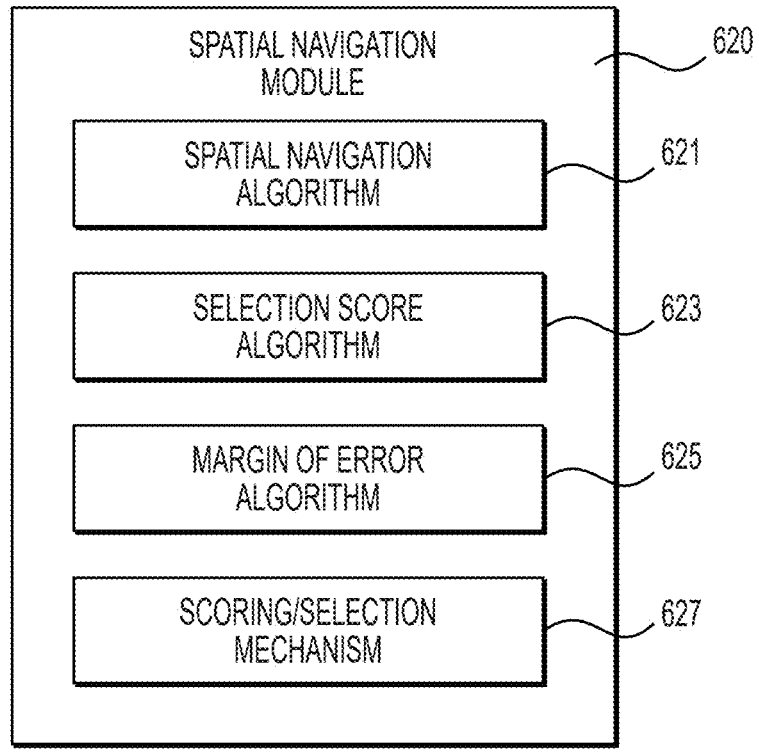
Figure 6C:
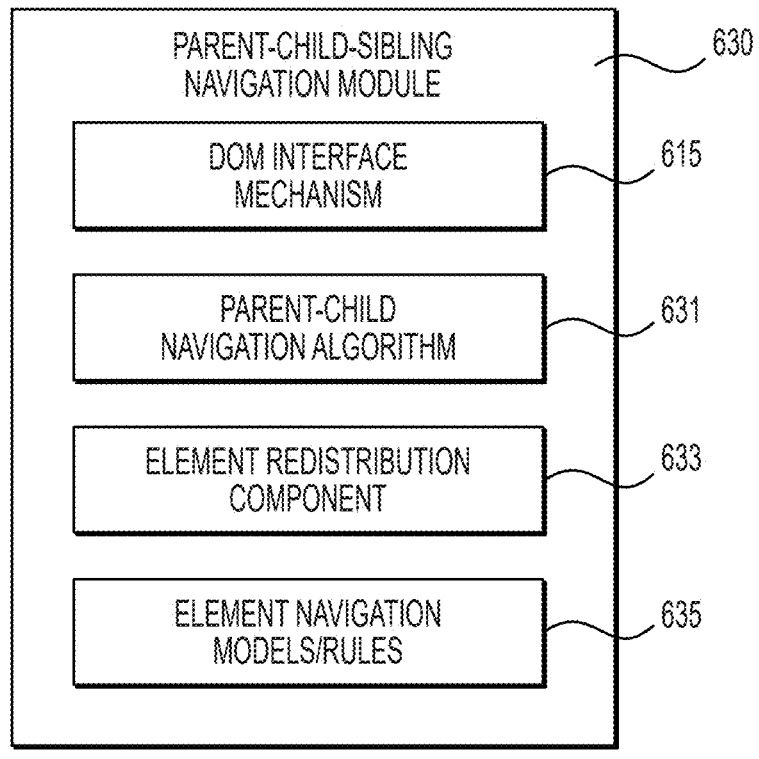
Figure 6D:
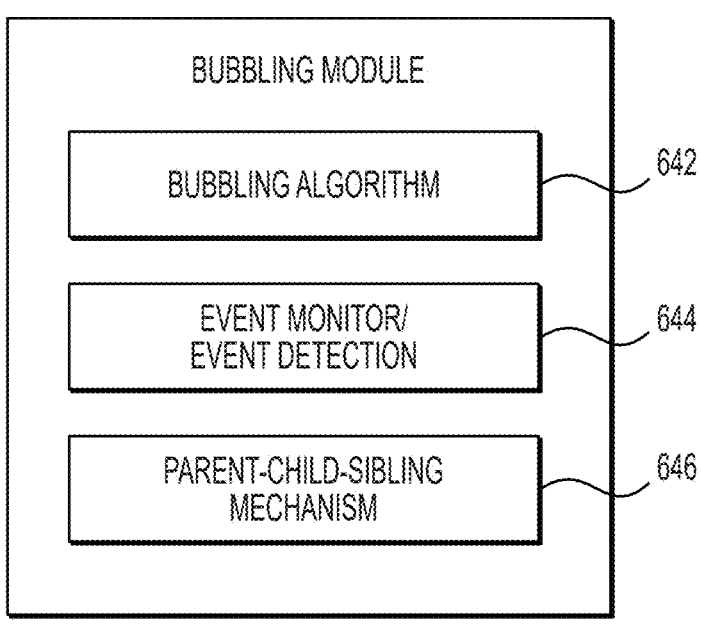
Figure 6E:
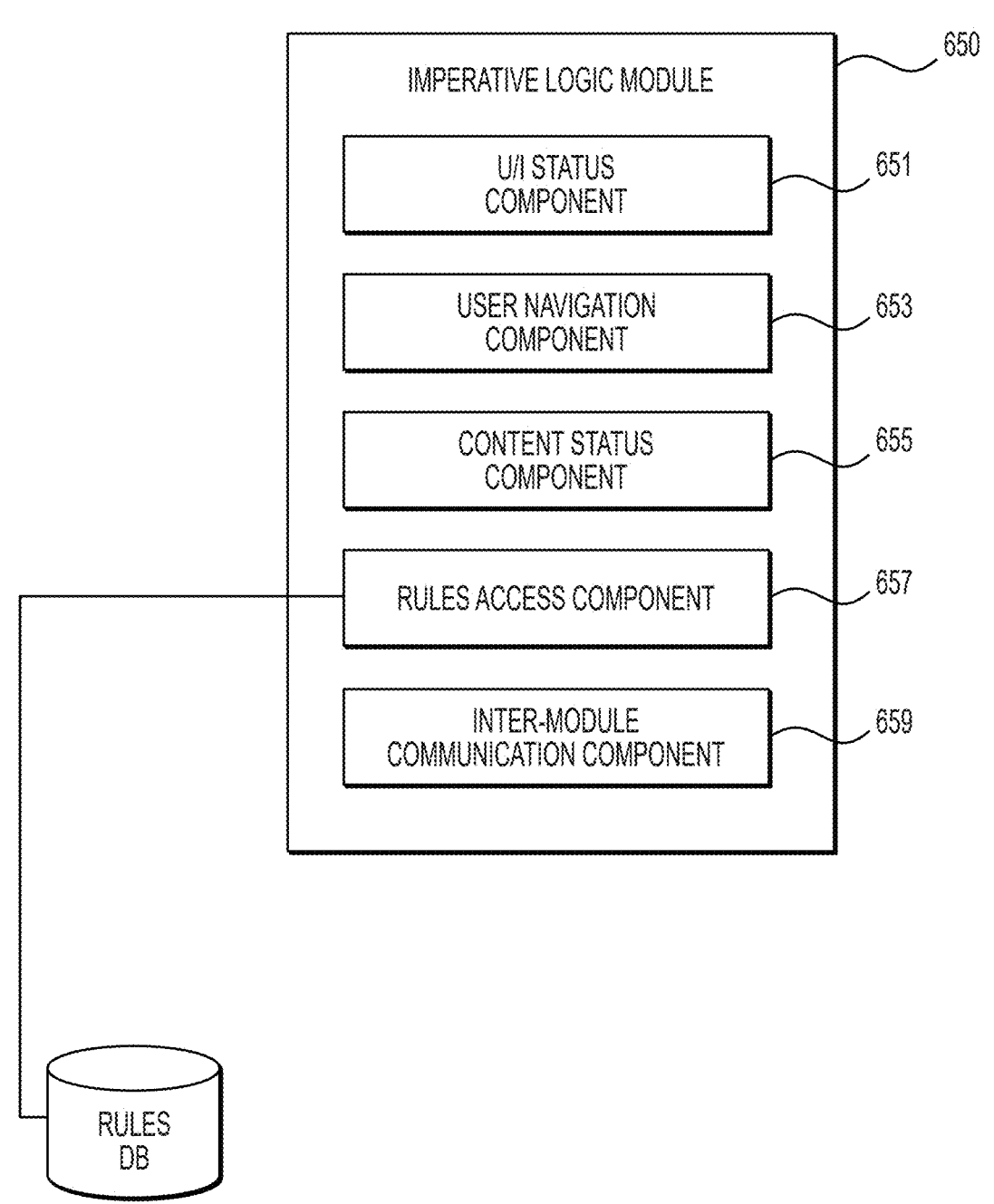
Figure 6F:
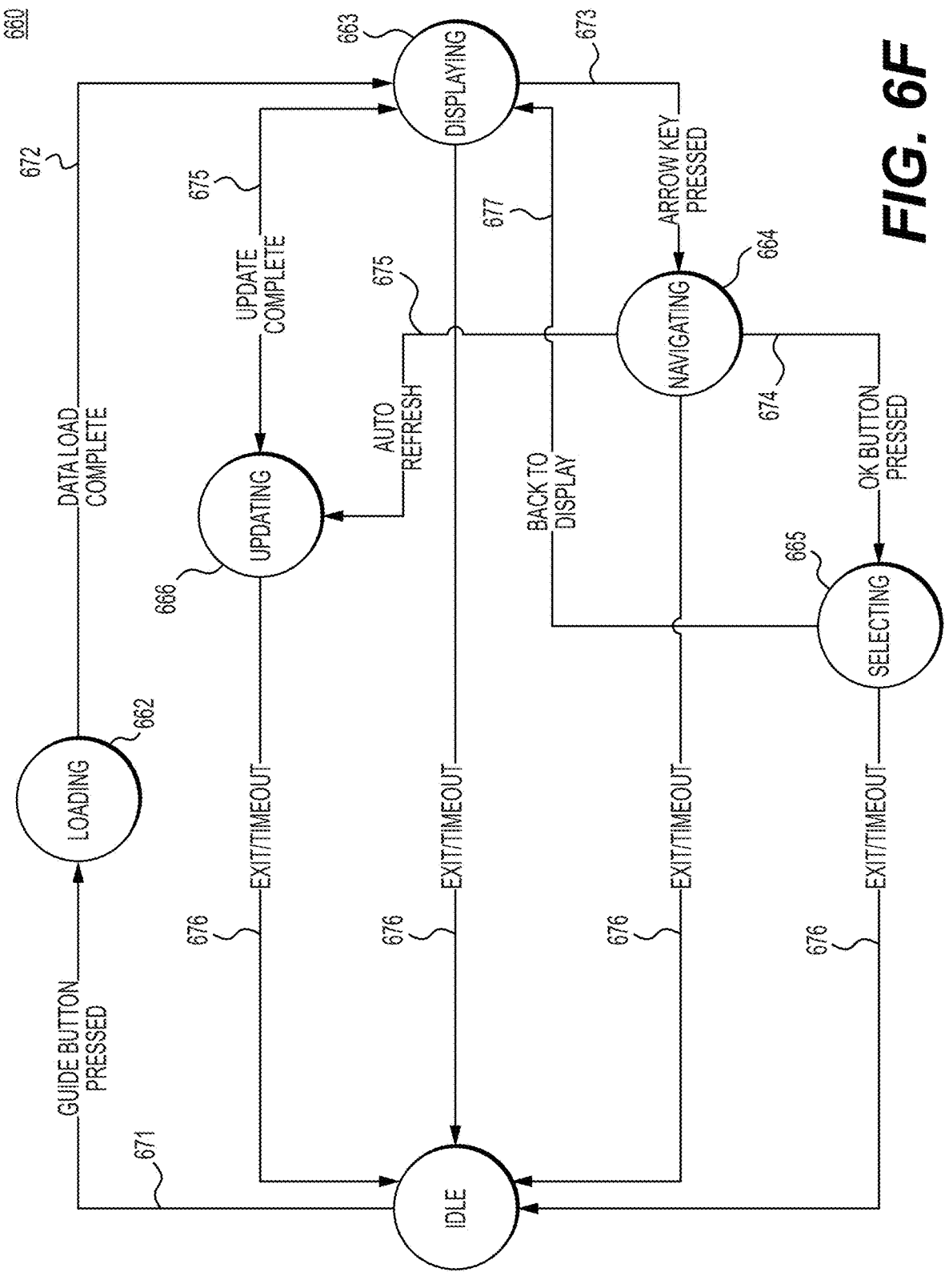

FIGS. 6-6F illustrate example modules, components, algorithms, models, and mechanisms of an example Focused U/I and an example focus system. FIG. 6 illustrates an overall focus, content, and U/I delivery program (focus program) for the herein disclosed focus system and corresponding Focused U/I. In FIG. 6, focus program 600 includes selection manager 610, spatial navigation module 620, Parent-Child navigation module 630, Bubbling module 640, imperative logic module 650, finite state machine 660, application interface module 670, and content and U/I module 680. Also shown in FIG. 6 are database access modules 690 and 692 for accessing streaming content and generating Focused U/Is, respectively.

FIG. 6A is a block diagram illustrating an example focusable element selection manager. In FIG. 6A, focusable element selection manager 610 includes element addition mechanism 611, element deletion mechanism 613, DOM interface mechanism 615, user application interface mechanism 617, and U/I refresh mechanism 619. Element addition mechanism 611 facilitates addition of an element to a U/I by, for example, changing the DOM to contain data related to the element to be added. Element deletion mechanism 613 operates in a manner opposite that of element addition mechanism 611. DOM interface mechanism 615 is an internal software interface between a generated U/I (generated from the DOM) and the DOM itself. As noted herein, the DOM is the structure from which a U/I is produced, and changes to the DOM structure, necessarily affect a displayed U/I. The user application interface mechanism 617 provides a machine-machine interface between a user device displaying a Focused U/I, and the focus system back-end content service 20 (see FIG. 1A). The U/I refresh mechanism provides a periodic or aperiodic update, or refresh, of data from which a Focused U/I is displayed. As an example, the U/I may refresh every 30 seconds, and any changes in the DOM in the interlude between refreshes is reflected in an updated Focused U/I to be displayed on a user's device.

FIG. 6B is a block diagram illustrating an example spatial navigation module. In FIG. 6B, spatial navigation module 620 includes spatial navigation algorithm 621, selection score algorithm 623, margin of error algorithm 625, and scoring and selection mechanism 627. The spatial navigation algorithm 621 executes to select candidate elements for follow-on selection and focus based on one or more navigation rules, sensed user actions, and other actions involving display of elements and data residing in the DOM and corresponding to the currently-focused element (if one exists) and the selected candidate elements. Navigation rules include scroll horizontally, scroll vertically, scroll in two dimensions, consider overlapping elements, including Parent elements and Sibling elements (if the focused element is a Parent element). User actions include scroll left, scroll right, scroll up, scroll down. User actions may be detected by sensing arrow button selections on a remote control affiliated with the user's device. User actions also may be sensed based on voice-commands supplied through the remote control. Other actions include initial display of the U/I on the user's device, deletion of a program from the content service 20, and restrictions placed on a U/I element. The selection score algorithm 623 operates to compute the selection score of Equation 1. The margin of error algorithm 625 incorporates an adjustable margin of error to prevent unwanted or incorrect element selections, especially in densely packed or irregularly arranged layouts of U/Is. The scoring and selection mechanism 627 uses the selection score and the margin of error value to produce a final score for candidate elements, and to select an element having the best (lowest) score.

FIG. 6C is a block diagram illustrating an example Parent-Child-Sibling navigation module 630. In FIG. 6C, module 630 includes the DOM interface mechanism 615, a Parent-Child Navigation Algorithm 631, and an element redistribution component 633. The DOM interface mechanism 615 functions as described above with respect to FIG.

610. The Parent-Child Navigation Algorithm 631 defines how an element is "focused," including after loss of focus, by accounting for the familial relations between and among U/I elements. The element redistribution component 633 invokes and applies the element redistribution models and rules 635. The element redistribution rules allow for the component 633 to use an identified Parent-Child relationship to determine the selection of an entire row of U/I elements, or letting the row (Parent U/I element) itself redistribute the selection to one of the row Child U/I elements. The element redistribution models enable several features, including: (1) isolating a selection if necessary; (2) propagating information when a Child element recovers its selection (that is, a Child element is focused after a loss of focus); (3) redistributing the element selection when the DOM structure changes; (4) recalculating the element selection from a given Parent element (if needed); and (5) remembering the last selected Child element upon completion of viewing content.

FIG. 6D is a block diagram illustrating an example bubbling module. In FIG. 6, bubbling module 640 includes Bubbling Algorithm 642, which executes to provide an alternative element, such as a Parent or Sibling element (see definitions for Parent, Child, and Sibling elements) for focus following loss of focus for an existing element. Bubbling module 640 further includes event monitor/event detector 644 that operates to identify events, that cause a loss of focus and that may require execution of the Bubbling Algorithm 642 to restore focus to a U/I element. A loss of focus event may occur when an in-focus element is removed at the content service 20 (see FIG. 1A). Finally, the bubbling module 640 include Parent-Child-Sibling selection mechanism 646 that cooperates with Parent-Child Navigation algorithm 631 (see FIG. 6C) to identify familial relations among the U/I elements and to select a U/I element for focus.

FIG. 6E is a block diagram illustrating an example imperative logic module 650. Imperative logic rules are implemented in the focus system and are enforced through operation of finite state machine 660, described elsewhere herein. The imperative logic module 650 includes a U/I status component 651, a user navigation component 653, a content status component 655, a rules access component 657, and an inter-module communication component 659. Associated with the imperative logic module 650 is rules database 652. The rules database 652 stores one or more imperative rules. A rule handleRight|handleLeft|handleUp|handleLeft is applied to determine focus behavior in a desired direction (e.g., blocked or selects the given element). A rememberLastChild rule keeps track of the last selected Child element to prioritize that last remembered Child element when reselecting a Parent element. A defaultFocus rule is applied when no element is selected and one must be found; the imperative logic module 650 executes to search all, or a defined subset, of elements until an acceptable element is found. If several elements are displayed on a U/I page, the imperative logic module 650 executes to select the element closest to the top right corner of the U/I page. A preferredChild rule overrides the method of deciding which Child element to select; this method is not called if a previous Child element is in memory as a result of rememberLastChild rule. An isInitiallyDisabled rule is applied to disable an element for any type of selection. If the disabled element is the only selectable Child element, another end-of-chain Child element in another Parent element will inherit the focus. If the disabled element is the target of an imperative rule while that rule is active, the imperative logic module 650 may apply the Default rule instead. A restriction rule restricts a selectable element to a specific type of selection (e.g., keyboard). If a restricted element is the only selectable Child element, another end-of-chain element in another parent will inherit the focus. If the restricted element is the target of an imperative rule while that rule is active, the imperative logic module 650 will apply the Default rule.

The focus program 600 includes finite state machine (FSM) 660. The FSM 660 is a computational model used to design systems with a limited number of specific states. The FSM 660 operates by transitioning from one state to another in response to inputs, based on a defined set of rules. In the example of FIG. 6F, FSM 660 may include the following states: Idle State 661, in which no user interaction occurs and the U/I is hidden; Loading State 662, in which U/I data are fetched or updated; Displaying State 663, in which the U/I is shown on screen; Navigating State 664, in which the user actively browses channels or time slots; Selecting State, 665 in which the user selects a specific program for more information or to watch; and Updating State 666, in which the U/I is automatically refreshed in the background. The FSM 660 may execute according to the following example transitions and inputs: Idle to Loading 671, which is triggered when the user presses the "Guide" button; Loading to Displaying 672, which occurs when data fetching is complete; Displaying to Navigating 673, which occurs when the user presses arrow keys; Navigating to Selecting 674, which occurs when the user presses an "OK" or "SELECT" button on the displayed U/I; Displaying/Navigating to Updating 675, which occurs at regular intervals or when new data are available; and Back to Idle 676 (from any state), which occurs when the user exits the U/I or the U/I times out due to inactivity; and Selecting to Display 677, which occurs following selection of a Child element or other element.

Thus, Finite State Machine 660 is used for selection management, and builds on the Spatial Navigation Algorithm 621 as a mechanism for managing transitions between elements based on user inputs. Execution of the FSM 660 ensures that a user's directional inputs are processed in a logical, predictable manner, particularly in the herein disclosed Focused U/I, where elements may be added, removed, or reorganized frequently. The FSM 660 introduces structured control over how elements are selected and navigated, ensuring smooth and reliable focus transitions (see FIG. 6F). The FSM 660 operates as the core decision-making system for handling user inputs and determining the next selectable element. This process involves managing the state transitions shown in FIG. 6F, where each element is in a state, and where user inputs trigger transitions from one state to another. The FSM 660 ensures that, as the user navigates through the Focused U/I, the focus system calculates which element to select next, maintaining continuity and logic in selection behavior. The FSM 660 employs both spatial and imperative logic when determining the next selection. As disclosed herein, a spatial logic component ensures that the focus system selects the element closest to the user's directional input (e.g., pressing the right arrow key moves the focus to the nearest element on the right). The FSM 660 applies proximity and alignment information provided by the Spatial Navigation Algorithm to decide which element is spatially appropriate based on a user's input. For example, when a user presses a directional key, the FSM 660 evaluates the currently-focused element's position and determines which adjacent element best aligns with the user's input. This calculation is based on the same proximity and angular scoring mechanism used in the Spatial Navigation Algorithm. For example, the FSM 660 manages directional requests by making calls to the focus manager to retrieve the best possible candidate element based on spatial relationships. In addition to spatial considerations, the FSM 660 also enforces specific rules or behaviors, overriding the default spatial logic when necessary. This means that the focus system can block navigation in certain directions, force selection in specific areas, or prevent certain elements from being selectable based on predefined criteria. For example, the FSM 660 incorporates decision-making layers that go beyond simple spatial navigation. The FSM 660 may impose restrictions, such as blocking navigation to certain elements or skipping over elements based on imperative rules. This layer of imperative logic allows for more complex interactions, ensuring that the focus system adheres to specific behaviors. As a further example, the FSM 660 may prevent navigation to a Sibling element if a rule specifies that that Sibling element should not be selectable under certain conditions.

Figure 7:
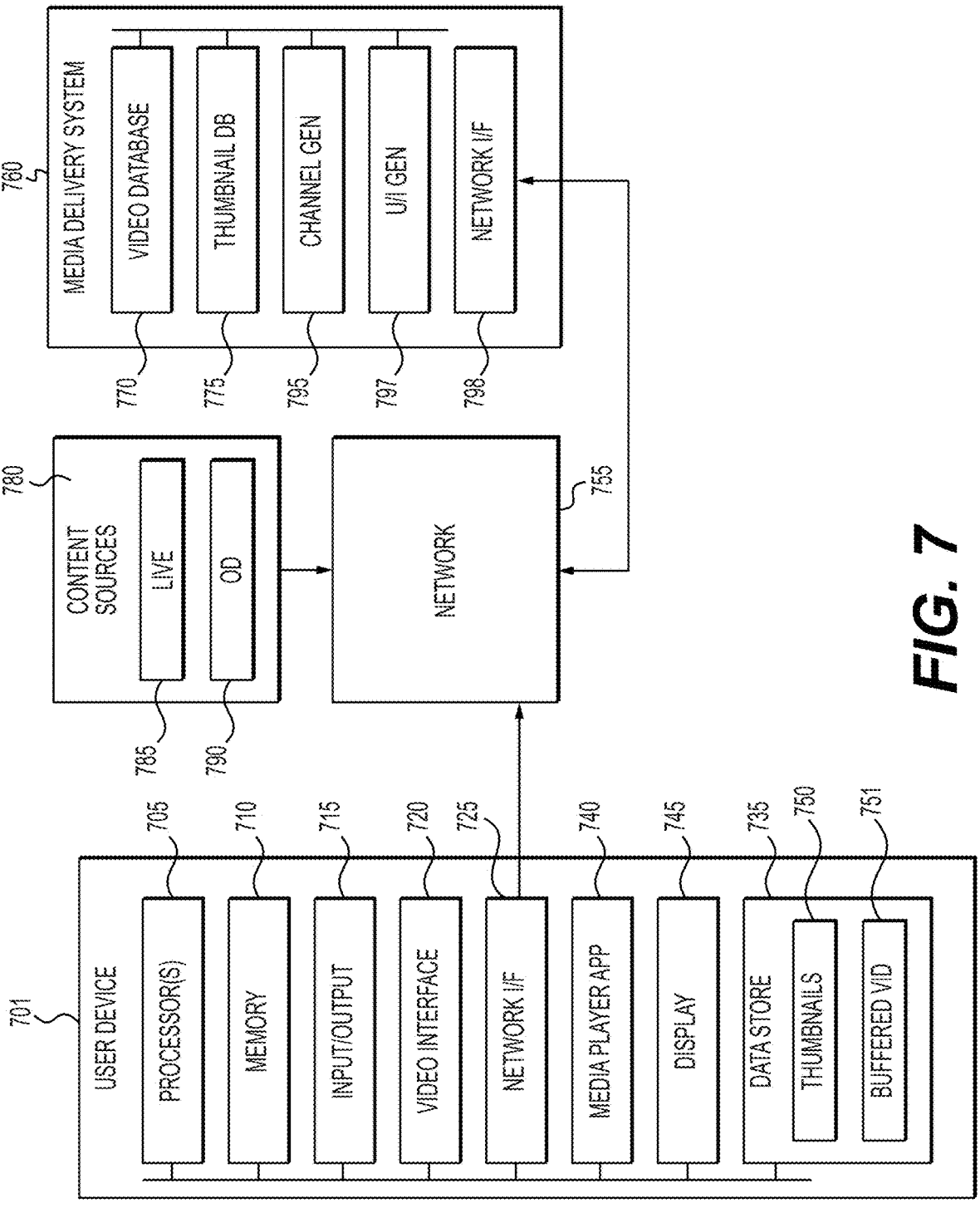
FIG. 7 illustrates and example content system that may incorporate the focus system of FIGS. 6-6F.

FIG. 7 illustrates an example content system that may interact with the Focused U/Is of FIGS. 2-4 and the Focused U/I system of FIGS. 6-6H. In FIG. 7, content system 700 includes a media delivery system 760 that is communicatively coupled to user device 701 over network 755. In an aspect, user device 701 is an electronic device that is able to request content (e.g., video, image, and text) from the media delivery system 760 and to display the content served by the media delivery system 760. The media delivery system 760 is configured to receive requests for content from the user device 701 and to serve the requested content to the user device 701. The media delivery system 760 can include additional components such as processors, storage servers, authentication servers, firewalls, and load balancers. As shown in FIG. 7, the user device 701 includes one or more processors 705, memory 710, an input/output (I/O) interface 715, a video interface 720, a network interface 725, and a non-transitory computer-readable medium 735. The processors 705 may be, for example, general purpose microprocessors. The memory 710 may be a Random Access Memory (RAM) or other dynamic or volatile storage device for storing data and instructions to be executed by the processors 705. Memory 710 may also be used for storing temporary variables or other intermediate information during execution of instructions to be executed by the processors 705. Such instructions, when stored in the non-transitory computer-readable medium 735, render user device 701 to be a special-purpose machine that is customized to perform the operations specified by the instructions. Media player application 740 may be an application that allows users to browse and play video accessible from a media delivery system 760. In an aspect, non-transitory computer-readable medium 735 includes a GUI module (not shown) that is included as part of a media player application 740. The GUI module may provide one or more GUIs (e.g., Focused U/I GUI and/or playback GUI) described herein. The I/O interface 715 is configured to receive user inputs via an input device. The input device may be any type of device that can receive user input such as a keyboard, key pad, or a voice control of a remote control (see example in FIG. 2A). The input device may be a voice recognition device. The video interface 720 is communicatively coupled to a display screen 745 (also referred to as a display) and is configured to output video content to the display 745. The display 745 may be any type of device that can display video content, the possible types of displays including, but not limited to, a television, a computer monitor, or a touchscreen display. While the display 745 is shown as being separate from the user device 701, in some examples, the display 745 is integrated with the user device 701. The user device 701 may be any type of device that can request and receive video content and can output video content to a display 745. For example, a user device 701 may be a smart TV or a video game console. The data/communication network 755 can be any type of network capable of transporting data from one device to another device (for example, from a user device 701 to media delivery system 760 and from media delivery system 760 to one or more user devices 701. For example, the data/communication network 755 can include a terrestrial analog or digital signal system, a cable system, and a satellite communications system. The media delivery system 760 includes video database 770 and a thumbnail database 775 (e.g., each of which can be a file system, key value store, relational database, or any other suitable storage structure). In an aspect, the media delivery system 760 can be implemented across any number of hardware devices and platforms in a distributed manner. In an example, the media delivery system 760 ingests video content from content sources 780, such as one or more live content source(s) 785 (for example, live linear programming from one or more broadcast sources), one or more on demand content sources 790 (for example, one or more video-on-demand (VOD) content services), or both, and stores some or all of the ingested video content in the video database 770 to be served to user devices 701. The media delivery system 760 may store thumbnails for some or all of the ingested video content in the thumbnail database 775. For example, video content items (for example, television episodes, movies, VOD programs) stored in the video database 770 may be associated with corresponding sets of thumbnails 750. In an aspect, the set of thumbnails 750 associated with a video content item can include thumbnails where each thumbnail is associated with a particular time position in the video content. For example, the set of thumbnails for a particular video content item might include a thumbnail for every five (5) second increment in the video content. More granular or less granular thumbnail increments are also possible. In an implementation, the media delivery system 760 includes a dynamic channel generator 795 and a U/I generator 797. The dynamic channel generator 795 and the U/I generator 797 may be implemented using software, hardware, firmware, or any combination thereof. In an example, certain components of the media delivery system 760 can be implemented in full or in part using cloud-based components that are coupled to the systems by one or more networks, such as the Internet through network interface 798. The cloud-based components may expose interfaces that provide processing, storage, software, and/or other resources to other components of the systems. The cloud-based components may be implemented by third-party entities on behalf of another entity for whom the components are deployed. Alternately, the herein-described systems may be implemented entirely by computer systems owned and operated by a single entity. During operation of the focus system, a user device 701 may generate and transmit one or more requests to the media delivery system 760 to play or otherwise access particular video content items. In response to receiving such requests, the media delivery system 760 may serve the requested video content items to the user devices 701. This may involve transmitting/streaming video content stored in the video database 770, as well as thumbnails associated with the video content stored in the thumbnail database 775, to the user device 701 over the network 755. The user device 701 may buffer a portion of the received video content (e.g., buffered video 751) in the non-transitory machine-readable medium 735 and output the buffered video content to the display 745. In one example, the user device 701 buffers a threshold amount of video content following (and preceding) the user's current viewing position in the video (e.g., buffered video 751). The user device 701 also may store some or all of the thumbnails 750 for the video content in the non-transitory machine-readable medium 735. Each thumbnail is associated with a time position in the video. The user device 701 may use the thumbnails 750 to generate and output (to the display 745) a GUI that allows a user to navigate through a video.

FIGS. 8-12 illustrate example operations for rendering the example U/Is and U/I operations of FIGS. 2-5N.

Figure 8:
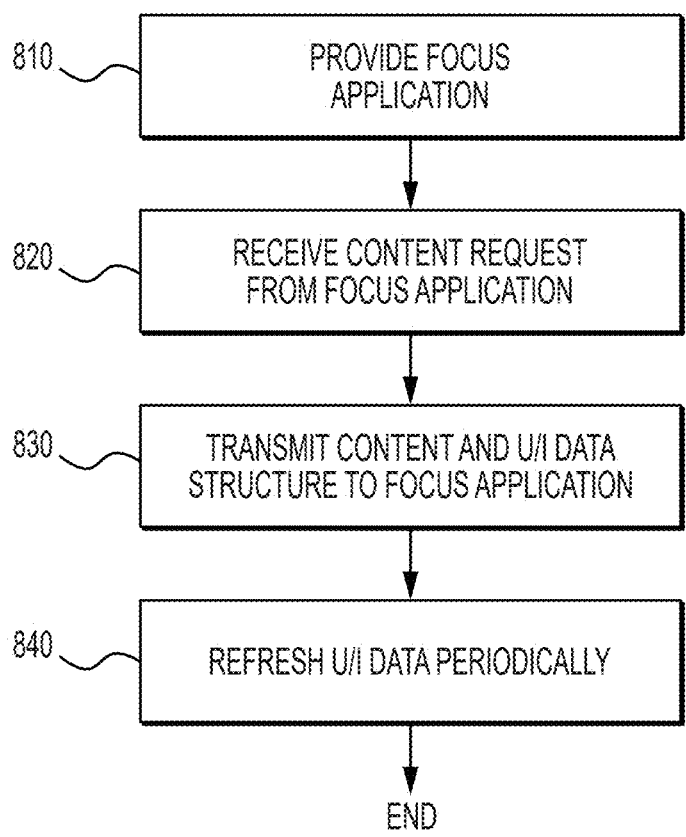
FIGS. 8-12 illustrate example operations for rendering the example Focused U/Is of FIGS. 3A-5N.

FIG. 8 illustrates an example focus operation executed by the herein disclosed focus system for generating and maintaining focus in a U/I In FIG. 8, operation 800 begins in block 810 with providing a focus application for storage and operation on a user device. In block 820, the focus system receives a request, from the focus application executing on the user device, to provide content for display on the user device and a corresponding focusable U/I listing elements referencing individual content items in the content to be provided. In block 830; the focus system transmits the requested content and a data structure from which the focusable U/I may be generated. In an aspect, the data structure includes image data, text data, and metadata corresponding to the individual content items. Furthermore the data structure allows the focus application to construct and display the U/I as a focused U/I on a display of the user device. The Focused U/I includes spatial navigation rules for focusing one element at a time on a displayed U/I, Parent-Child-Sibling navigation rules for selecting elements of the U/I for focus, and element bubbling rules for refocusing an element for display as a Focused element on the U/I following a loss of focus condition. Once provided, the U/I may be periodically refreshed, block 840 through a refresh operation executed by the content service 20 of FIG. 1A. Following blocks 830/840, operation 800 ends.

Figure 9:
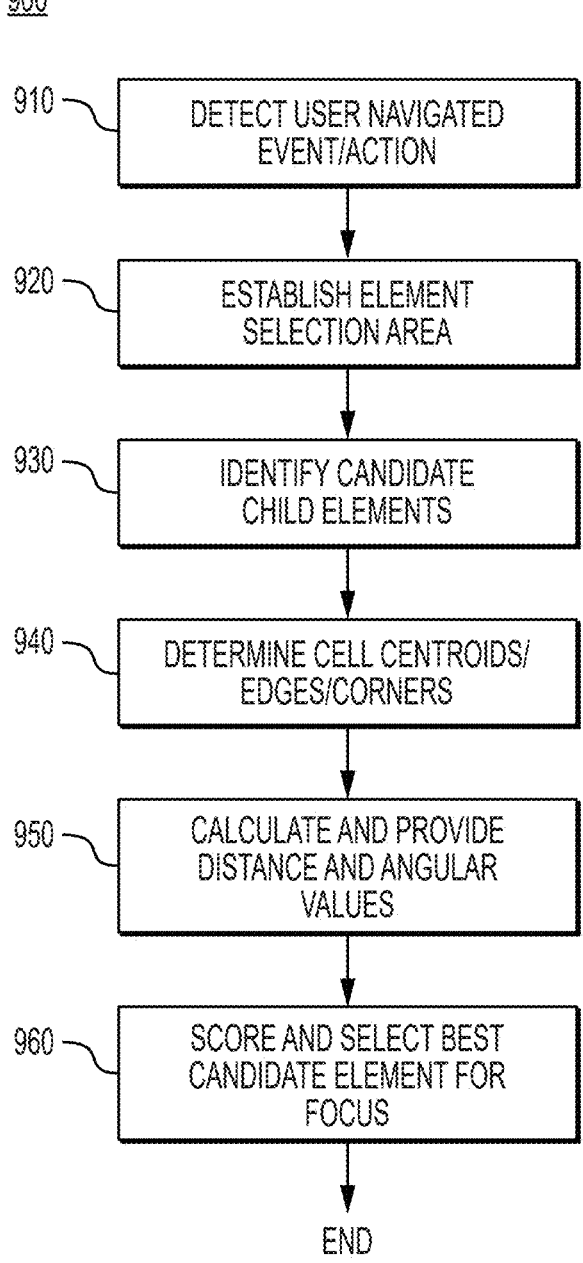

FIG. 9 illustrates, in more detail, an example local operation for maintaining focus in a U/I. The example local operation is described with reference to the remote control 210 of FIG. 2A and the Focused U/I 320 of FIG. 3C. In FIG. 9, example operation 900 is based on a Focused U/I actively displayed to a user (that is, the Focused U/I 320 is displayed under control of an application (e.g., application 50 of FIG. 1B, which includes a local copy of the focus system) resident on a user device such as Smart TV 30, and the Focused U/I 320 is not in an idle state). In particular, the Focused U/I 320 has one Child element 302A in focus. Operation 900 begins in block 910 when the focus system resident in application 50 detects a user navigation action, such as scroll right, initiated by user operation of a scroll right arrow key of the remote control 210. In block 920, the focus system establishes a candidate element selection area in the direction of movement of the remote control 210 arrow key (in the example, scroll right). The candidate selection area may be fixed with respect to the currently focused element. FIG. 5D illustrates an example candidate element selection area 529 that incorporates a margin of error (MOE) set off, and the process of block 920 generates such a candidate element selection area. In block 930, the focus system identifies candidate Child elements. The candidate Child elements may include those immediately adjacent to a right-hand side of Child element 302A, namely Child elements in cells C24 and C25. The candidate Child elements also may include Child elements to the right of Child element 302A but displaced angularly above or below Child element 302A in the Focused U/I 320 so long as the Child elements are in the candidate selection area. In an aspect, as part of the operation of block 930, the focus system applies a declarative rule requiring at least 50% of the area (measured, for example in pixels) be within the candidate element selection area. Other declarative and imperative rules may be applied as part of the process of block 930, with the rules intended to produce the "best" Child element for focus selection. The angularly-displaced Child elements include Child elements in cells C15 and C30 (other, further away Child elements are angularly displaced to the right, but the selection algorithms disclosed herein might not select these further Child elements since their scores might not be sufficiently low to merit consideration). In block 940, the focus system identifies, selects, and measures a reference point from which a selection score can be computed, where the selection score accounts for a distance between a selection point for the currently focused element and corresponding selection points for one or more candidate elements. The selection points can be a centroid, a corner, or an edge of the elements. For example, in FIG. 3C, the selection points could be the centroid of the cell corresponding to Child element 302A (the currently-focused Child element) and the cell centroids for each of the candidate Child elements (cells C15, C24, and C30). In computing the centroids, the focus system may use the pixel structure of each candidate Child element. The thus-determined centroids provide a distance value (in pixels). Similar measurement techniques may be used for corners and edges, as well as other locations relative to each specific element. In addition, the selection score may take into account an angular displacement relative to a reference line or plane of the currently focused element, or any other element. Selections rules such as percentage of cell area within the element selection area, facings between the currently focused element and each of the one or more candidate elements. In block 950, the distance value and the angular values are provided to a selection score algorithm (Equation 1, FIG. 6B) to produce a score for each candidate element. In block 960, the selection scores are provided to a scoring/selection mechanism, and the candidate element with the lowest score is selected for focus. Following block 960, operation 900 ends.

Figure 10:
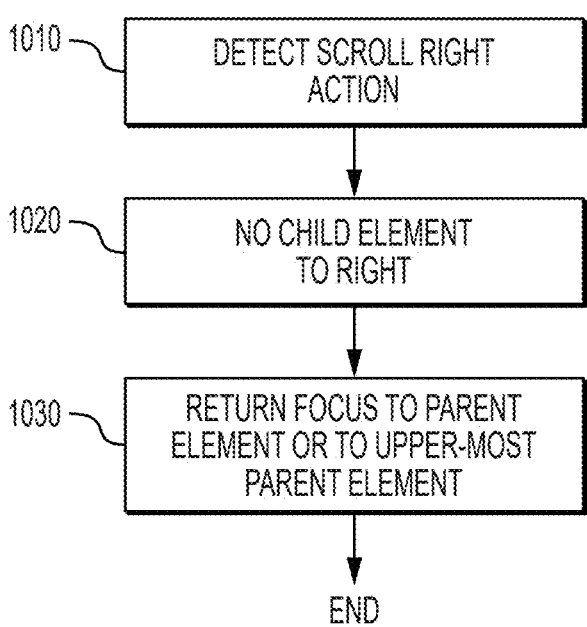

FIG. 10 illustrates another example local operation executed through the focus system resident on application 50. The example local operation is described with reference to the remote control 210 of FIG. 2A and the Focused U/I 320 of FIG. 3C. In FIG. 10, Focused U/I operation 1000 begins with end display of content associated with Child element of cell C27. In this example, assume no other Child elements are available under the Parent element of cell P19. In block 1010, the focus system detects a scroll right action from remote control 210. In block 1020, the focus system determines no Child elements are available to the right of the currently focused Child element of cell C27. In block 1030, the focus system, in one aspect, returns focus to the Parent element of cell P19. In another aspect, in block 1030, the focus system follows an imperative rule, and selects the upper-most Parent element, in cell P1, for focus. Other aspects are possible. Following block 1030, operation 1000 ends.

Figure 11:
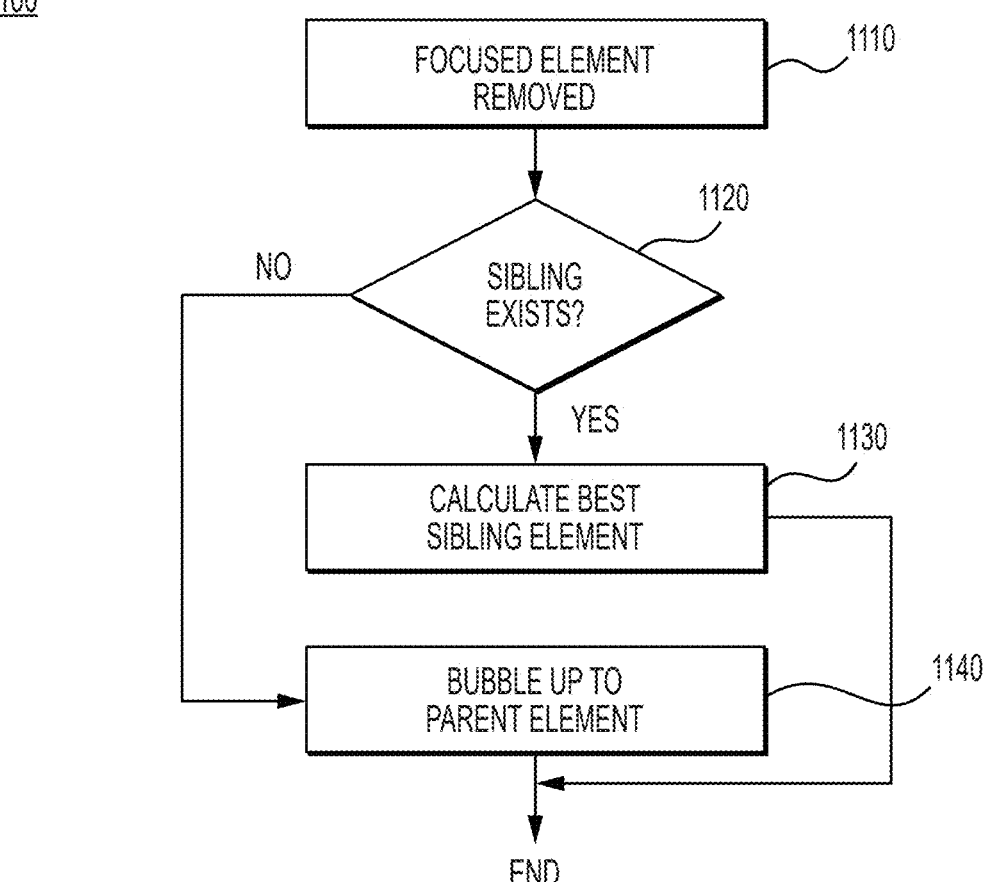

FIG. 11 illustrates an example bubbling operation executed through the focus system resident on application 50. The example bubbling operation is described with reference to the remote control 210 of FIG. 2A and the Focused U/Is of FIG. 3C, and illustrates a selected element redistribution processes. In FIG. 11, element redistribution processes are implemented using a Bubbling Algorithm. The Bubbling Algorithm operates to provide an alternative element, such as a Parent or Sibling element (see definitions for Parent, Child, and Sibling elements). In FIG. 11, operation 1100 begins in block 1110 when, through operations at the content service 20 of FIG. 1A, the Child element of cell C22 is removed from the Focused U/I 320 of FIG. 3C. That is, a removal event occurs at the content service 20 making the Child element C22, whether currently focused or not currently focused, unavailable for focus on the Focused U/I displayed on a user's device. Such removal may occur, for example, when content associated with Child element of Cell C22 no longer is available from the content service 20. Note, however, that the Child element of cell C22 may still be displayed, and may remain visible, until the content service 20 executes a U/I refresh operation. In block 1120, the focus system of application 50 determines if any Sibling elements (other Child elements under the same Parent element P19) exist. In block 1120, if a Sibling element exists (e.g., elements of cells C23 and C24), operation 1100 moves to block 1130 and the focus system recalculates the best Sibling element to select based on proximity and alignment (as described with respect to FIG. 9) with the previously removed Child element of cell C22. In block 1120, if no Sibling elements are available, operation 1100 moves to block 1140 and the focus system then moves up (bubbles up) to the Parent element (Parent element of cell P19) and selects that Parent element. Following either block 1130 or block 1140, operation 1100 ends.

Figure 12:
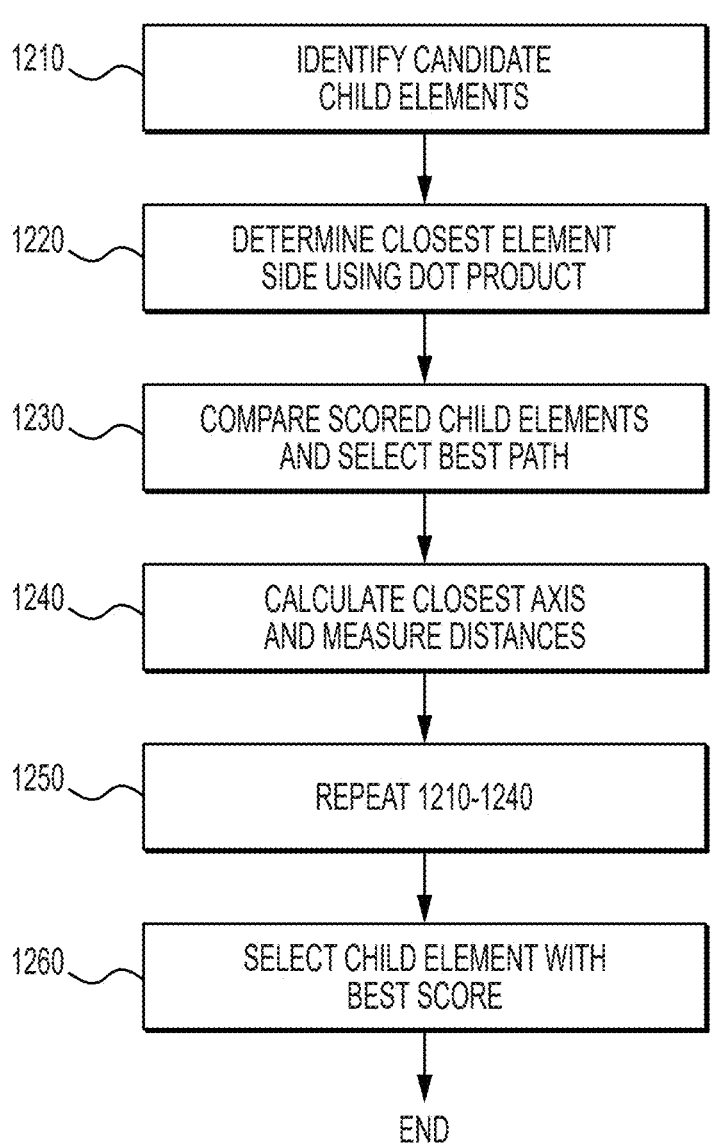

FIG. 12 illustrates an element selection operation 1200 executed through the focus system resident on application 50. The example selection operation is described with reference to FIG. 5I. in order to establish a Parent-Child relationship, the local focus system uses a spatial calculation of the cell (element) relationships with the goal of selecting the Child element closest to the top left corner (following Western reading direction (a declarative rule)). In block 1210, the focus system, starting from currently focused element 571, identifies candidate Child elements. In block 1220, the local focus system determines an element side closest to the desired axis using a dot product formula. The focus system takes each endpoint of a side and applies a series of three formulas, where 1 represents one endpoint of the candidate Element's side and 2 represents the opposite endpoint: $x = childcornerX - parentcornerX$ (EQN 2); $y = childcornerY - parentcornerY$ (EQN 3); and $dotproduct = x1 \times x2 + y1 \times y2$ (EQN 4). In block 1230, the focus system compares the scores obtained and selects the lowest one as a target to determine the best selection path. In block 1240, the focus system generates the position of an axis (in the example of FIG. 5I, a vertical axis, truncated to provide a margin of error) and then calculates the point on the candidate element closest to the axis, and measures the distance between them; in the example of FIG. 5I between the top of the vertical axis of the currently focused element 571 and the corner of candidate element 572. In block 1250, the local focus system repeats these steps for all candidate elements (e.g., candidate element 573) and in block 1260 chooses the candidate element with the score closest to zero per Equation 5: $score = 0 - distance$ (EQN 5), namely candidate element 572. Following block 1260, operation 1200 ends.

The preceding disclosure refers to flowcharts and accompanying descriptions to illustrate the examples represented in FIGS. 8-12. The disclosed devices, components, and systems contemplate using or implementing any suitable technique for performing the steps illustrated. Thus, FIGS. 8-12 are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Examples disclosed herein may be implemented in digital electronic circuitry, or in computer software, firmware, or hardware, including the herein disclosed structures and their equivalents. Some examples can be implemented as one or more computer programs; i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A focus system, comprising:

a processor; and a non-transitory, computer-readable storage medium having encoded thereon, machine instructions for implementing and operating the focus system, wherein the processor executes the machine instructions to:

provide a focus application for storage and operation on a user device;

receive a request, from the focus application executing on the user device, to provide content for display on the user device and a corresponding focusable user interface (U/I) listing elements referencing individual content items in the content to be provided, and transmit the requested content and a data structure from which the focusable U/I may be generated, wherein the data structure comprises data and metadata corresponding to the individual content items, wherein the data structure allows the focus application to construct and present the U/I as a focused U/I on a display of the user device, wherein the focus application is configured to provide:

a spatial navigation component for focusing one element at a time on the U/I, wherein the spacial navigation component is configured to determine a relationship between a current focused element and one or more candidate elements to replace the current focused element, wherein:

the spacial navigation component constructs an element selection area of the focused U/I, wherein element selection is confined to candidate elements within the element selection area;

the spacial navigation component determines a straight line distance between the current focused element and each candidate element within the element selection area; and the spacial navigation component scores each candidate element based on the straight line distance;

a Parent-Child-Sibling element navigation component for selecting elements of the U/I for focus; and an element bubbling component for refocusing an element for display as a focused element on the U/I following a loss of focus condition.

2. The focus system of claim 1, wherein one or more candidate elements are in an angular relation with the current focused element, wherein the scoring further comprises adjusting the scoring based on a magnitude of the angular relation.

3. The focus system of claim 1, wherein the straight line distance is measured in pixels between a current focused element reference and a candidate element reference.

4. The focus system of claim 3, wherein the focus application is further configured to provide a margin of error (MOE) component, wherein the MOE component applies a margin of error as an adjustment to the current focused element reference, wherein the adjustment changes a size of the candidate element selection area.

5. The focus system of claim 1, wherein only elements within a candidate element selection area having at least a portion of a side facing a current focused element are identified as candidate elements.

6. The focus system of claim 1, wherein candidate elements are selected based on detection of a user event, wherein the user event comprises one of a scroll left operation, a scroll right operation, a scroll up operation, and a scroll down operation.

7. The focus system of claim 1, wherein U/I elements include a Root element, a Parent element, a Child element, and a Sibling element, wherein the focus application is configured to redistribute Child elements in a Parent-Child relationship in an order defined by the Parent element.

8. The focus system of claim 1, wherein the processor sends, periodically, a U/I refresh command, wherein execution of the U/I refresh command reloads a U/I page to display a refreshed U/I on the user device.

9. A non-transitory, computer-readable storage medium having encoded thereon machine instructions that when executed by a processor, cause the processor to:

provide a focus application for storage and operation on a user device;

receive a request, from the focus application executing on the user device, to provide content for display on the user device and a corresponding focusable user interface (U/I) listing elements referencing individual content items in the content to be provided; and transmit the requested content and a data structure from which the focusable U/I may be generated, wherein the data structure comprises image data, text data, and metadata corresponding to the individual content items, wherein the data structure allows the focus application to construct and display the U/I as a focused U/I rendered on a U/I page on a display of the user device, wherein the focus application is configured to provide:

a spatial navigation component for focusing one element at a time on a displayed U/I wherein the spacial navigation component is configured to determine a relationship between a current focused element and one or more candidate elements to replace the current focused element, wherein:

the spacial navigation component constructs an element selection area of the focused U/I, wherein element selection is confined to candidate elements within the element selection area;

the spacial navigation component determines a straight line distance between the current focused element and each candidate element within the element selection area; and the spacial navigation component scores each candidate element based on the straight line distance, a Parent-Child-Sibling element navigation component for selecting elements of the U/I for focus, and an element bubbling component for refocusing an element for display as a Focused element on the U/I following a loss of focus condition.

10. The non-transitory, computer-readable storage medium of claim 9, wherein one or more candidate elements are an angular relation with the current focused element, wherein the scoring further comprises adjusting the score based on a magnitude of an angular relation.

11. The non-transitory, computer-readable storage medium of claim 10, wherein the straight line distance is measured by determining a number of pixels between a current focused element reference and a candidate element reference.

12. The non-transitory, computer-readable storage medium of claim 10, wherein the focus application provides a margin of error (MOE) component, wherein the MOE component determines and applies a margin of error as an adjustment to a current focused element reference, wherein the adjustment changes a size of the candidate element selection area, thereby generating a dynamic boundary that adapts to a directional input.

13. The non-transitory, computer-readable storage medium of claim 12, wherein the directional inputs comprises one of a scroll left/right operation and a scroll up/down operation.

14. The non-transitory, computer-readable storage medium of claim 9, wherein U/I elements include a Root element, a Parent element, a Child element, and a Sibling element, wherein the focus application is configured to redistribute Child elements in a Parent-Child relationship in an order defined by the Parent element.

15. The non-transitory, computer-readable storage medium of claim 14, wherein after viewing content associated with a specific Child element, the focus application is configured to return focus to the specific Child element.

16. A method implemented by a processor resident on a user device for generating and maintaining focus in a user interface (U/I) displayed on the user device, the method, comprising;

the processor receiving and storing a focus application on the user device;

the processor sending a request to provide content for display on the user device and corresponding focusable U/I data of elements referencing individual content items in the content to be provided;

receiving the requested content and corresponding focusable U/I data, wherein the focusable U/I data enables the processor, executing the focus application, to construct and display a focused U/I on the user device;

applying a spatial navigation component for focusing one element at a time on a displayed focused U/I;

applying a Parent-Child-Sibling navigation component for selecting elements of the focused U/I for focus; and applying element bubbling rules for refocusing an element for display as a focused element on the focused U/I following a loss of focus condition in a currently-displayed element, wherein selecting elements for focus, comprises:

constructing a candidate element selection area of the focused U/I, comprising:

selecting a reference relative to a currently-focused element, applying a margin of error (MOE) to the reference, and constructing an adaptable boundary for the candidate element selection area based on a direction of a received navigation event, wherein applying the MOE reduces a size of the candidate element selection area by moving the adaptable boundary;

confining candidate element selection to elements within the candidate selection area; and using spatial navigation, determining a relationship between a current focused element and two or more candidate elements to replace the current focused element.

17. The method of claim 16, wherein using spatial navigation, comprises:

identifying a starting point on the reference;

determining a distance between the starting point and a reference point on each of the one or more candidate elements within the candidate selection area, wherein the distance is based on a number of pixels along a straight line between the starting point and the reference point of each of the one or more candidate elements;

scoring each of the one or more candidate elements as a function of the number of pixels in a distance determination; and selecting from the one or more candidate elements a candidate element having a lowest score for the distance determination.

18. The method of claim 17, wherein the reference relative to a currently-focused element comprises a reference line perpendicular to the direction of the received navigation event, the method further comprising computing the margin of error when constructing the candidate element selection area, comprising:

reducing a length of the reference line;

using a reduced length reference line to determine the element selection area.

19. The method of claim 16, further comprising:

detecting removal of a currently-focused element from a document object module corresponding to the focused U/I; and applying the element bubbling rules to provide focus to a subsequent element.

20. The method of claim 16, wherein one or more candidate elements are in an angular relation with a current focused element, wherein scoring further comprises adjusting a score based on a magnitude of the angular relation.

21. The method of claim 16, further comprising:

detecting a user event, wherein the user event comprises one of a scroll left operation, a scroll right operation, a scroll up operation, and a down operation; and initiating a candidate selection process based on detection of the user event.

22. The method of claim 16, wherein U/I elements include a Root element, a Parent element, a Child element, and a Sibling element, wherein the processor redistributes Child elements in a Parent-Child relationship in an order defined by the Parent element.

23. A user interface (U/I) focus system, comprising:

a content delivery system comprising one or more processors and a non-transitory, computer-readable storage medium having encoded thereon machine instructions for operating the content delivery system;

a spatial navigation component is configured to determine a relationship between a current focused element and two or more candidate elements to replace the current focused element, wherein:

the spatial navigation component constructs an element selection area of the focused U/I, wherein subsequent element selection is confined to candidate elements within the element selection area;

the spatial navigation component determines a straight line distance between the current focused element and each candidate element within the element selection area; and the spatial navigation component scoring each candidate element based on the straight line distance; and a focus application configured for installation on a user device, and further configured for two-way data communication with the content delivery system, wherein the content delivery system is configured to:

receive a request, from the focus application executing on the user device, to provide content for display on the user device and a corresponding focusable U/I listing elements referencing individual content items in the content to be provided, and transmit the requested content and a data structure from which the focusable U/I may be generated, wherein the data structure comprises image data, text data, and metadata corresponding to the individual content items, wherein the data structure allows the focus application to construct and display the U/I as a focused U/I on a display of the user device, wherein the focus application is configured to:

execute spatial navigation for providing focus for one element at a time on a displayed U/I, and execute Parent-Child-Sibling navigation for selecting elements of the U/I for focus.

24. The user interface (U/I) focus system of claim 23, wherein the U/I is an electronic program guide (EPG).

25. The user interface (U/I) focus system of claim 23, wherein the U/I is a user interface for an online retailer.

26. The user interface (U/I) focus system of claim 23, wherein the U/I is a search engine interface for searching online Web sites.

27. The user interface (U/I) focus system of claim 23, further comprising a updateable data structure comprising data elements and metadata from which the focusable (U/I) is constructed, wherein removal of a data element, related to a currently focused element in the focusable U/I, from the updateable data structure causes loss of focus of the currently focused element, wherein the processor executes an element bubbling operation the focus application to select another element for focus.

* * * * *